(12) United States Patent
Morvillo

(10) Patent No.: US 8,069,802 B2
(45) Date of Patent: Dec. 6, 2011

(54) METHOD AND APPARATUS FOR CONTROLLING A MARINE VESSEL

(76) Inventor: Robert A. Morvillo, Belmont, MA (US)

( * ) Notice: Subject to any disclaimer, the term of this patent is extended or adjusted under 35 U.S.C. 154(b) by 0 days.

(21) Appl. No.: 12/573,721

(22) Filed: Oct. 5, 2009

(65) Prior Publication Data

US 2010/0022146 A1  Jan. 28, 2010

Related U.S. Application Data

(63) Continuation of application No. 11/567,204, filed on Dec. 5, 2006, now Pat. No. 7,601,040.

(60) Provisional application No. 60/742,817, filed on Dec. 5, 2005.

(51) Int. Cl.
*B63H 25/46* (2006.01)

(52) U.S. Cl. .......................................... 114/151; 440/40

(58) Field of Classification Search ................... 114/151, 114/144 R; 440/1, 38, 53, 40–43
See application file for complete search history.

(56) References Cited

U.S. PATENT DOCUMENTS

| | | |
|---|---|---|
| 3,258,916 A | 7/1966 | Lehmann |
| 3,756,185 A | 9/1973 | Breslin |
| 4,538,997 A | 9/1985 | Haglund |
| 4,691,659 A | 9/1987 | Ito et al. |
| 4,747,359 A | 5/1988 | Ueno |
| 4,992,065 A | 2/1991 | Torneman et al. |
| 5,031,561 A | 7/1991 | Nilsson |
| 5,421,753 A | 6/1995 | Roos |
| 5,579,711 A | 12/1996 | Thomas |
| 5,664,978 A | 9/1997 | Howe |
| 5,713,770 A | 2/1998 | Ambli |
| 5,934,954 A | 8/1999 | Schott et al. |
| 6,193,571 B1 | 2/2001 | Burg |
| 6,230,642 B1 | 5/2001 | McKinney et al. |
| 6,234,100 B1 | 5/2001 | Fadeley et al. |
| 6,234,853 B1 | 5/2001 | Lanyi et al. |
| 6,238,257 B1 | 5/2001 | Platzer et al. |
| 6,308,651 B2 | 10/2001 | McKinney et al. |
| 6,363,875 B1 | 4/2002 | Griffith et al. |

(Continued)

FOREIGN PATENT DOCUMENTS

DE  3700-530 A  7/1988

(Continued)

OTHER PUBLICATIONS

SKT Brochure, 1991.

(Continued)

*Primary Examiner* — Stephen Avila
(74) *Attorney, Agent, or Firm* — Lando & Anastasi, LLP

(57) ABSTRACT

One embodiment of the invention comprises a method for controlling a marine vessel having a first steerable propulsor, a corresponding first reversing device, a second steerable propulsor and a corresponding second reversing device. The method comprises receiving a first vessel control signal corresponding to a rotational movement and no translational movement command, generating at least a first actuator control signal and a second actuator control signal in response to the first vessel control signal, coupling the first actuator control signal to and controlling the first steerable propulsor and the second steerable propulsor, and coupling the second actuator control signal to and controlling the first reversing device and the second reversing device. The method creates rotational forces on the marine vessel with substantially no translational forces on the marine vessel.

34 Claims, 53 Drawing Sheets

U.S. PATENT DOCUMENTS

| | | | |
|---|---|---|---|
| 6,386,930 | B2 | 5/2002 | Moffet |
| 6,401,644 | B2 | 6/2002 | Fadeley et al. |
| 6,447,349 | B1 | 9/2002 | Fadeley et al. |
| 6,453,835 | B2 | 9/2002 | Fadeley et al. |
| 6,520,104 | B1 | 2/2003 | Svensson |
| 6,604,479 | B2 | 8/2003 | McKenney et al. |
| 6,652,333 | B1 | 11/2003 | Adomeit |
| 6,865,996 | B2 | 3/2005 | Borrett |
| 7,037,150 | B2 | 5/2006 | Morvillo |
| 7,052,338 | B2 | 5/2006 | Morvillo |
| 7,168,996 | B2 | 1/2007 | Morvillo |
| 7,216,599 | B2 | 5/2007 | Morvillo |
| 7,222,577 | B2 | 5/2007 | Morvillo |
| 7,305,928 | B2 | 12/2007 | Bradley et al. |
| 7,347,752 | B2 | 3/2008 | Morvillo |
| 2001/0029134 | A1 | 10/2001 | Moffet |
| 2003/0054707 | A1 | 3/2003 | Morvillo |
| 2003/0077954 | A1 | 4/2003 | Fadely et al. |
| 2003/0079668 | A1* | 5/2003 | Morvillo ..................... 114/151 |
| 2005/0042951 | A1* | 2/2005 | Morvillo ..................... 440/100 |
| 2006/0121803 | A1 | 6/2006 | Morvillo |
| 2006/0148342 | A1 | 7/2006 | Morvillo |

FOREIGN PATENT DOCUMENTS

| | | |
|---|---|---|
| DE | 4033674 A1 | 7/1991 |
| EP | 0035859 A2 | 9/1981 |
| EP | 0035859 A3 | 9/1981 |
| EP | 0778196 A1 | 6/1997 |
| EP | 0778196 B1 | 4/2002 |
| JP | 3000587 | 1/1991 |
| JP | 3021587 | 1/1991 |
| WO | 9620105 | 7/1996 |
| WO | 0134463 A2 | 5/2001 |
| WO | 0134463 A3 | 5/2001 |
| WO | 03026955 | 4/2003 |
| WO | 2005009839 | 2/2005 |

OTHER PUBLICATIONS

Rolls-Royce A-Series Instruction Manual Kamewa Water Jets, Jun. 26, 2000, pp. 15-54.

Servo Commander—Dual Drive Brochure, SKT/Styr-KontrollTeknik AB; BN Marin Elektronik, Sweden (1996).

"Remote Manoevre Controller—Dual Drive and Quadruple Drive Captain's Instruction," Styr-Kontroll Teknik AB, Stockholm Sweden, Jul. 1994.

International Search Report from a corresponding International Patent Application No. PCT/US2002/30928, mailed Apr. 29, 2003.

International Search Report from a corresponding International Patent Application No. PCT/US2002/25103, mailed Jun. 6, 2003.

International Search Report from a corresponding International Patent Application No. PCT/US2004/022838 mailed Nov. 24, 2004.

International Search Report from a corresponding International Patent Application No. PCT/US2005/042776 mailed Apr. 6, 2006.

International Search Report from a corresponding International Patent Application No. PCT/US2006/046518 mailed Apr. 24, 2007.

* cited by examiner

Joystick X-Axis Signals
(Single Waterjet)

FIG. 12
SINGLE WATERJET MOTION DIAGRAM
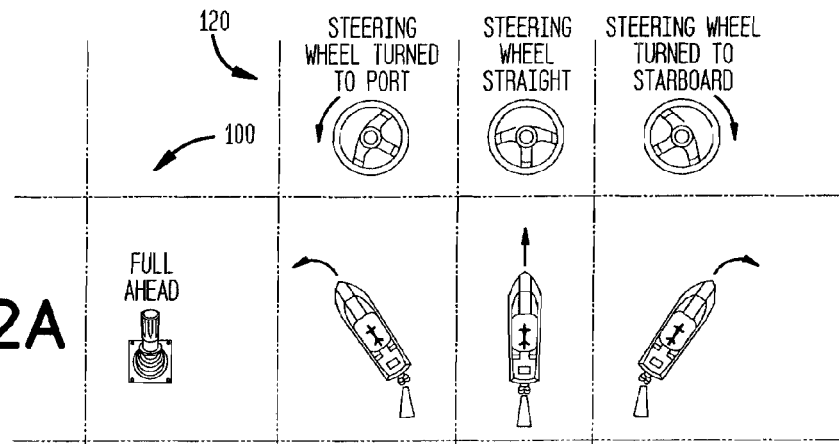
FIG. 12A
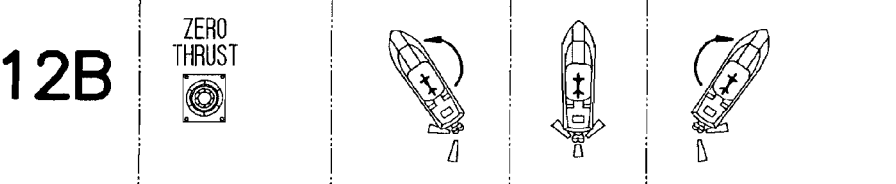
FIG. 12B
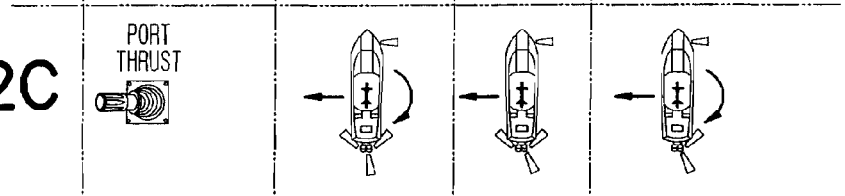
FIG. 12C
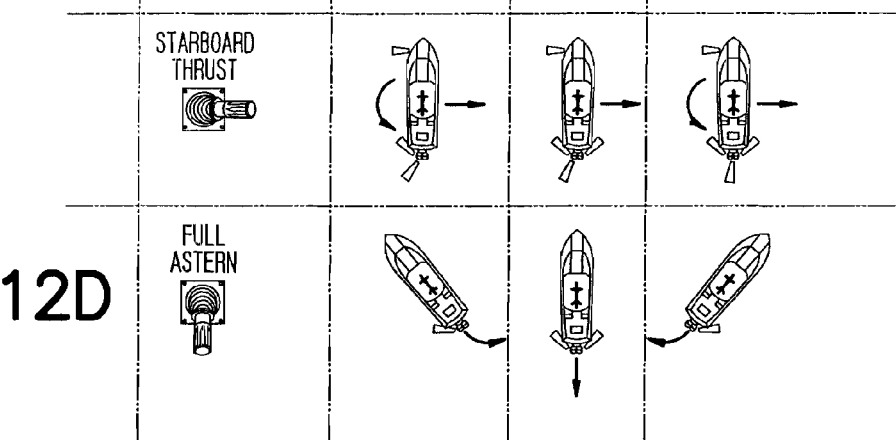
FIG. 12D Full Thrust
With Reversing Bucket
at Full UP Full Thrust
With Reversing Bucket
at Full UP Half Thrust
By Modulating the
Reversing Bucket Half Thrust
By Modulating Engine RPM
With Reversing Bucket Full Up

FIG. 20
DUAL WATERJET MOTION DIAGRAM
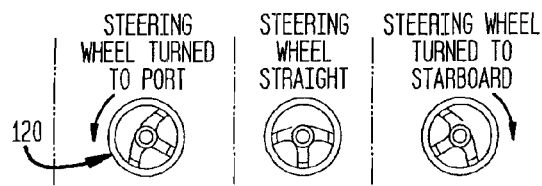
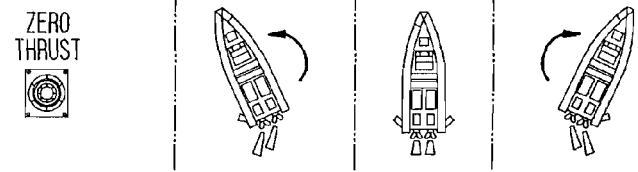
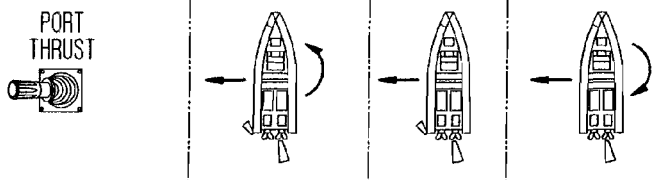
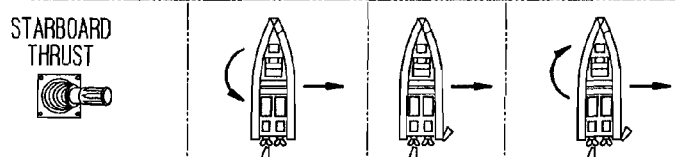
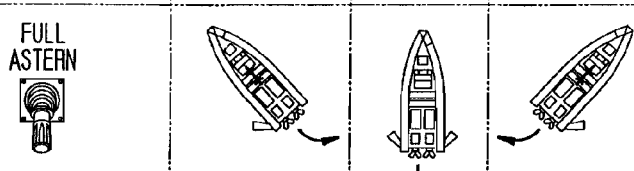

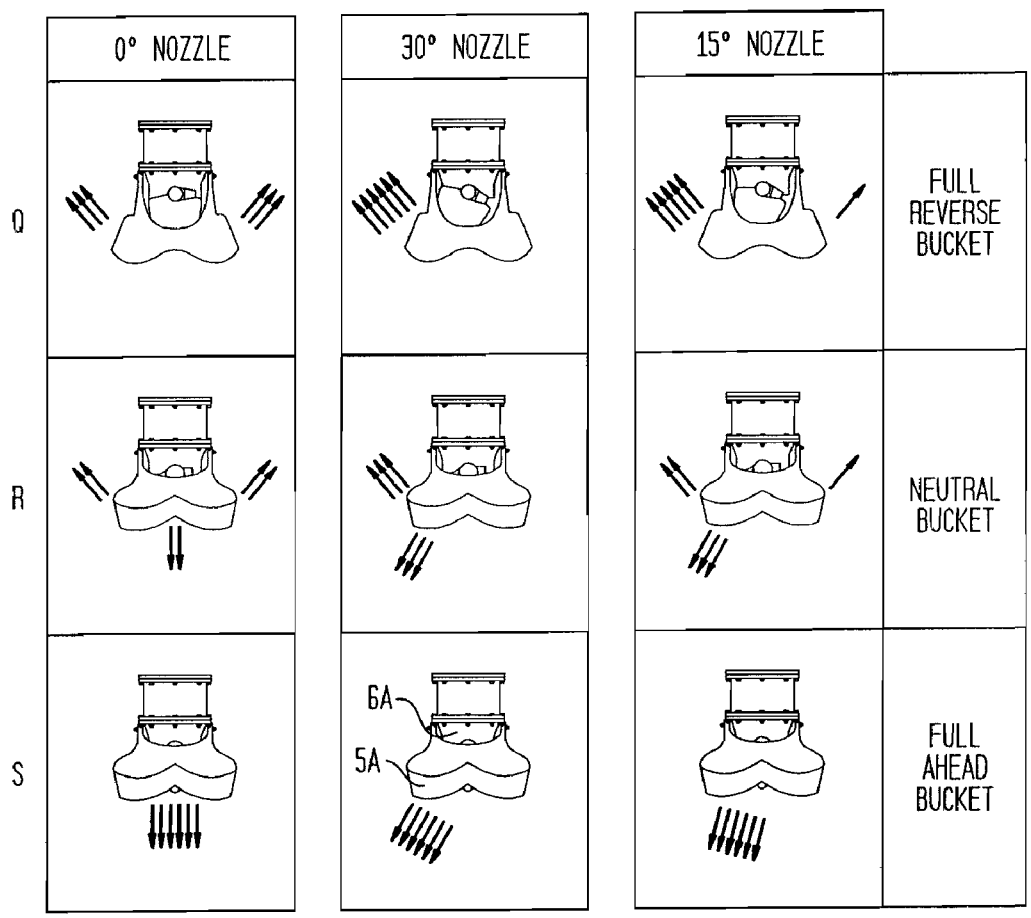

TWIN JET REMOTELY CONTROLLED SYSTEM DIAGRAM

|  | Steering Wheel Turned Counter Clockwise (CCW) | Steering Wheel Turned Counter Clockwise (CCW) |
|---|---|---|
| Neutral Thrust | CCW Rotation | No Rotation |
|  | LATERALLY FIXED BUCKET Neutral Thrust Turning Maneuver | INTEGRAL BUCKET Neutral Thrust Turning Maneuver |
|  | COLUMN A | COLUMN B |

FIG. 34

Integrated Twin Waterjet Signal Diagram Zone 1 (Transverse Thrust to Port)

FIG. 38 — Integrated Twin Waterjet Signal Diagram Zone 2 (Transverse Thrust to STBD)

Integrated Twin Waterjet Signal
Diagram: Zone 4 (Thrust AHD Only)

Integrated Twin Waterjet Signal
Diagram: Zone 5 (Thrust AST Only)

STEERABLE PROPELLER SIGNAL DIAGRAM
ZONE 1 (TRANSVERSE THRUST TO PORT)

STEERABLE PROPELLER SIGNAL DIAGRAM
ZONE 2 (TRANSVERSE THRUST TO STBD)

STEERABLE PROPELLER SIGNAL DIAGRAM: ZONE 3
(ROTATION ONLY(JOYSTICK CENTERED))

STEERABLE PROPELLER SIGNAL DIAGRAM: ZONE 4
(THRUST AHD ONLY)

STEERABLE PROPELLER SIGNAL DIAGRAM: ZONE 5
(THRUST AST ONLY)

METHOD AND APPARATUS FOR CONTROLLING A MARINE VESSEL

RELATED APPLICATIONS

This application is a continuation of and also claims priority under 35 U.S.C. §120 to U.S. patent application Ser. No. 11/567,204, which was filed on Dec. 5, 2006 and which will issue on Oct. 13, 2009 as U.S. Pat. No. 7,601,040. U.S. patent application Ser. No. 11/567,204 claims priority to U.S. Provisional Application Ser. No. 60/742,817, filed on Dec. 12, 2005, and is hereby incorporated by reference.

TECHNICAL FIELD

The present invention relates to marine vessel propulsion and control systems. More particularly, aspects of the invention relate to control circuits and methods for controlling the movement of a marine vessel having steerable propulsion apparatus.

BACKGROUND

Marine vessel controls include control over the speed, heading, trim and other aspects of a vessel's attitude and motion. The controls are frequently operated from a control station, where an operator uses control input devices, such as buttons, knobs, levers and handwheels, to provide one or more control input signals to one or more actuators. The actuators then typically cause an action in a propulsion apparatus or a control surface corresponding to the operator's input. Control signals can be generated by an operator, which can be a human or a machine such as a computer, an auto-pilot or a remote control system.

Various forms of propulsion have been used to propel marine vessels over or through the water. One type of propulsion system comprises a prime mover, such as an engine or a turbine, which converts energy into a rotation that is transferred to one or more propellers having blades in contact with the surrounding water. The rotational energy in a propeller is transferred by contoured surfaces of the propeller blades into a force or "thrust" which propels the marine vessel. As the propeller blades push water in one direction, thrust and vessel motion are generated in the opposite direction. Many shapes and geometries for propeller-type propulsion systems are known.

Other marine vessel propulsion systems utilize waterjet propulsion to achieve similar results. Such devices include a pump, a water inlet or suction port and an exit or discharge port, which generate a waterjet stream that propels the marine vessel. The waterjet stream may be deflected using a "deflector" to provide marine vessel control by redirecting some waterjet stream thrust in a suitable direction and in a suitable amount.

In some applications, such as in ferries, military water craft, and leisure craft, it has been found that propulsion using waterjets is especially useful. In some instances, waterjet propulsion can provide a high degree of maneuverability when used in conjunction with marine vessel controls that are specially-designed for use with waterjet propulsion systems.

It is sometimes more convenient and efficient to construct a marine vessel propulsion system such that the flow of water through the pump is always in the astern direction is always in the forward direction. The "forward" direction 20, or "ahead" direction is along a vector pointing from the stern, or aft end of the vessel, to its bow, or front end of the vessel. By contrast, the "reverse", "astern" or "backing" directing is along a vector pointing in the opposite direction (or 180° away) from the forward direction. The axis defined by a straight line connecting a vessel's bow to its stern is referred to herein as the "major axis" 13 of the vessel. A vessel has only one major axis. Any axis perpendicular to the major axis 13 is referred to herein as a "minor axis," e.g., 22 and 25. A vessel has a plurality of minor axes, lying in a plane perpendicular to the major axis. Some marine vessels have propulsion systems which primarily provide thrust only along the vessel's major axis, in the forward or backward directions. Other thrust directions, along the minor axes, are generated with awkward or inefficient auxiliary control surfaces, rudders, planes, deflectors, etc. Rather than reversing the direction of the waterjet stream through the pump, it may be advantageous to have the pump remain engaged in the forward direction (water flow directed astern) while providing other mechanisms for redirecting the water flow to provide the desired maneuvers.

One example of a device that redirects or deflects a waterjet stream is a conventional "reversing bucket," found on many waterjet propulsion marine vessels. A reversing bucket deflects water, and is hence also referred to herein as a "reversing deflector." The reversing deflector generally comprises a deflector that is contoured to at least partially reverse a component of the flow direction of the waterjet stream from its original direction to an opposite direction. The reversing deflector is selectively placed in the waterjet stream (sometimes in only a portion of the waterjet stream) and acts to generate a backing thrust, or force in the backing direction.

A reversing deflector may thus be partially deployed, placing it only partially in the waterjet stream, to generate a variable amount of backing thrust. By so controlling the reversing deflector and the waterjet stream, an operator of a marine vessel may control the forward and backwards direction and speed of the vessel. A requirement for safe and useful operation of marine vessels is the ability to steer the vessel from side to side. Some systems, commonly used with propeller-driven vessels, employ "rudders" for this purpose.

Other systems for steering marine vessels, commonly used in waterjet-propelled vessels, rotate the exit or discharge nozzle of the waterjet stream from one side to another. Such a nozzle is sometimes referred to as a "steering nozzle." Hydraulic actuators may be used to rotate an articulated steering nozzle so that the aft end of the marine vessel experiences a sideways thrust in addition to any forward or backing force of the waterjet stream. The reaction of the marine vessel to the side-to-side movement of the steering nozzle will be in accordance with the laws of motion and conservation of momentum principles, and will depend on the dynamics of the marine vessel design.

Despite the proliferation of the above-mentioned systems, some maneuvers remain difficult to perform in a marine vessel. These include "trimming" the vessel, docking and other maneuvers in which vertical and lateral forces are provided.

It should be understood that while particular control surfaces are primarily designed to provide force or motion in a particular direction, these surfaces often also provide forces in other directions as well. For example, a reversing deflector, which is primarily intended to develop thrust in the backing direction, generally develops some component of thrust or force in another direction such as along a minor axis of the vessel. One reason for this, in the case of reversing deflectors, is that, to completely reverse the flow of water from the waterjet stream, (i.e., reversing the waterjet stream by 180°) would generally send the deflected water towards the aft surface of the vessel's hull, sometimes known as the transom. If this were to happen, little or no backing thrust would be developed, as the intended thrust in the backing direction developed by the reversing deflector would be counteracted by a corresponding forward thrust resulting from the collision of the deflected water with the rear of the vessel or its transom. Hence, reversing deflectors often redirect the waterjet stream in a direction that is at an angle which allows for development of backing thrust, but at the same time flows around or beneath the hull of the marine vessel. In fact, sometimes it is possible that a reversing deflector delivers the deflected water stream in a direction which is greater than 45°(but less than 90°) from the forward direction.

Nonetheless, those skilled in the art appreciate that certain control surfaces and control and steering devices such as reversing deflectors have a primary purpose to develop force or thrust along a particular axis. In the case of a reversing deflector, it is the backing direction in which thrust is desired.

Similarly, a rudder is intended to develop force at the stern portion of the vessel primarily in a side-to-side or athwart ships direction, even if collateral forces are developed in other directions. Thus, net force should be viewed as a vector sum process, where net or resultant force is generally the goal, and other smaller components thereof may be generated in other directions at the same time.

Marine vessel control systems work in conjunction with the vessel propulsion systems to provide control over the motion of the vessel. To accomplish this, control input signals are used that direct and control the vessel control systems. Control input devices are designed according to the application at hand, and depending on other considerations such as cost and utility.

One control input device that can be used in marine vessel control applications is a control stick or "joystick," which has become a familiar part of many gaming apparatus. A control stick generally comprises at least two distinct degrees of freedom, each providing a corresponding electrical signal. For example, as illustrated in FIG. 2, a control stick 100 may have the ability to provide a first control input signal in a first direction 111 about a neutral or zero position as well as provide a second control input signal in a second direction 113 about a neutral or zero position. Other motions are also possible, such as a plunging motion 115 or a rotating motion 117 that twists the handle 114 of the control stick 100 about an axis 115 running through the handle of the control stick 100. Auxiliaries have been used in conjunction with control sticks and include stick-mounted buttons for example (not shown).

To date, most control systems remain unwieldy and require highly-skilled operation to achieve a satisfactory and safe result. Controlling a marine vessel typically requires simultaneous movement of several control input devices to control the various propulsion and control apparatus that move the vessel. The resulting movement of marine vessels is usually awkward and lacks an intuitive interface to its operator.

Even present systems employing advanced control input devices, such as control sticks, are not very intuitive. An operator needs to move the control sticks of present systems in a way that provides a one-to-one correspondence between the direction of movement of the control stick and the movement of a particular control actuator.

Examples of systems that employ control systems to control marine vessels include those disclosed in U.S. Pat. Nos. 6,234,100 and 6,386,930, in which a number of vessel control and propulsion devices are controlled to achieve various vessel maneuvers. Also, the Servo Commander system, by Styr-Kontroll Teknik corporation, comprises a joystick-operated vessel control system that controls propulsion and steering devices on waterjet-driven vessels. These and other present systems have, at best, collapsed the use of several independent control input devices (e.g., helm, throttle) into one device (e.g., control stick) having an equivalent number of degrees of freedom as the input devices it replaced.

U.S. 2001/0029134 (hereinafter Moffet) discloses a water jet-driven boat that has first and second steering nozzles and corresponding first and second reversing buckets, as well as a system for controlling the steering nozzles and the corresponding reversing buckets, that includes a joystick with two axes of motion, and a controller. The controller of Moffet and the system of Moffet are disclosed to move the first and second reversing buckets to a plurality of different positions for movements of the joystick along the X-axis off of center. In particular, Moffet discloses that a left/right movement of the joystick controls the differential positioning of the reversing buckets such that a leftward movement of the joystick causes the port bucket to move down in a plurality of positions and the starboard bucket to move up in a plurality of positions, thereby resulting in the bow moving to port around a vertical axis passing between the two water jets. In addition, Moffet discloses that movement of the joystick to starboard causes the starboard bucket to move down in a plurality of positions and the port bucket to move up in a plurality of positions, thereby resulting in the bow moving to starboard around the same vertical axis. Moffet also discloses that the farther the joystick is moved either to the left or to the right away from the neutral position along the X-axis, the greater the differential between the port and starboard bucket positions and the greater the side forces that are created on the vessel. In addition, Moffet discloses that if either fore and aft movement need to be controlled due to outside forces on the vessel or the need exists to move fore or aft while moving laterally, forward or reverse thrust can be reduced by moving the reversing buckets in unison while maintaining their differential positions relative to each other.

BRIEF SUMMARY

One embodiment of the invention comprises a method for controlling a marine vessel having a first steering nozzle, a corresponding first integral reversing deflector, a second steering nozzle and a corresponding second integral reversing deflector. The method includes receiving a first vessel control signal corresponding to at least one of a translational thrust command and a rotational thrust command, generating at least a first actuator control signal and a second actuator control signal in response to the first vessel control signal, coupling the first actuator control signal to and controlling the first steering nozzle and the second steering nozzle, and coupling the second actuator control signal to and controlling the first integral reversing deflector and the second integral reversing deflector. With this method, there is induced a net translational force to the marine vessel, in response to the first actuator control signal and the second actuator control signal corresponding to the first vessel control signal comprising only the translational thrust command and a zero rotational thrust command, so that substantially no net rotational force is induced to the marine vessel. In addition, with this method there is induced a net force to the marine vessel, in response to the first actuator control signal and the second actuator control signal comprising a combination of the translational thrust command and the rotational thrust command, substantially in a direction of a combination of the translational thrust command and the rotational thrust command for all combinations of the rotational and translational thrust commands.

According to aspects of the invention, the method in response to the first vessel signal that corresponds to a full astern control command, flips the control processes for the first and second steerable propulsors and the first and second integral reversing deflectors for a first control signal that corresponds to a full ahead command.

According to aspects of the invention, the method in response to the first vessel signal that corresponds to a rotational movement and no translational movement command, creates rotational forces on the marine vessel with substantially no translational forces on the marine vessel by pointing in the first and second steerable propulsors.

According to aspects of the invention, the method in response to the first vessel signal that corresponds to a rotational movement and no translational movement command, creates rotational forces on the marine vessel with substantially no translational forces on the marine vessel by applying differential RPM forces to the first and second steerable propulsors.

One embodiment of the invention comprises a method for controlling a marine vessel having a first steerable propulsor having a first thrust vector with a first thrust angle and a corresponding first reversing device that is configured to reverse thrust while maintaining the same first thrust angle, and a second steerable propulsor having a second thrust vector with a second thrust angle and a corresponding second reversing device that is configured to reverse thrust while maintaining the same second thrust angle. The method comprises receiving a first vessel control signal corresponding to at least one of a translational thrust command and a rotational thrust command, generating at least a first actuator control signal and a second actuator control signal in response to the first vessel control signal, coupling the first actuator control signal to and controlling the first steerable propulsor and the second steerable propulsor, and coupling the second actuator control signal to and controlling the first reversing device and the second reversing device. With this method, there is induced a net translational force to the marine vessel, in response to the first actuator control signal and the second actuator control signal corresponding to the first vessel control signal comprising only the translational thrust command and a zero rotational thrust command, so that substantially no net rotational force is induced to the marine vessel. In addition, with this method, there is induced a net force to the marine vessel, in response to the first actuator control signal and the second actuator control signal comprising a combination of the translational thrust command and the rotational thrust command, substantially in a direction of a combination of the translational thrust command and the rotational thrust command for all combinations of the rotational and translational thrust commands.

One embodiment of the invention comprises a method for controlling a marine vessel having a first steerable propulsor, a corresponding first reversing device, a second steerable propulsor and a corresponding second reversing device. The method comprises receiving a first vessel control signal corresponding to a full astern control command, generating at least a first actuator control signal and a second actuator control signal in response to the first vessel control signal with control processes for the first and second steerable propulsors and the first and second integral reversing deflectors, coupling the first actuator control signal to and controlling the first steerable propulsor and the second steerable propulsor, and coupling the second actuator control signal to and controlling the first reversing device and the second reversing device. The method flips the control processes for the first and second steerable propulsors and the first and second integral reversing deflectors for a first control signal that corresponds to a full ahead command.

One embodiment of the invention comprises a method for controlling a marine vessel having a first steerable propulsor, a corresponding first reversing device, a second steerable propulsor and a corresponding second reversing device. The method comprises receiving a first vessel control signal corresponding to a rotational movement and no translational movement command, generating at least a first actuator control signal and a second actuator control signal in response to the first vessel control signal, coupling the first actuator control signal to and controlling the first steerable propulsor and the second steerable propulsor, and coupling the second actuator control signal to and controlling the first reversing device and the second reversing device. The method creates rotational forces on the marine vessel with substantially no translational forces on the marine vessel by pointing in the first and second steerable propulsors.

One embodiment of the invention comprises a method for controlling a marine vessel having a first steerable propulsor, a corresponding first reversing device, a second steerable propulsor and a corresponding second reversing device. The method comprises receiving a first vessel control signal corresponding to a rotational movement and no translational movement command, generating at least a first actuator control signal and a second actuator control signal in response to the first vessel control signal, coupling the first actuator control signal to and controlling the first steerable propulsor and the second steerable propulsor, and coupling the second actuator control signal to and controlling the first reversing device and the second reversing device. The method creates rotational forces on the marine vessel with substantially no translational forces on the marine vessel by applying differential RPM forces to the first and second steerable propulsors.

BRIEF DESCRIPTION OF THE DRAWINGS

FIG. 12 illustrates exemplary maneuvers provided by motion of a control stick and helm for a single waterjet vessel;

FIG. 20 illustrates exemplary maneuvers provided by motion of a control stick and helm for a dual waterjet vessel;

FIG. 24 illustrates an exemplary subset of motions of a laterally-fixed reversing bucket and steering nozzle;

FIG. 34 illustrates additional exemplary vessel movements for a vessel configured with dual waterjets and corresponding laterally fixed reversing buckets and a vessel configured with dual waterjets and corresponding integral reversing buckets;

DETAILED DESCRIPTION

In view of the above discussion, and in view of other considerations relating to design and operation of marine vessels, it is desirable to have a marine vessel control system which can provide forces in a plurality of directions, such as a trimming force, and which can control thrust forces in a safe and efficient manner. Some aspects of the present invention generate or transfer force from a waterjet stream, initially flowing in a first direction, into one or more alternate directions. Other aspects provide controls for such systems.

Aspects of marine vessel propulsion, including trim control, are described further in pending U.S. patent application Ser. No. 10/213,829, which is hereby incorporated by reference in its entirety. In addition, some or all aspects of the present invention apply to systems using equivalent or similar components and arrangements, such as outboard motors instead of jet propulsion systems and systems using various prime movers not specifically disclosed herein.

Figure 1:
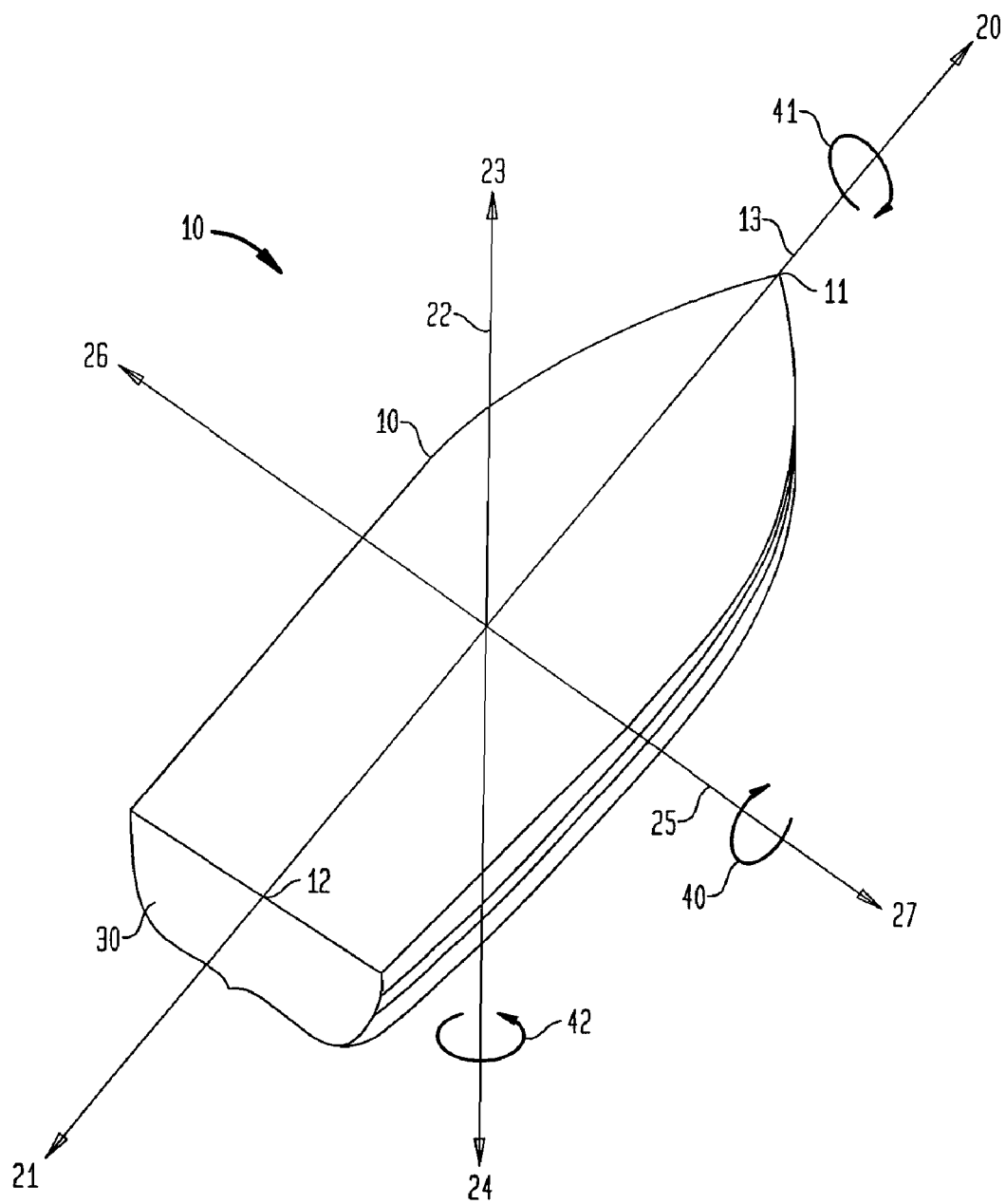
FIG. 1 illustrates an outline of a marine vessel and various axes and directions of motion referenced thereto.

Prior to a detailed discussion of various embodiments of the present invention, it is useful to define certain terms that describe the geometry of a marine vessel and associated propulsion and control systems. FIG. 1 illustrates an exemplary outline of a marine vessel 10 having a forward end called a bow 11 and an aft end called a stern 12. A line connecting the bow 11 and the stern 12 defines an axis hereinafter referred to the marine vessel's major axis 13. A vector along the major axis 13 pointing along a direction from stern 12 to bow 11 is said to be pointing in the ahead or forward direction 20. A vector along the major axis 13 pointing in the opposite direction (180° away) from the ahead direction 20 is said to be pointing in the astern or reverse or backing direction 21.

The axis perpendicular to the marine vessel's major axis 13 and nominally perpendicular to the surface of the water on which the marine vessel rests, is referred to herein as the vertical axis 22. The vector along the vertical axis 22 pointing away from the water and towards the sky defines an up direction 23, while the oppositely-directed vector along the vertical axis 22 pointing from the sky towards the water defines the down direction 24. It is to be appreciated that the axes and directions, e.g. the vertical axis 22 and the up and down directions 23 and 24, described herein are referenced to the marine vessel 10. In operation, the vessel 10 experiences motion relative to the water in which it travels. However, the present axes and directions are not intended to be referenced to Earth or the water surface.

The axis perpendicular to both the marine vessel's major axis 13 and a vertical axis 22 is referred to as an athwartships axis 25. The direction pointing to the left of the marine vessel with respect to the ahead direction is referred to as the port direction 26, while the opposite direction, pointing to the right of the vessel with respect to the forward direction 20 is referred to as the starboard direction 27. The athwartships axis 25 is also sometimes referred to as defining a "side-to-side" force, motion, or displacement. Note that the athwartships axis 25 and the vertical axis 22 are not unique, and that many axes parallel to said athwartships axis 22 and vertical axis 25 can be defined.

With this the three most commonly-referenced axes of a marine vessel have been defined. The marine vessel 10 may be moved forward or backwards along the major axes 13 in directions 20 and 21, respectively. This motion is usually a primary translational motion achieved by use of the vessels propulsion systems when traversing the water as described earlier. Other motions are possible, either by use of vessel control systems or due to external forces such as wind and water currents. Rotational motion of the marine vessel 10 about the athwartships axis 25 which alternately raises and lowers the bow 11 and stern 12 is referred to as pitch 40 of the vessel. Rotation of the marine vessel 10 about its major axis 13, alternately raising and lowering the port and starboard sides of the vessel is referred to as roll 41. Finally, rotation of the marine vessel 10 about the vertical axis 22 is referred to as yaw 42. An overall vertical displacement of the entire vessel 10 that moves the vessel up and down (e.g. due to waves) is called heave.

In waterjet propelled marine vessels a waterjet is typically discharged from the aft end of the vessel in the astern direction 21. The marine vessel 10 normally has a substantially planar bulkhead or portion of the hull at its aft end referred to as the vessel's transom 30. In some small craft an outboard propeller engine is mounted to the transom 30.

Figure 2:
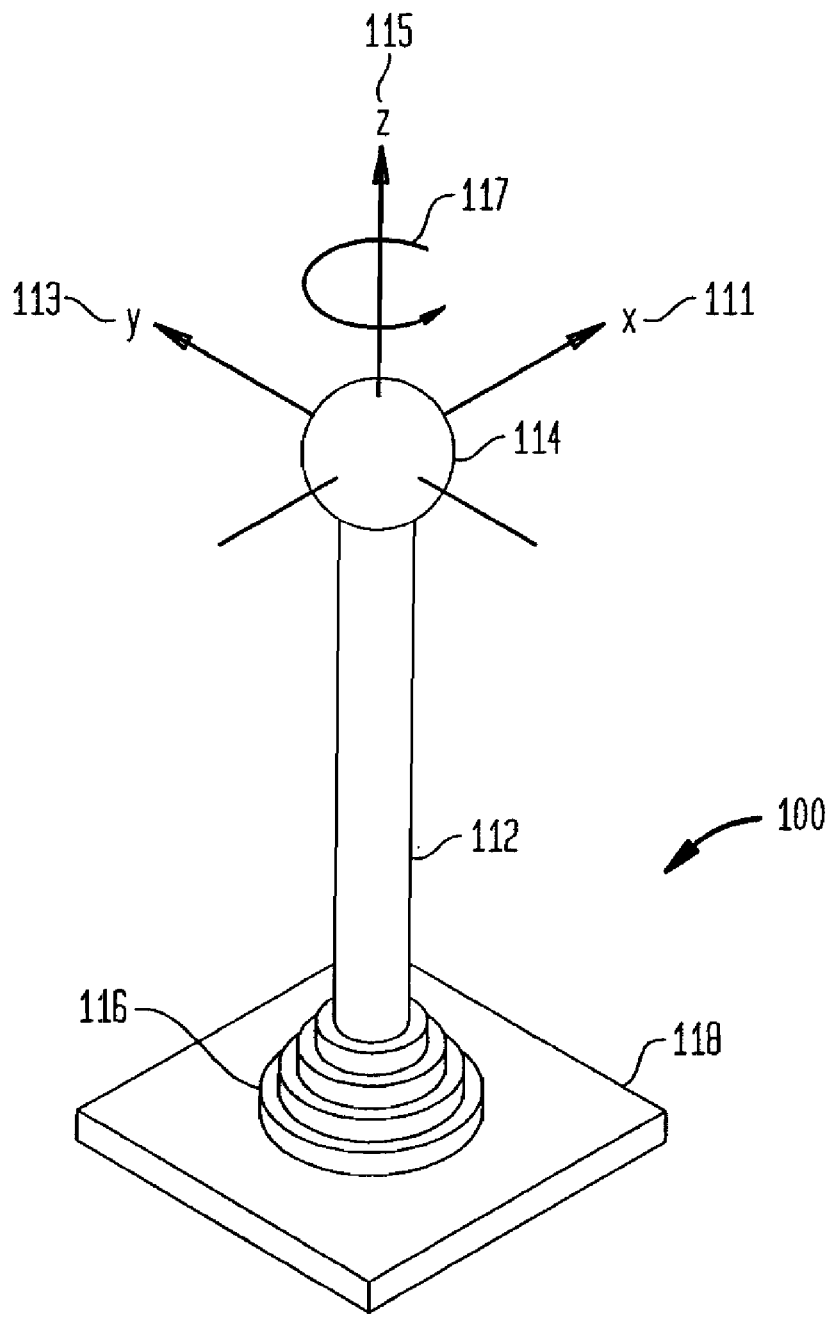
FIG. 2 illustrates an exemplary embodiment of a control stick and associated degrees of freedom.

FIG. 2 illustrates an exemplary vessel control apparatus 100. The vessel control apparatus 100 can take the form of an electro-mechanical control apparatus such as a control stick, sometimes called a joystick. The control stick generally comprises a stalk 112, ending in a handle 114. This arrangement can also be thought of as a control lever. The control stick also has or sits on a support structure 118, and moves about one or more articulated joints 116 that permit one or more degrees of freedom of movement of the control stick. Illustrated are some exemplary degrees of freedom or directions of motion of the vessel control apparatus 100. The "y" direction 113 describes forward-and-aft motion of the vessel control apparatus. The "x" direction 111 describes side-to-side motion of the vessel control apparatus 100. It is also possible in some embodiments to push or pull the handle 114 vertically with respect to the vessel to obtain a vessel control apparatus 100 motion in the "z" direction 115. It is also possible, according to some embodiments, to twist the control stick along a rotary degree of freedom 117 by twisting the handle 114 clockwise or counter-clockwise about the z-axis.

Figure 3:
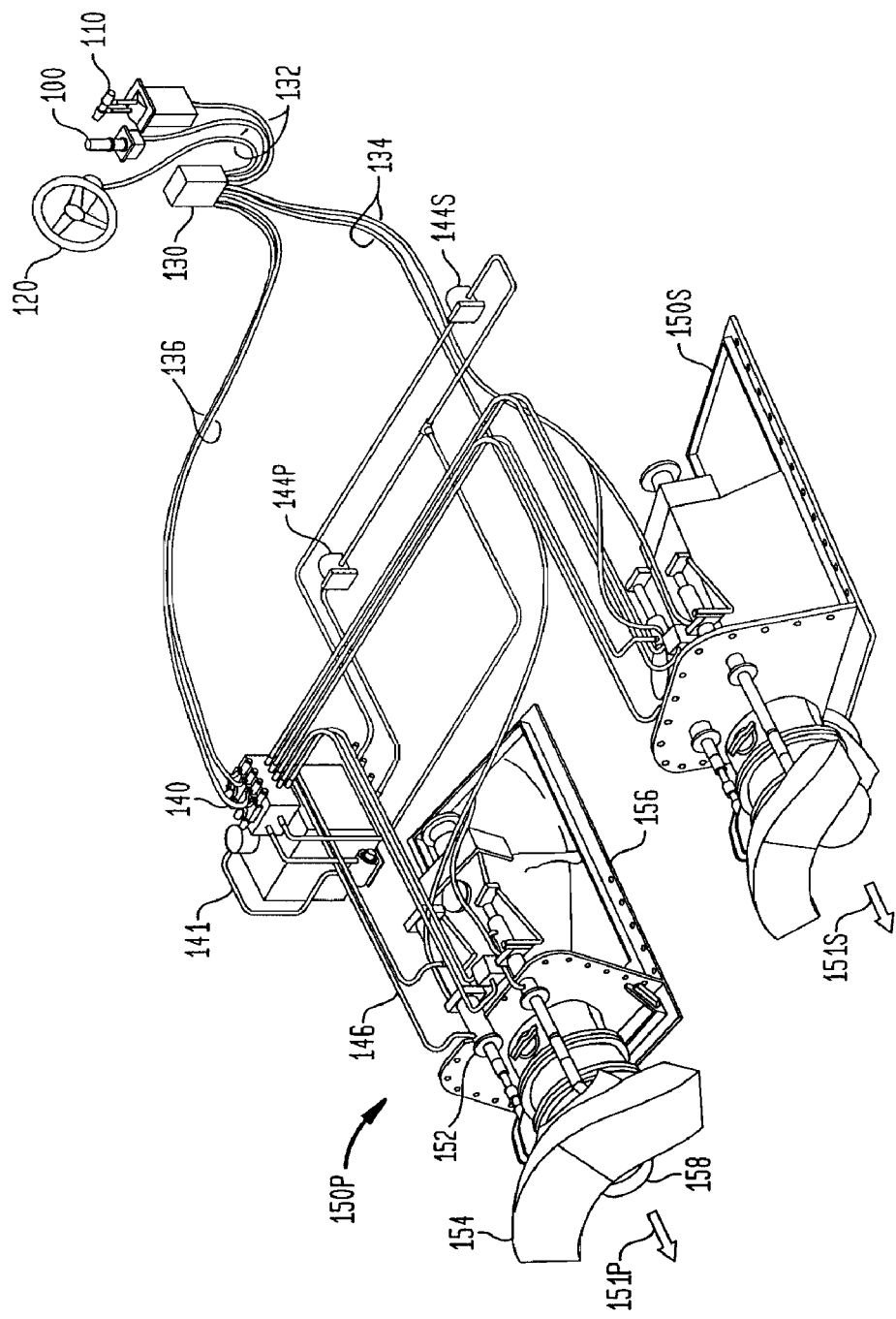
FIG. 3 illustrates an exemplary vessel with a dual waterjet propulsion system and controls therefor.

Referring to FIG. 3, a waterjet propulsion system and control system for a dual waterjet driven marine vessel are illustrated. The figure illustrates a twin jet propulsion system, having a port propulsor or pump 150P and a starboard propulsor 150S that generate respective waterjet streams 151P and 151S. Both the port and starboard devices operate similarly, and will be considered analogous in the following discussions. Propulsor or pump 150 drives waterjet stream 151 from an intake port (not shown, near 156) to nozzle 158. Nozzle 158 may be designed to be fixed or articulated, in which case its motion is typically used to steer the vessel by directing the exit waterjet stream to have a sideways component. The figure also illustrates reversing deflector or bucket 154 that is moved by a control actuator 152. The control actuator 152 comprises a hydraulic piston cylinder arrangement for pulling and pushing the reversing deflector 154 into and out of the waterjet stream 151P. The starboard apparatus operates similar to that described with regard to the port apparatus, above.

The overall control system comprises electrical as well as hydraulic circuits that includes a hydraulic power unit 141. The hydraulic power unit 141 may comprise various components required to sense and deliver hydraulic pressure to various actuators. For example, the hydraulic unit 141 may comprise hydraulic fluid reservoir tanks, filters, valves and coolers. Hydraulic pumps 144P and 144S provide hydraulic fluid pressure and can be fixed or variable-displacement pumps. Actuator control valve 140 delivers hydraulic fluid to and from the actuators, e.g. 152, to move the actuators. Actuator control valve 140 may be a proportional solenoid valve that moves in proportion to a current or voltage provided to its solenoid to provide variable valve positioning. Return paths are provided for the hydraulic fluid returning from the actuators 152. Hydraulic lines, e.g. 146, provide the supply and return paths for movement of hydraulic fluid in the system. Of course, many configurations and substitutions may be carried out in designing and implementing specific vessel control systems, depending on the application, and that described in regard to the present embodiments is only illustrative.

The operation of the electro-hydraulic vessel control system of FIG. 3 is as follows. A vessel operator moves one or more vessel control apparatus. For example, the operator moves the helm 120, the engine throttle controller 110 or the control stick 100. Movement of said vessel control apparatus is in one or more directions, facilitated by one or more corresponding degrees of freedom. The helm 120, for example, may have a degree of freedom to rotate the wheel in the clockwise direction and in the counter-clockwise direction. The throttle controller 110 may have a degree of freedom to move forward-and-aft, in a linear, sliding motion. The control stick 100 may have two or more degrees of freedom and deflects from a neutral center position as described earlier with respect to FIG. 2.

The movement of one or more of the vessel control apparatus generates an electrical vessel control signal. The vessel control signal is generated in any one of many known ways, such as by translating a mechanical movement of a wheel or lever into a corresponding electrical signal through a potentiometer. Digital techniques as well as analog techniques are available for providing the vessel control signal and are within the scope of this disclosure.

The vessel control signal is delivered to a control processor unit 130 which comprises at least one processor adapted for generating a plurality of actuator control signals from the vessel control signal. The electrical lines 132 are input lines carrying vessel control signals from the respective vessel control apparatus 100, 110 and 120. The control processor unit 130 may also comprise a storage member that stores information using any suitable technology. For example, a data table holding data corresponding to equipment calibration parameters and set points can be stored in a magnetic, electrostatic, optical, or any other type of unit within the control processor unit 130.

Other input signals and output signals of the control processor unit 130 include output lines 136, which carry control signals to control electrically-controlled actuator control valve 140. Also, control processor unit 130 receives input signals on lines 134 from any signals of the control system to indicate a position or status of that part. These input signals may be used as a feedback in some embodiments to facilitate the operation of the system or to provide an indication to the operator or another system indicative of the position or status of that part.

Figure 4:
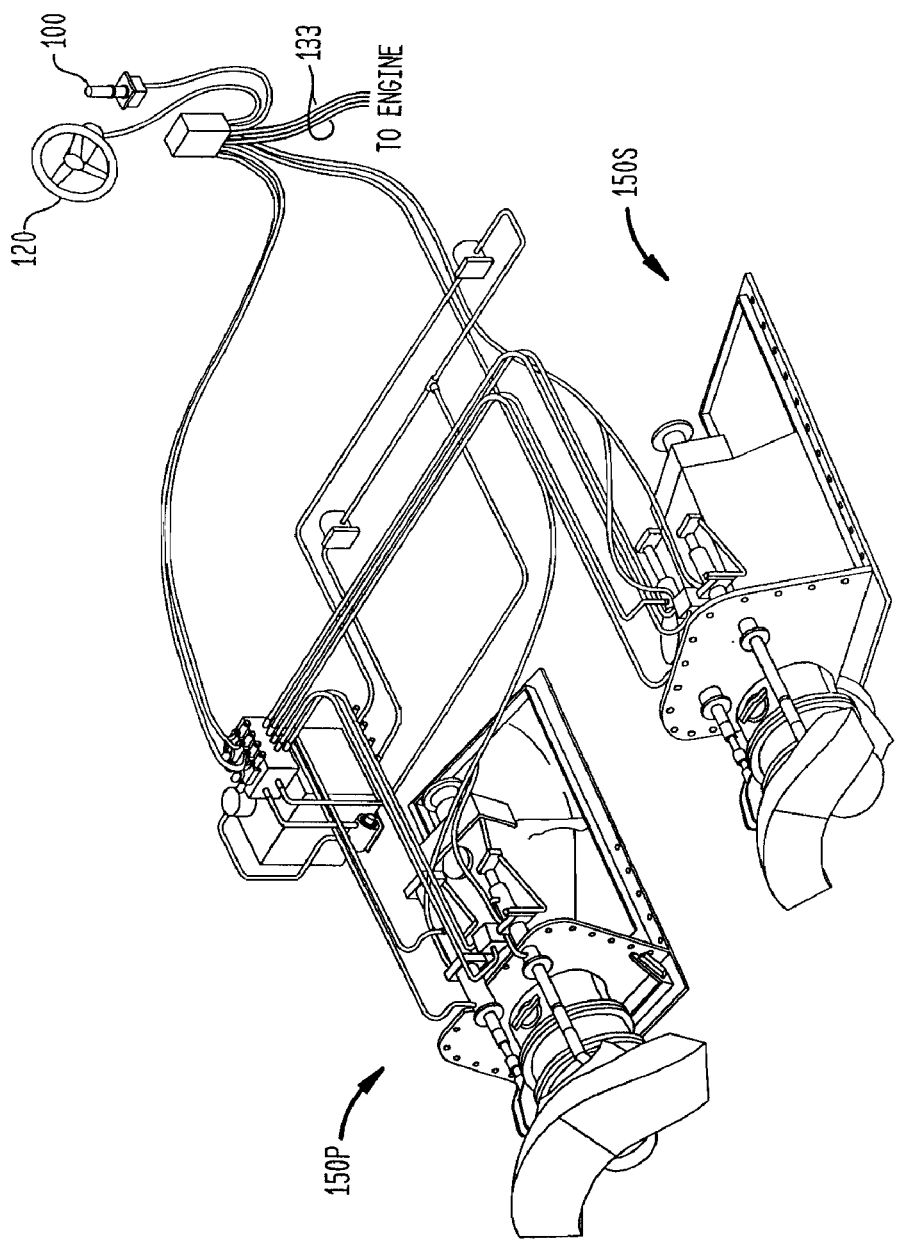
FIG. 4 illustrates another exemplary vessel with a dual waterjet propulsion system and controls therefor.

FIG. 4 illustrates another exemplary embodiment of a dual jet driven propulsion and control system for a marine vessel and is similar to FIG. 3 except that the system is controlled with only a helm 120 and a control stick 100. It is to be appreciated that throughout this description like parts have been labeled with like reference numbers, and a description of each part is not always repeated for the sake of brevity. For this embodiment, the functions of the throttle controller 110 of FIG. 3 are subsumed in the functions of the control stick 100. Outputs 133 "To Engine" allow for control of the input RPM of pumps 150P and 150S. In some embodiments, the steering nozzles 158 may be controlled from the control stick 100 as well.

Figure 5:
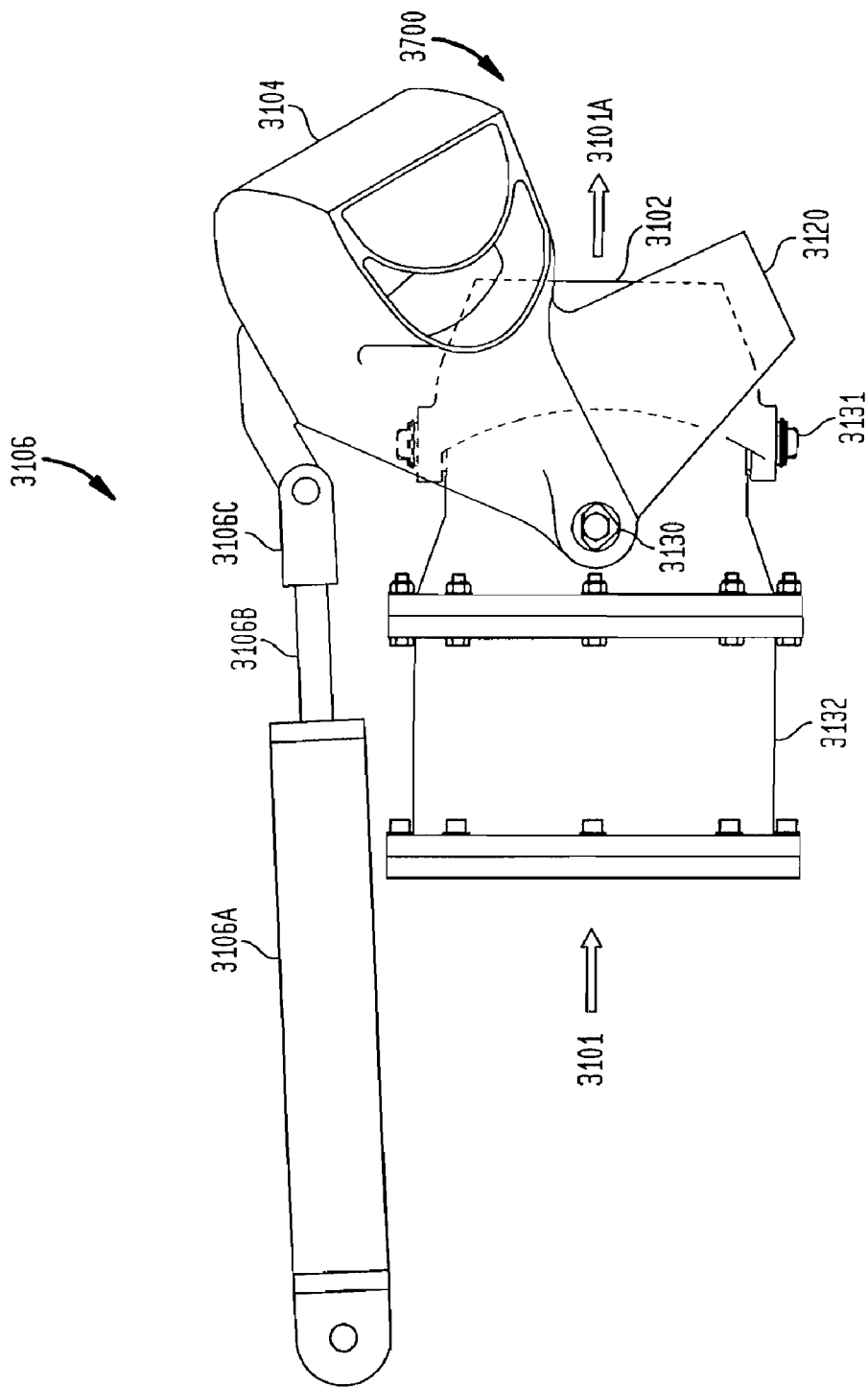
FIG. 5 illustrates an exemplary control apparatus and associated actuator.

FIG. 5 illustrates an example of a control device and associated actuator. A waterjet stream is produced at the outlet of a waterjet pump as described earlier, or is generated using any other water-drive apparatus. A waterjet propulsion system moves a waterjet stream 3101 pumped by a pump (also referred to herein as a propulsor, or a means for propelling water to create the waterjet) through waterjet housing 3132 and out the aft end of the propulsion system through an articulated steering nozzle 3102.

The fact that the steering nozzle 3102 is articulated to move side-to-side will be explained below, but this nozzle 3102 may also be fixed or have another configuration as used in various applications. The waterjet stream exiting the steering nozzle 3102 is designated as 3101A.

FIG. 5 also illustrates a laterally-fixed reversing bucket 3104 and trim deflector 3120 positioned to allow the waterjet stream to flow freely from 3101 to 3101A, thus providing forward thrust for the marine vessel. The forward thrust results from the flow of the water in a direction substantially opposite to the direction of the thrust. Trim deflector 3120 is fixably attached to reversing deflector 3104 in this embodiment, and both the reversing deflector 3104 and the trim deflector 3120 rotate in unison about a pivot 3130.

Other embodiments of a reversing deflector and trim deflector for a waterjet propulsion system are illustrated in commonly-owned, co-pending U.S. patent application Ser. No. 10/213,829, which is hereby incorporated by reference in its entirety.

The apparatus for moving the integral reversing deflector and trim deflector comprises a hydraulic actuator 3106, comprising a hydraulic cylinder 3106A in which travels a piston and a shaft 3106B attached to a pivoting clevis 3106C. Shaft 3106B slides in and out of cylinder 3106A, causing a corresponding raising or lowering of the integral reversing deflector and trim deflector apparatus 3700, respectively.

It can be appreciated from FIG. 5 that progressively lowering the reversing deflector will provide progressively more backing thrust, until the reversing deflector is placed fully in the exit stream 3101A, and full reversing or backing thrust is developed. In this position, trim deflector 3120 is lowered below and out of the exit stream 3101A, and provides no trimming force.

Similarly, if the combined reversing deflector and trim deflector apparatus 3700 is rotated upwards about pivot 3130 (counter clockwise in FIG. 5) then the trim deflector 3120 will progressively enter the exiting water stream 3101A, progressively providing more trimming force. In such a configuration, the reversing deflector 3104 will be raised above and out of waterjet exit stream 3101A, and reversing deflector 3104 will provide no force.

However, it is to be understood that various modifications to the arrangement, shape and geometry, the angle of attachment of the reversing deflector 3104 and the trim deflector 3120 and the size of the reversing deflector 3104 and trim deflector 3120 are possible, as described for example in co-pending U.S. patent application Ser. No. 10/213,829. It is also to be appreciated that although such arrangements are not expressly described herein for all embodiments, but that such modifications are nonetheless intended to be within the scope of this disclosure.

Steering nozzle 3102 is illustrated in FIG. 5 to be capable of pivoting about a trunion or a set of pivots 3131 using a hydraulic actuator. Steering nozzle 102 may be articulated in such a manner as to provide side-to-side force applied at the waterjet by rotating the steering nozzle 3102, thereby developing the corresponding sideways force that steers the marine vessel. This mechanism works even when the reversing deflector 3104 is fully deployed, as the deflected water flow will travel through the port and/or starboard sides of the reversing deflector 3104. Additionally, the steering nozzle 3102 can deflect side-to-side when the trim deflector 3120 is fully deployed.

Figure 6:
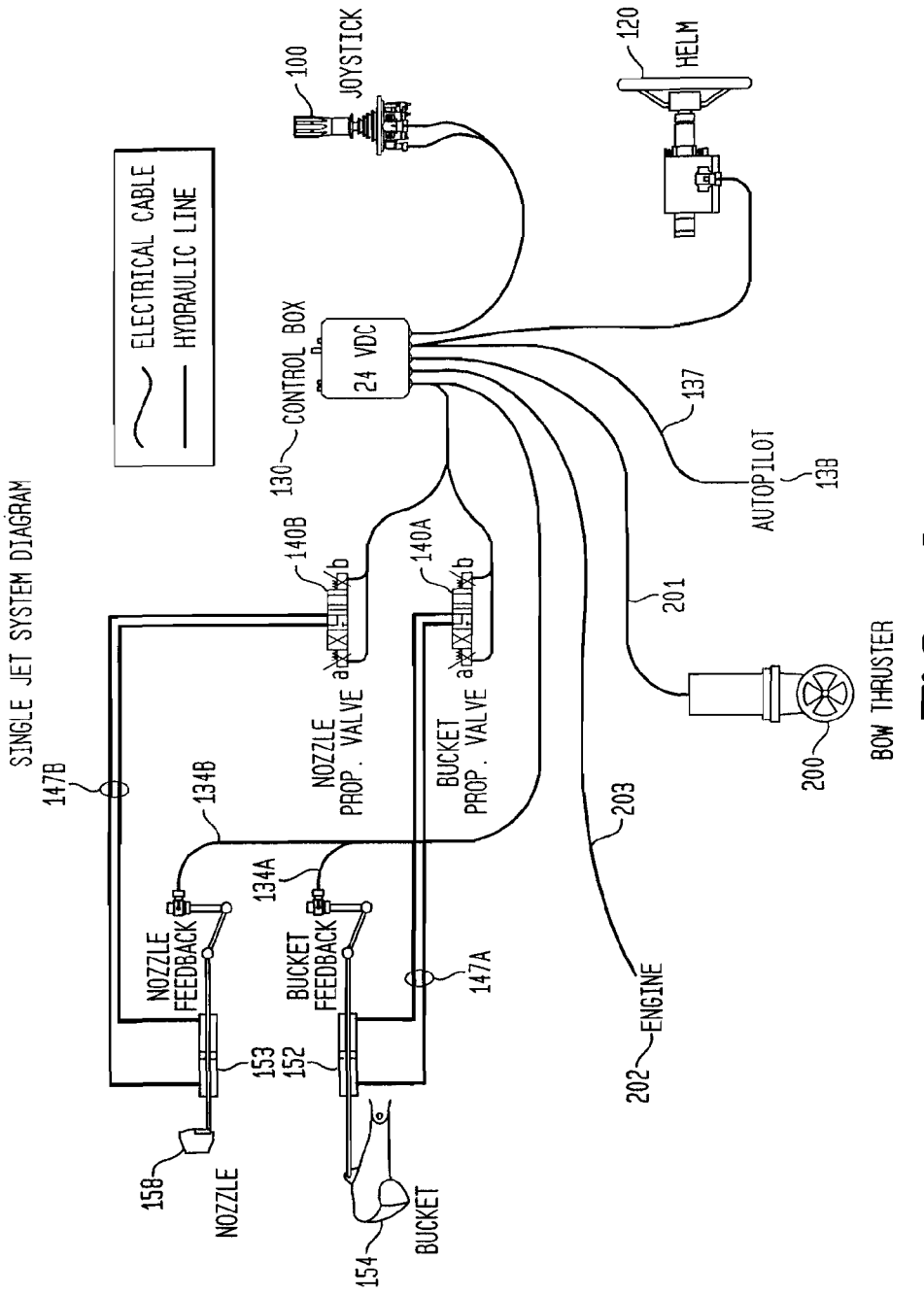
FIG. 6 illustrates an exemplary control system (cabling) diagram for a single waterjet propulsion system.

FIG. 6 illustrates an exemplary control system diagram for a single waterjet driven marine vessel having one associated steering nozzle and one associated reversing bucket as well as a bow thruster 200. The diagram illustrates a vessel control stick 100 joystick) and a helm 120 connected to provide vessel control signals to a control processor unit 130 (control box). The vessel control unit 130 provides actuator control signals to a number of devices and actuators and receives feedback signals from a number of actuators and devices. The figure only illustrates a few such actuators and devices, with the understanding that complete control of a marine vessel is a complex procedure that can involve any number of control apparatus (not illustrated) and depends on a number of operating conditions and design factors. Note that the figure is an exemplary cabling diagram, and as such, some lines are shown joined to indicate that they share a common cable, in this embodiment, and not to indicate that they are branched or carry the same signals.

One output signal of the control processor unit 130 is provided, on line 141A, to a reversing bucket proportional solenoid valve 140A. The bucket proportional solenoid valve 140A has coils, indicated by "a" and "b" that control the hydraulic valve ports to move fluid through hydraulic lines 147A to and from reversing bucket actuator 152. The reversing bucket actuator 152 can retract or extend to move the reversing bucket 154 up or down to appropriately redirect the waterjet stream and provide forward or reversing thrust.

Another output of the control processor unit 130, on line 141B, is provided to the nozzle proportional valve 140B. The nozzle proportional valve 140B has coils, indicated by "a" and "b" that control the hydraulic valve ports to move fluid through hydraulic lines 147B to and from nozzle actuator 153. The nozzle actuator 153 can retract or extend to move the nozzle 158 from side to side control the waterjet stream and provide a turning force.

Additionally, an output on line 203 of the control processor unit 130 provides an actuator control signal to control a prime mover, or engine 202. As stated earlier, an actuator may be any device or element able to actuate or set an actuated device. Here the engine's rotation speed (RPM) or another aspect of engine power or throughput may be so controlled using a throttle device, which may comprise any of a mechanical, e.g. hydraulic, pneumatic, or electrical device, or combinations thereof.

Also, a bow thruster 200 (sometimes referred to merely as a "thruster") is controlled by actuator control signal provided on output line 201 by the control processor unit 130. The actuator control signal on line 201 is provided to a bow thruster actuator to control the bow thruster 200. Again, the bow thruster actuator may be of any suitable form to translate the actuator control signal on line 201 into a corresponding movement or action or state of the bow thruster 200. Examples of thruster actions include speed of rotation of an impeller and/or direction of rotation of the impeller.

According to an aspect of some embodiments of the control system, an autopilot 138, as known to those skilled in the art, can provide a vessel control signal 137 to the control processor unit 130, which can be used to determine actuator control signals. For example, the autopilot 138 can be used to maintain a heading or a speed. It is to be appreciated that the autopilot 138 can also be integrated with the control processor unit 130 and that the control processor unit 130 can also be programmed to comprise the autopilot 138.

Figure 7:
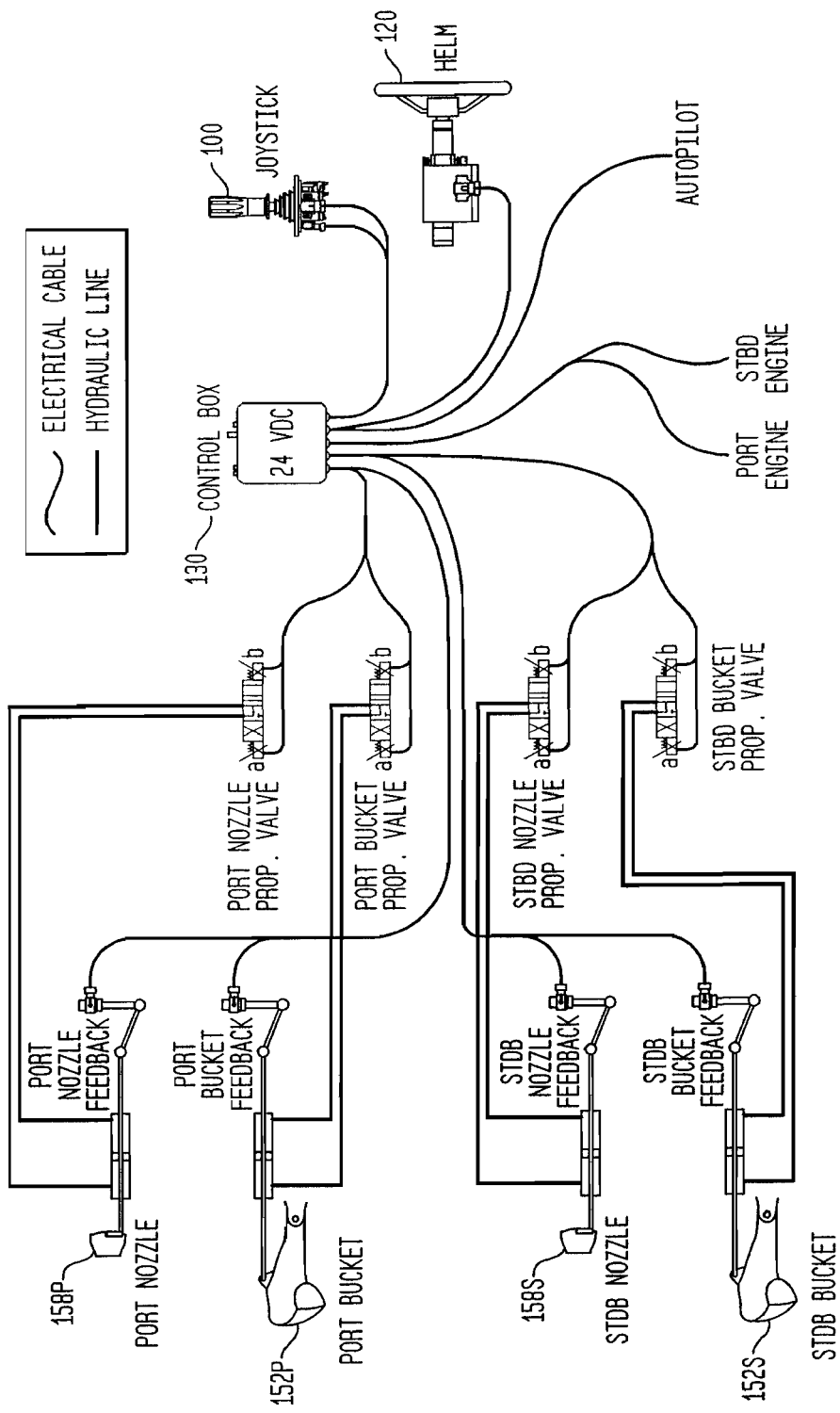
FIG. 7 illustrates an exemplary control system (cabling) diagram for a dual waterjet propulsion system.

FIG. 7 illustrates a control system for a marine vessel having two waterjets, two nozzles, 158P and 158S, and two reversing buckets, 152P and 152S. The operation of this system is similar to that of FIG. 6, and like parts have been illustrated with like reference numbers and a description of such parts is omitted for the sake of brevity. However, this embodiment of the control processor unit 130 generates more output actuator control signals based on the input vessel control signals received from vessel control apparatus 100 and 120. Specifically, the operation of a vessel having two or more waterjets, nozzles, reversing buckets, etc. use a different set of algorithms, for example, stored within control processor unit 130, for calculating or generating the output actuator control signals provided by the control processor unit 130. Such algorithms can take into account the design of the vessel, and the number and arrangement of the control surfaces and propulsion apparatus.

Figure 8:
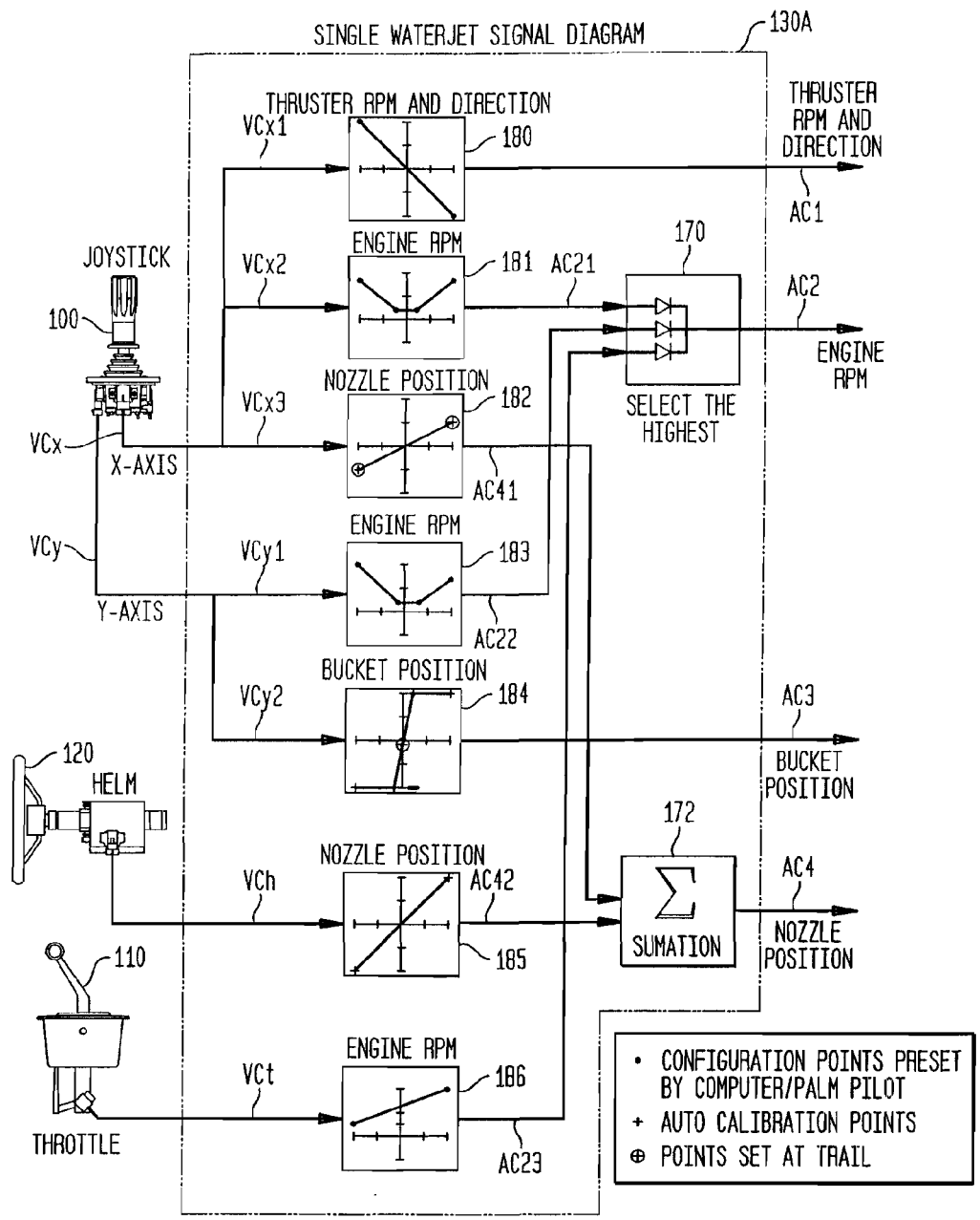
FIG. 8 illustrates an exemplary control processor unit and exemplary set of signals.

We now look at a more detailed view of the nature of the signals provided to and produced by the control processor unit 130. FIG. 8 illustrates a portion of a control processor unit 130A with a dashed outline, symbolically representing an exemplary set of signals and functions processed and provided by the control processor unit 130 for a marine vessel having a single waterjet propulsor apparatus. As described earlier, the control processor unit receives one or more input signals from one or more vessel control apparatus, e.g., 100, 110, and 120.

Control stick 100 is a joystick-type vessel control apparatus, having two degrees of freedom (x and y) which provide corresponding output vessel control signals VCx and VCy. Each of the vessel control signals VCx and VCy can be split into more than one branch, e.g. VCx1, VCx2 and VCx3, depending on how many functions are to be carried out and how many actuators are to be controlled with each of the vessel control signals VCx and VCy.

The helm 120 is a vessel control apparatus and has one degree of freedom and produces a vessel control signal VCh corresponding to motion of the helm wheel along a rotary degree of freedom (clockwise or counter-clockwise).

Throttle control 110 is a vessel control apparatus and has one degree of freedom and produces a vessel control signal VCt corresponding to motion of the throttle control 110 along a linear degree of freedom.

According to one aspect of the invention, each vessel control signal is provided to the control processor unit 130 and is used to produce at least one corresponding actuator control signal. Sometimes more than one vessel control signal are processed by control processor unit 130 to produce an actuator control signal.

According to the embodiment illustrated in FIG. 8, the x-axis vessel control signal VCx provided by the control stick 100 is split to control three separate device actuators: a bow thruster actuator, a prime mover engine RPM actuator and a waterjet nozzle position actuator (devices and actuators not shown). The vessel control signal VCx is split into three vessel control branch signals, VCx1, VCx2 and VCx3. The branch signals can be thought of as actually splitting up by a common connection from the main vessel control signal VCx or derived in some other way that allows the vessel control signal VCx to be used three times. Vessel control branch signal VCx1 is equal to the vessel control signal VCx and is input to a bow thruster RPM and direction module 180 that is adapted for calculating actuator signal AC1 to control the RPM and direction of motion of the bow thruster. In one embodiment of the bow thruster RPM and direction module 180, processor module 130A is provided with a look-up table (LUT) which determines the end-points of the functional relationship between the input vessel control branch signal VCx1 and the output actuator control signal AC1.

Processor module 130A may be one of several processing modules that comprise the control processor unit 130. Many other functions, such as incorporation of a feedback signal from one or more actuators can be performed by the processors 130, 130A as well. The signals shown to exit the processor module 130A are only illustrative and may be included with other signals to be processed in some way prior to delivery to an actuator. Note that in some embodiments of the processor module 130A there is no difference, or substantially no difference, between the vessel control signal VCx and the associated vessel control branch signals (e.g., VCx1, VCx2 and VCx3), and they will all be generally referred to herein as vessel control signals. One of skill in the art would envision that the exact signals input into the function modules of a control processor unit can be taken directly from the corresponding vessel control apparatus, or could be pre-processed in some way, for example by scaling through an amplifier or by converting to or from any of a digital signal and an analog signal using a digital-to-analog or an analog-to-digital converter.

While various embodiments described herein present particular implementations of the control processor unit 130 and the various associated modules which functionally convert input vessel control signals to actuator control signal outputs, it should be understood that the invention is not limited to these illustrative embodiments. For example, the modules and control processor unit 130 may be implemented as a processor comprising semiconductor hardware logic which executes stored software instructions. Also, the processor and modules may be implemented in specialty (application specific) integrated circuits ASICs, which may be constructed on a semiconductor chip. Furthermore, these systems may be implemented in hardware and/or software which carries out a programmed set of instructions as known to those skilled in the art.

The waterjet prime mover (engine) RPM is controlled in the following way. Vessel control branch signal VCx2, which is substantially equal to the vessel control signal VCx is provided to engine RPM module 181 that is adapted for calculating a signal AC21. In addition, vessel control signal VCy is used to obtain vessel control branch signal VCy1 that is provided to engine RPM module 183, which determines and provides an output signal AC22. Further, throttle control apparatus 110, provides vessel control signal VCt, that is provided to engine RPM module 186 that determines and provides an output signal AC23. The three signals AC21, AC22 and AC23 are provided to a selector 170 that selects the highest of the three signals. The highest of AC21, AC22 and AC23 is provided as the actuator control signal AC2 that controls the engine RPM. It is to be appreciated that, although engine RPM modules 181, 183 and 186 have been illustrated as separate modules, they can be implemented as one module programmed to perform all three functions, such as a processor programmed according to the three illustrated functions.

It should also be pointed out that the system described above is only exemplary. Other techniques for selecting or calculating actuator control signal AC2 are possible. For example, it is also possible to determine averages or weighted averages of input signals, or use other or additional input signals, such as feedback signals to produce AC2. It is also to be appreciated that, depending on the desired vessel dynamics and vessel design, other function modules and selectors may be implemented within control processor unit 130 as well.

As mentioned above, control stick 100 produces vessel control signal VCy when the control stick 100 is moved along the y-direction degree of freedom as previously mentioned. According to another aspect of this embodiment, reversing bucket position module 184 receives vessel control signal VCy and calculates the actuator control signal AC3. The signal AC3 is provided to the reversing bucket actuator (not shown). Signal AC3 may be an input to a closed-loop position control circuit wherein signal AC3 corresponds to a commanded position of the reversing bucket actuator, provided directly or indirectly, to cause the reversing bucket to be raised and lowered, as described earlier. Reference is made to FIG. 6, in which signals 134A and 134B are feedback signals from the reversing bucket actuator 152 and the nozzle actuator 153, respectively. More detailed descriptions of the construction and operation of closed-loop feedback circuits in marine vessel control systems are provided in the patent applications referenced earlier in this section, which are hereby incorporated by reference.

According to another aspect of the invention, input signals are taken from each of the control stick 100 and the helm 120 to operate and control the position of the waterjet nozzle (not shown). Vessel control signals VCx3 and VCh are provided to nozzle position modules 182 and 186, which generate signals AC41 and AC42 respectively. The signals AC41 and AC42 are summed in a summing module 172 to produce the nozzle position actuator control signal AC4. Note that the summing module 172 can be replaced with an equivalent or other function, depending on the application.

The previous discussion has illustrated that algorithms can be implemented within the control processor unit 130, and are in some embodiments carried out using function modules. This description is conceptual and should be interpreted generally, as those skilled in the art recognize the possibility of implementing such a processing unit in a number of ways. These include implementation using a digital microprocessor that receives the input vessel control signals or vessel control branch signals and performs a calculation using the vessel control signals to produce the corresponding output signals or actuator control signals. Also, analog computers may be used which comprise circuit elements arranged to produce the desired outputs. Furthermore, look-up tables containing any or all of the relevant data points may be stored in any fashion to provide the desired output corresponding to an input signal.

Key data points on the plots of the various functions relating the inputs and outputs of the function modules are indicated with various symbols, e.g. solid circles, plus signs and circles containing plus signs. These represent different modes of calibration and setting up of the functions and will be explained below.

Specific examples of the algorithms for generating the previously-described actuator control signals for single-waterjet vessels are given in FIGS. 9-11.

Figure 9A:
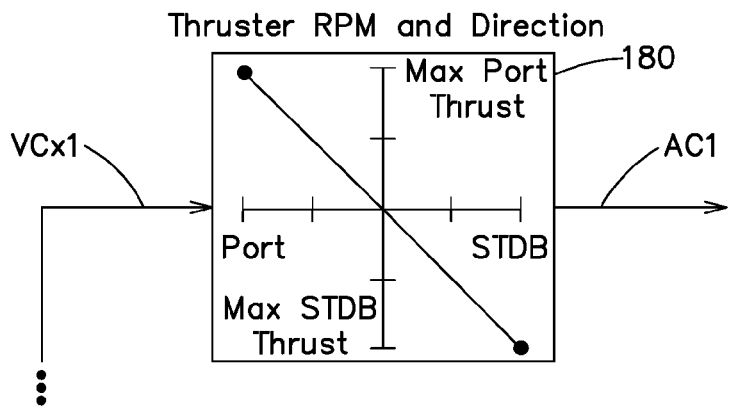
FIG. 9 illustrates an exemplary set of control functions and signals for a single waterjet vessel corresponding to motion of a control stick in the x-direction.

FIG. 9(a) illustrates the bow thruster RPM and direction module 180, the engine RPM module 181, and the nozzle position module 182 in further detail. Each of these modules receives as an input signals due to motion of the control stick 100 along the x-direction or x-axis. As mentioned before, such motion generates a vessel control signal VCx that is split into three signals VCx1, VCx2 and VCx3. The thruster RPM and direction of thrust module 180 converts vessel control branch signal VCx1 into a corresponding actuator control signal AC1. According to one embodiment of the invention, module 180 provides a linear relationship between the input VCx 1 and the output AC1. The horizontal axis shows the value of VCx1 with a neutral (zero) position at the center with port being to the left of center and starboard ("STBD") being to the right of center in the figure. An operator moving the control stick 100 to port will cause an output to generate a control signal to drive the bow thruster in a to-port direction. The amount of thrust generated by the bow thruster 200 (see FIG. 6) is dictated in part by the bow thruster actuator and is according to the magnitude of the actuator control signal AC1 along the y-axis in module 180. Thus, when no deflection of the control stick 100 is provided, zero thrust is generated by the bow thruster 200. Operation to-starboard is analogous to that described above in regard to the to-port movement.

Figure 9B:
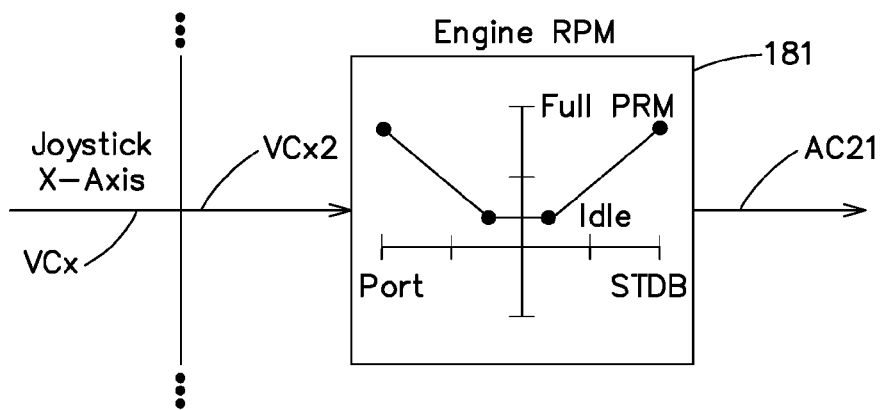

It is to be appreciated that the bow thruster 200 can be implemented in a number of ways. The bow thruster 200 can be of variable speed and direction or can be of constant speed and variable direction. The bow thruster 200 may also be an electrically-driven propulsor whose speed and direction of rotation are controlled by a signal which is proportional to or equal to actuator control signal AC1. The precise form of this function is determined by preset configuration points typically set at the factory FIG. 9(b) illustrates the relationship between waterjet prime mover engine RPM and the vessel control signal VCx2, according to one embodiment of the invention. Engine RPM module 181 receives vessel control signal (or branch signal) VCx2 and uses a group of pre-set data points relating the vessel control signal inputs to actuator control signal outputs to compute a response. Simply put, for control stick 100 movements near the neutral x=0 center position, engine RPM control module provides an engine RPM control signal having an amplitude that is minimal, and consists of approximately idling the engine at its minimal value. According to an aspect of this embodiment, this may be true for some interval of the range of the control stick 100 in the x-direction about the center position as shown in the figure, or may be only true for a point at or near the center position.

The figure also shows that, according to this embodiment of the module 181, moving the control stick 100 to its full port or full starboard position generates the respective relative maximum engine RPM actuator control signal AC21. While the figure shows the port and starboard signals as symmetrical, they may be asymmetrical to some extent if dictated by some design or operational constraint that so makes the vessel or its auxiliary equipment or load asymmetrical with respect to the x-axis. The precise form of this function is determined by preset configuration points typically set at the factory or upon installation.

Figure 9C:
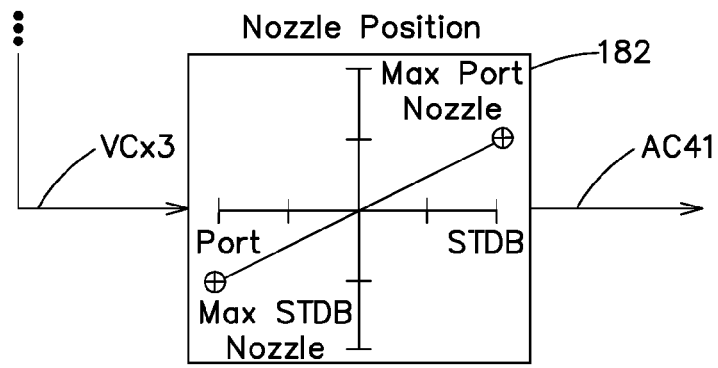

FIG. 9(c) illustrates the relation between the vessel control signal VCx3 and the discharge nozzle position according to one embodiment of the invention. Nozzle position module 182 generates an output actuator control signal AC41 based on the x-axis position of the control stick 100. The nozzle actuator (not shown) moves the nozzle in the port direction in proportion to an amount of deflection of the control stick 100 along the x-axis in the port direction and moves the nozzle in the starboard direction in proportion to an amount of deflection of the control stick 100 along the x-axis in the starboard direction. The precise function and fixed points therein are calibrated based on an optimum settings procedure and may be performed dock-side by the operator or underway, as will be described in more detail below.

Figure 10A:
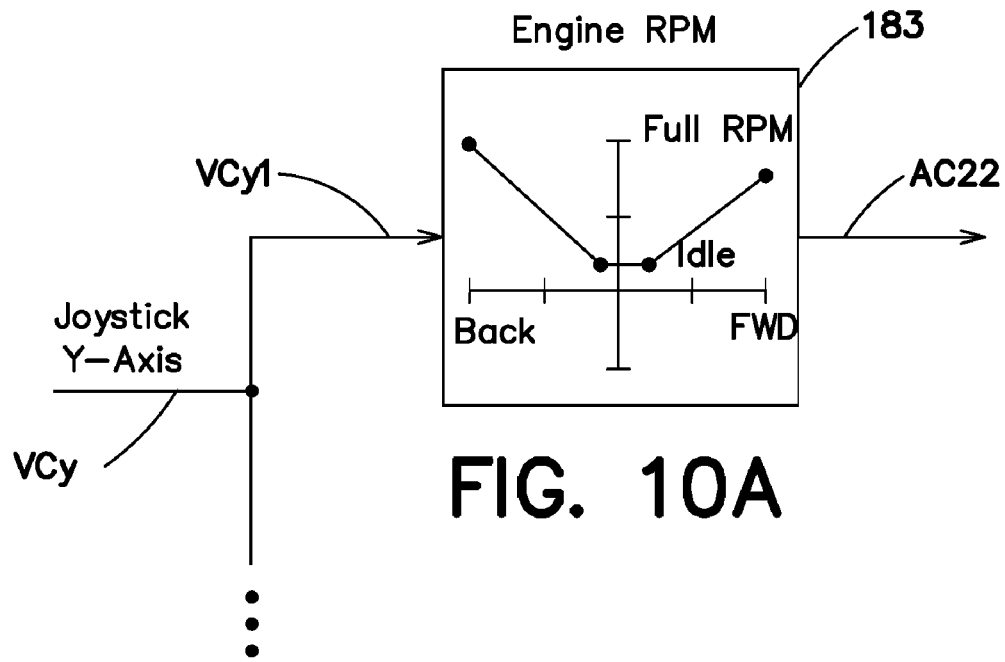
FIG. 10 illustrates an exemplary set of control functions and signals for a single waterjet vessel corresponding to motion of a control stick in the y-direction.

FIG. 10(a, b) illustrate the engine RPM module 183 and the bucket position module 184 in further detail. Each of these modules receives an input signal VCy taken from the control stick 100 when moved along the y-direction. FIG. 10(a) illustrates a vessel control branch signal VCy1 which is provided to engine RPM module 183, which in turn computes an output signal AC22. Said output signal AC22 provides a control signal AC2 to the waterjet engine RPM actuator (not shown). Signal AC22 is combined with other signals, as discussed earlier, to provide the actual actuator control signal AC2. According to this embodiment of the engine RPM module, the engine RPM is set to a low (idle) speed at or around the y=0 control stick position. Also, the extreme y-positions of the control stick result in relative maxima of the engine RPM. It should be pointed out that in this embodiment this function is not symmetrical about the y=0 position, due to a loss of efficiency with the reversing bucket deployed, and depends upon calibration of the system at the factory.

Figure 10B:
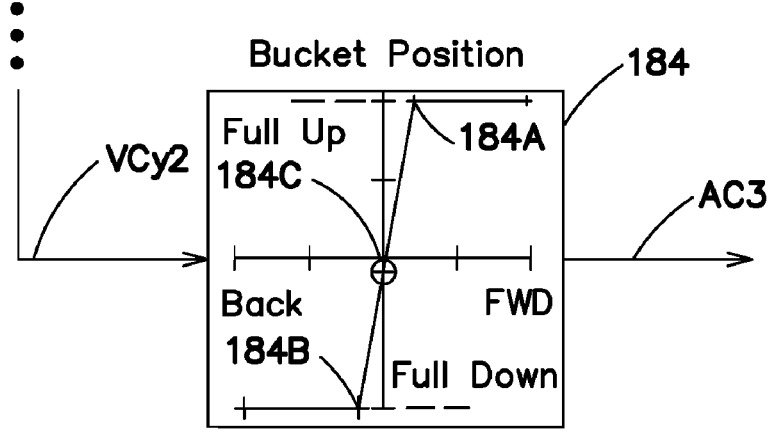

FIG. 10(b) illustrates the effect of control stick 100 movement along the y-axis on the reversing bucket position, according to one embodiment of the invention. A vessel control signal VCy2 is plotted on the horizontal axis depicting module 184. When moved to the "back" or aft position, actuator control signal AC3, provided by module 184, causes a full-down movement of the reversing bucket 154 (not shown), thus providing reversing thrust. When the control stick 100 is moved fully forward in the y-direction, actuator control signal AC3 causes a full-up movement of the reversing bucket 154. According to this embodiment, the reversing bucket 154 reaches its maximum up or down positions prior to reaching the full extreme range of motion in the y-direction of the control stick 100. These "shoulder points" are indicated for the up and down positions by numerals 184A and 184B, respectively. The piecewise linear range between points 184A and 184B approximately coincide with the idle RPM range of module 183. This allows for fine thrust adjustments around the neutral bucket position while higher thrust values in the ahead and astern directions are achieved by increasing the engine RPM when the control stick is moved outside of the shoulder points. It can be seen that in this and other exemplary embodiments the center y-axis position of control stick 100 is not necessarily associated with a zero or neutral reversing bucket position. In the case of the embodiment illustrated in FIG. 10(b), the zero y-axis position corresponds to a slightly down position 184C of the reversing bucket 154.

Figure 11A:
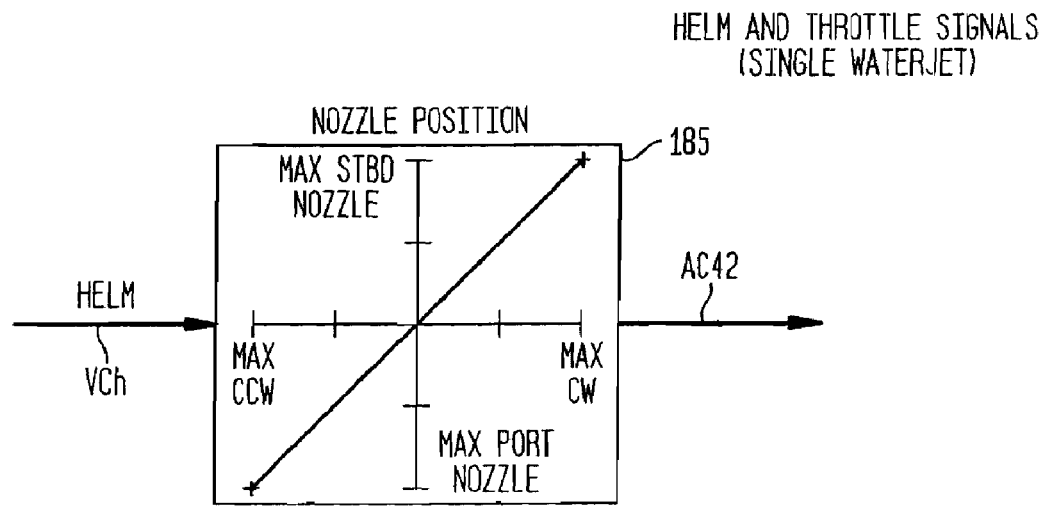
FIG. 11 illustrates an exemplary set of control functions and signals for a single waterjet vessel corresponding to motion of a throttle and helm control apparatus.

FIG. 11(a) illustrates the nozzle position function module 185 in further detail. This module receives an input from the vessel control signal VCh and provides as output the actuator control signal AC42. Nozzle position function module 185 determines output signal AC42 to be used in the control of the waterjet discharge nozzle 158 (not shown). The signal AC42 can be used as one of several components that are used to determine actuator control signal AC4, or, in some embodiments, can be used itself as the actuator control signal AC4. This embodiment of the nozzle position function module 185 has a linear relationship between the input signal VCh, received from the helm 120, and the output signal AC42, which can be determined by underway or dock-side auto calibration to select the end points of the linear function. Intermediate values can be computed using known functional relationships for lines or by interpolation from the two end points. Other embodiments are also possible and will be clear to those skilled in the art.

Figure 11B:
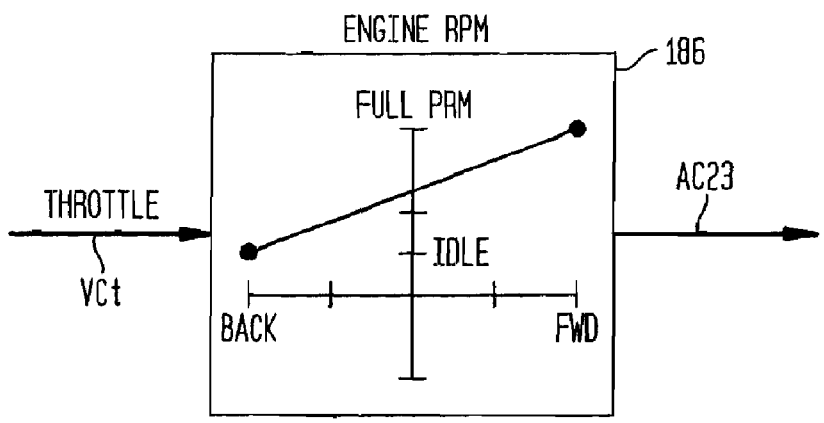

FIG. 11(b) illustrates the engine RPM function module 186 in further detail. The figure also illustrates the relationship between the throttle controller signal VCt and the engine RPM actuator signal AC23. As before, a vessel control signal VCt is taken from the vessel control apparatus (throttle controller) 110. The function module 186 converts the input signal VCt into an output signal AC23 which is used to determine the engine RPM actuator control signal AC2. In some embodiments, the throttle controller 110 has a full back position, which sends a signal to the engine RPM actuator to merely idle the engine at its lowest speed. At the other extreme, when the throttle controller 110 is in the full-ahead position, the engine RPM function module 186 provides a signal to the engine RPM actuator, which is instructed to deliver maximum engine revolutions. Note that according to one embodiment of the invention, the exact points on this curve are calibrated at the factory and are used in conjunction with other vessel control inputs to determine the final control signal that is sent to the engine RPM actuator AC2, as shown in FIG. 8.

In some embodiments, key points used in the plurality of functional modules are either pre-programmed at manufacture, or are selected and stored based on a dock-side or underway calibration procedure. In other embodiments, the key points may be used as parameters in computing the functional relationships, e.g. using polynomials with coefficients, or are the end-points of a line segment which are used to interpolate and determine the appropriate function output.

According to this embodiment of the control system, single waterjet vessel control is provided, as illustrated in FIG. 12. By way of example, three exemplary motions of the helm 120, and five exemplary motions of the control stick 100 are shown. The control stick 100 has two degrees of freedom (x and y). It is to be appreciated that numerous other helm 120 and control stick 100 positions are possible but are not illustrated for the sake of brevity. The figure shows the helm in the turn-to-port, in the ahead (no turning) and in the turn-to-starboard positions in the respective columns of the figure. The helm 120 can of course be turned to other positions than those shown.

FIG. 12(a) illustrates that if the control stick 100 is placed in the full ahead position and the helm 120 is turned to port then the vessel will turn to port. Because the control stick is in the +y position, and not moved along the x-direction, the bow thruster 200 is off (see FIG. 9(a)), the engine RPM is high (see FIG. 10(a), heavy waterjet flow is shown aft of vessel in FIG. 12(a)) and the reversing bucket is raised (see FIG. 10(b)). Engine RPM is high because the highest signal is selected by selector module 170. Because the helm is in the turn-to-port position (counter-clockwise) the steering nozzle 158 is in the turn-to-port direction (see FIG. 11(a)). It is to be appreciated that no separate throttle controller 110 is used or needed in this example. As illustrated in FIG. 12(a), the vessel moves along a curved path with some turning radius, as the helm control is turned.

Similarly, according to some control maneuvers, by placing the helm 120 in the straight ahead position while the control stick 100 is in the full ahead position, the vessel moves ahead in a straight line at high engine RPM with the reversing bucket 154 raised and the nozzle in the centered position. Helm 120 motion to starboard is also illustrated and is analogous to that as its motion to port and will not be described for the sake of brevity.

FIG. 12(b) illustrates operation of the vessel when the control stick 100 is placed in a neutral center position. When the helm 120 is turned to port, the steering nozzle 158 is in the turn-to-port position (see FIG. 11(a)) and the engine 200 is idle because the selector module 170 selects the highest RPM signal, which will be according to signal AC21 provided from engine RPM function module 181 (see FIG. 9(b) where no throttle is applied). The reversing bucket 154 is approximately in a neutral position that allows some forward thrust and reverses some of the waterjet stream to provide some reversing thrust. (see FIG. 10(b)). This reversing flow is deflected by the reversing bucket 154 to the left. The vessel substantially rotates about a vertical axis while experiencing little or no lateral or ahead/astern translation.

According to some maneuvers, by placing the helm 120 in the straight ahead position no motion of the vessel results. That is, no turning occurs, and the forward and backing thrusts are balanced by having the engine at low RPM and the reversing bucket 154 substantially in a neutral position. The reversed waterjet portion is split between the left and the right directions and results in no net force athwartships. Thus, no vessel movement occurs. Helm 120 motion to starboard is also illustrated and is analogous to that of port motion and is not described for the sake of brevity.

FIG. 12(c) illustrates vessel movement when the control stick 100 is moved to port. With the helm 120 in a counter-clockwise (port) position, the bow thruster 200 provides thrust to port (see FIG. 9(a)), the steering nozzle 158 is in the turn-to-port position (see FIG. 9(c)) and the engine RPM is at a high speed (see FIG. 9(b)). Again, the precise actuator control signals depend on the function modules, such as summing module 172, which sums signals from function modules 182 and 185. With the reversing bucket sending slightly more flow to the right than to the left, the vessel translates to the left and also rotates about a vertical axis. The engine RPM is high because selector module 170 selects the highest of three signals Similarly, the helm 120 can be placed in the straight ahead position, which results in the nozzle being to the right and the reversing bucket 154 in a middle (neutral) position. The bow thruster 200 also thrusts to port (by ejecting water to starboard). The net lateral thrust developed by the bow thruster 200 and that developed laterally by the waterjet are equal, so that the vessel translates purely to the left without turning about a vertical axis.

FIG. 12 also illustrates vessel movement with the control stick 100 moved to starboard for three positions of the helm 120. The resultant vessel movement is analogous to that movement described for motion in the port direction and is not herein described for the sake of brevity.

FIG. 12(d) illustrates vessel movement when the control stick 100 is placed in the backing (−y) direction. When the helm 120 is turned to port, the bow thruster 200 is off (x=0, see FIG. 9(a)), the engine RPM is high (see FIG. 10(a)—the highest signal is selected by selector 170), the reversing bucket 154 is in the full down position (see FIG. 10(b)) and deflects the flow to the left, and the nozzle is in the turn-to-port position (see FIG. 11(a)). The vessel moves in a curved trajectory backwards and to the right.

Similarly, according to some control modules, by placing the helm 120 in the straight ahead position, the reversing bucket 154 remains fully lowered but the nozzle is in the neutral position, so the reversing bucket deflects equal amounts of water to the right and to the left because the nozzle is centered. The bow thruster 200 remains off. Thus, the vessel moves straight back without turning or rotating. Helm 120 motion to starboard is also illustrated and is analogous to that for motion to port and thus will not be described herein.

It should be appreciated that the above examples of vessel movement are "compound movements" that in many cases use the cooperative movement of more than one device (e.g., propulsors, nozzles, thrusters, deflectors, reversing buckets) of different types. It is clear, e.g. from FIG. 12(c, d) that, even if only one single vessel control signal is provided (e.g., −y) of the control stick 100 along a degree of freedom of the control stick 100, a plurality of affiliated actuator control signals are generated by the control system and give the vessel its overall movement response. This is true even without movement of the helm 120 from its neutral position.

It should also be appreciated that in some embodiments the overall movement of the vessel is in close and intuitive correspondence to the movement of the vessel control apparatus that causes the vessel movement. Some embodiments of the present invention can be especially useful in maneuvers like docking.

It should also be appreciated that the algorithms, examples of which were given above for the vessel having a single waterjet propulsor, can be modified to achieve specific final results. Also, the algorithms can use key model points from which the response of the function modules can be calculated. These key model points may be pre-assigned and pre-programmed into a memory on the control processor unit 130 or may be collected from actual use or by performing dock-side or underway calibration tests, as will be described below.

Figure 32:
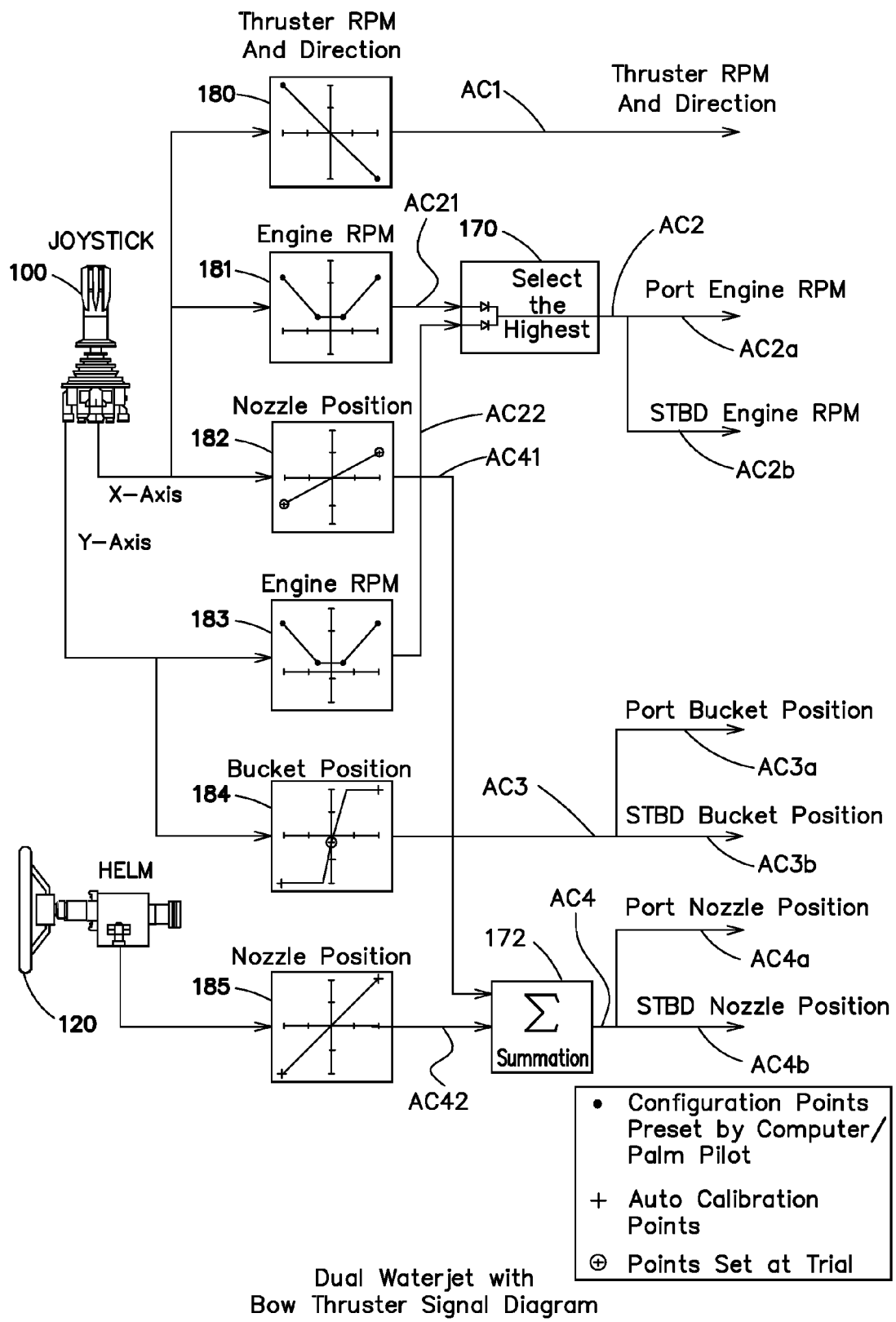
FIG. 32 illustrates a signal diagram of another embodiment of a marine vessel control system for a vessel comprising dual waterjets and bow thruster.

It should be further appreciated that the single waterjet comprising a single nozzle and single reversing bucket described in FIGS. 8-12 can be modified to drive a marine vessel with two waterjets comprising two nozzles and two reversing buckets as shown in FIG. 32 It is to be understood that FIG. 32 has many of the same components as FIG. 8, that these components have been numbered with either identical or similar reference numbers and that the description of each of the components of FIG. 32 has not been duplicated here for the sake of brevity. It is also to be appreciated that although there is no throttle 110 illustrated in FIG. 32 (See FIG. 8), that such a throttle can be part of the control system, as well as other controllers used in the art. In addition, it is to be appreciated that any or all of the joystick 100, helm 120, and throttle 110, can be replaced with an interface to a remote control system that receives any or all of control signals such as any or all of net transverse translational thrust commands, net forward or reverse translational thrust commands, and net rotational thrust commands, and which can combine and translate these signals into either or both of a net translational and/or net rotational thrust commands. In the embodiment of FIG. 32, the output of the nozzle position module 185 is split into two signals AC4a and AC4b, which drive the port and starboard nozzles. Similarly, the output of the bucket position module 184 is split into two signals AC3a and AC3b, which drive the port and starboard bucket positions. and Similarly, the output of the engine rpm module 183 and selector 170, which selects the highest signal, is split into two signals AC2a and AC2b, which drive the port and starboard engines. With such an arrangement, there is provided a control system for a marine vessel having a bow thruster and two waterjets comprising two nozzles and two reversing buckets. It should also be appreciated that the two waterjets can be replaced with three or more waterjets comprising corresponding nozzles and reversing buckets, and controlled in a similar fashion by splitting the Signals AC2, AC3, and AC4 into a like number of signals.

As mentioned previously and as illustrated, e.g., in FIG. 3, a marine vessel may have two or more waterjet propulsors, e.g. 150P and no bow thruster. A common configuration is to have a pair of two waterjet propulsors, each having its own individually controlled prime mover, pump, reversing bucket, and steering nozzle, e.g., 158. A reversing bucket, e.g. 154, is coupled to each propulsor 150P as well, and the reversing buckets, e.g. 154, may be of a type fixed to the steering nozzle and rotating therewith (not true for the embodiment of FIG. 3), or they may be fixed to a waterjet housing or other part that does not rotate with the steering nozzles 158 (as in the embodiment of FIG. 3).

The following description is for marine vessels having two propulsors and no bow thruster, and can be generalized to more than two propulsors, including configurations that have different types of propulsors, such as variable-pitch propellers or other waterjet drives.

Figure 13A:
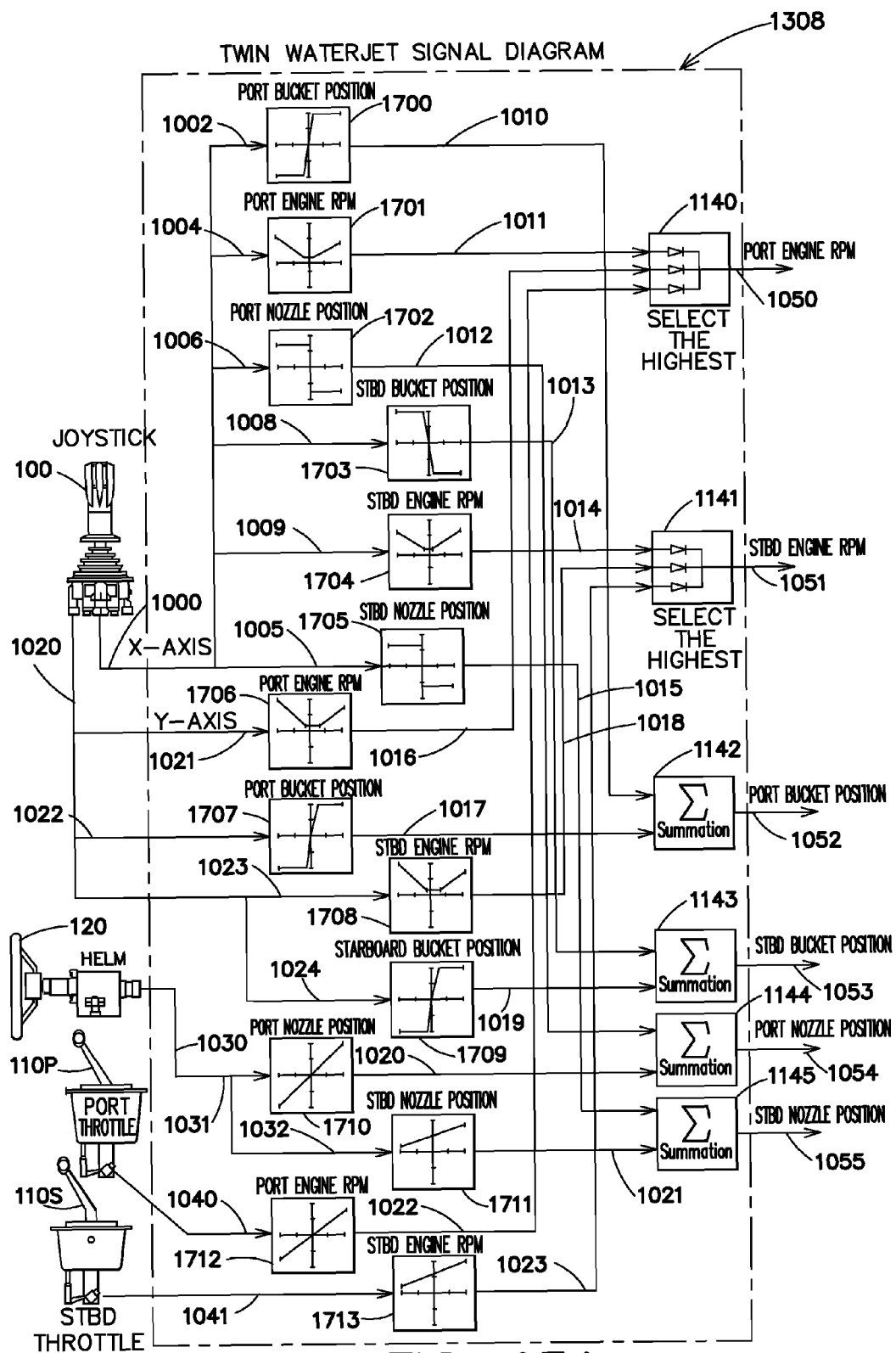
FIG. 13A illustrates a signal diagram an exemplary marine vessel control system for a dual waterjet vessel.

FIG. 13A illustrates a signal diagram for an exemplary vessel control system controlling a set of two waterjet propulsors and associated nozzles and reversing buckets. This example does not use a bow thruster for maneuvering as in the previous example having only one waterjet propulsor, given in FIG. 8.

Control stick 100 has two degrees of freedom, x and y, and produces two corresponding vessel control signals 1000 and 1020, respectively. The vessel control signals 1000 and 1020 are fed to several function modules through branch signals as discussed earlier with regard to FIG. 8. In the following discussion of FIG. 13A it should be appreciated that more than one vessel control signal can be combined to provide an actuator control signal, in which case the individual vessel control signals may be input to the same function modules or may each be provided to an individual function module. In the figure, and in the following discussion, there is illustrated separate function modules for each vessel control signal, for the sake of clarity. Note that in the event that more than one signal is used to generate an actuator control signal, a post-processing functional module, such as a summer, a selector or an averaging module is used to combine the input signals into an output actuator control signal.

The x-axis vessel control signal 1000 provides an input to each of six function modules: function module 1700, which calculates a signal 1010, used in controlling the port reversing bucket position actuator; function module 1701, which calculates a signal 1011, used in controlling the port engine RPM actuator; function module 1702, which calculates a signal 1012, used in controlling the port nozzle position actuator; function module 1703, which calculates a signal 1013, used in controlling the starboard reversing bucket position actuator; function module 1704, which calculates a signal 1014, used in controlling the starboard engine RPM actuator; and function module 1705, which calculates a signal 1015, used in controlling the starboard nozzle position actuator.

Note that some of the signals output from the function modules are the actuator control signals themselves, while others are used as inputs combined with additional inputs to determine the actual actuator control signals. For example, the port and starboard engine RPM actuators receive a highest input signal from a plurality of input signals provided to selector modules 1140, 1141, as an actuator control signal for that engine RPM actuator.

The y-axis vessel control signal 1020 provides an input to each of four function modules: function module 1706, which calculates a signal 1016, used in controlling the port engine RPM actuator; function module 1707, which calculates a signal 1017, used in controlling the port reversing bucket position actuator; function module 1708, which calculates a signal 1018, used in controlling the starboard engine RPM actuator; and function module 1709, which calculates a signal 1019, used in controlling the starboard reversing bucket position actuator.

Helm vessel control apparatus 120 delivers a vessel control signal to each of two function modules: function module 1710, which calculates a signal 1020, used in controlling the port nozzle position actuator and function module 1711, which calculates a signal 1021, used in controlling the starboard nozzle position actuator.

Two separate throttle control apparatus are provided in the present embodiment. A port throttle controller 110P, which provides a vessel control signal 1040 as an input to function module 1712. Function module 1712 calculates an output signal 1022, based on the vessel control signal 1040, that controls the engine RPM of the port propulsor. Similarly, a starboard throttle controller 110S, provides a vessel control signal 1041 as an input to function module 1713. Function module 1713 calculates an output signal 1023, based on the vessel control signal 1041, that controls the engine RPM of the starboard propulsor.

As mentioned before, more than one intermediate signal from the function modules or elsewhere can be used in combination to obtain the signal that actually controls an actuator. Here, a selector module 1140 selects a highest of three input signals, 1011, 1016 and 1022 to obtain the port engine RPM actuator control signal 1050. A similar selector module 1141 selects a highest of three input signals, 1014, 1018 and 1023 to obtain the starboard engine RPM actuator control signal 1051.

Additionally, a summation module 1142 sums the two input signals 1010 and 1017 to obtain the port reversing bucket position actuator control signal 1052. Another summation module 1143 sums the two input signals 1013 and 1019 to obtain the starboard reversing bucket position actuator control signal 1053. Yet another summation module 1144 sums the two input signals 1012 and 1020 to obtain the port nozzle position actuator control signal 1054, and summation module 1145 sums the two input signals 1015 and 1021 to obtain the starboard nozzle position actuator control signal 1055.

Figure 13B:
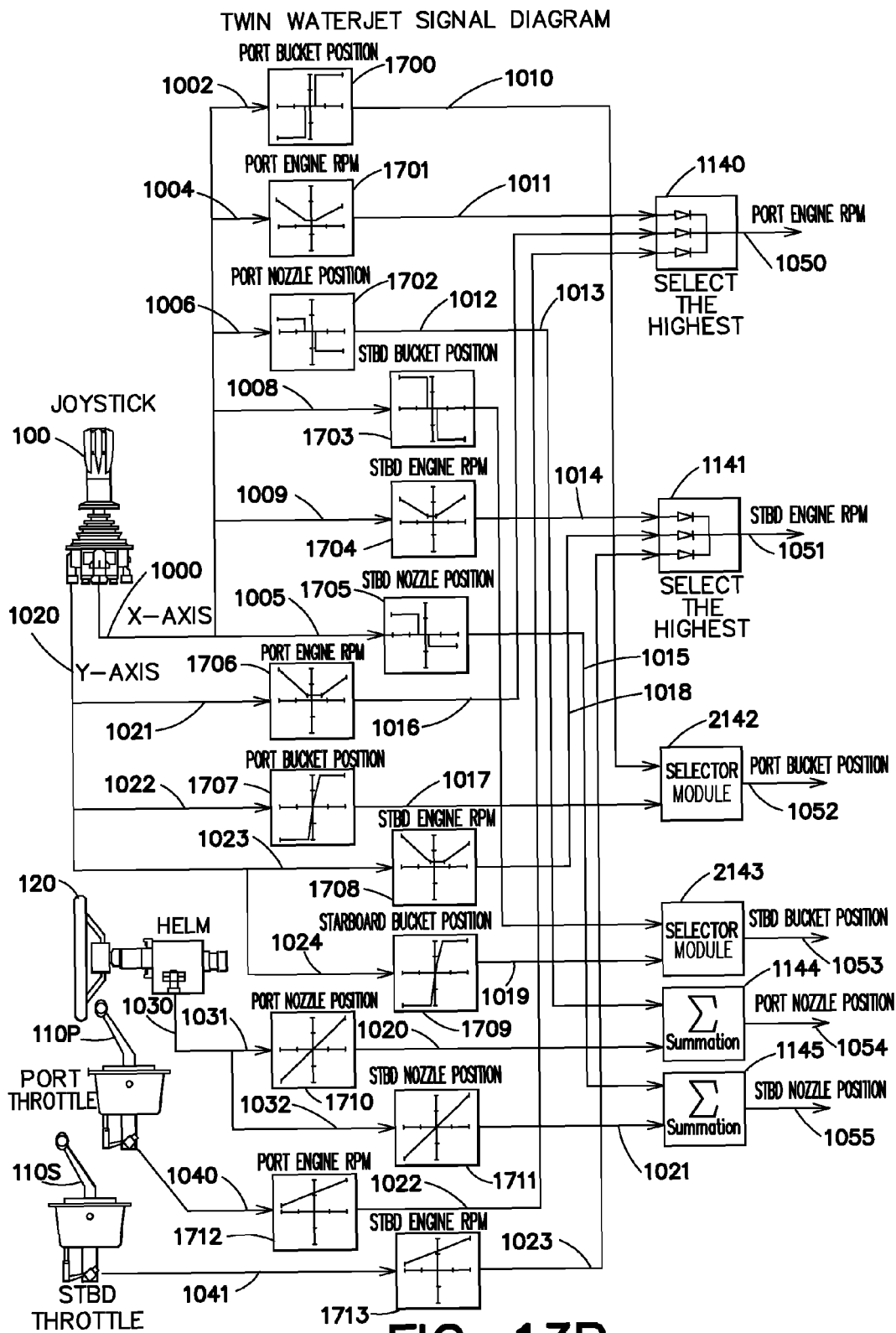
FIG. 13B illustrates a signal diagram of another embodiment of a marine vessel control system for a dual waterjet vessel.
Figure 13C:
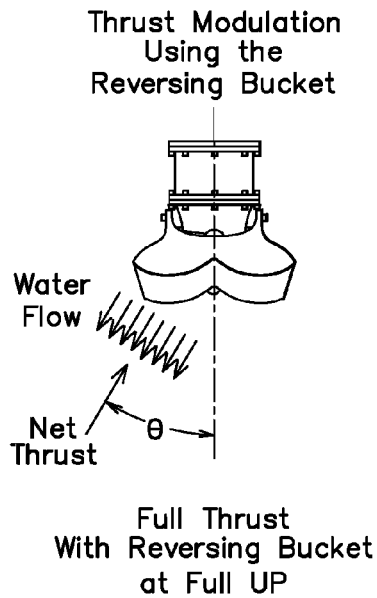
FIGS. 13C-13D illustrate thrust modulation of a vessel using the reversing, in part, to accommodate the thrust modulation according to some embodiments.
Figure 13E:
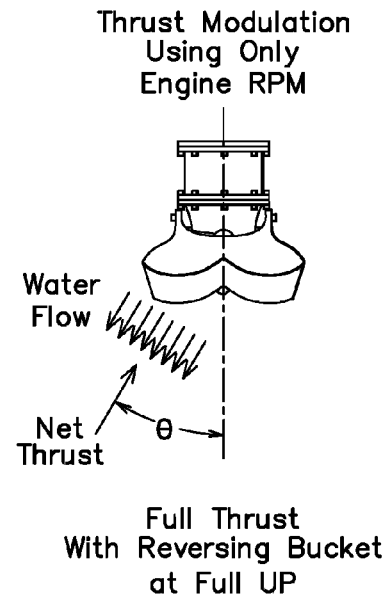
FIGS. 13E-13F illustrate thrust modulation of a vessel using engine RPMs only and without using, in part, the reversing bucket.
Figure 13D:
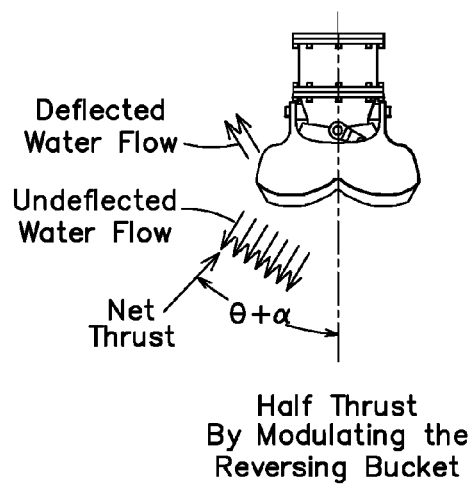
Figure 13F:
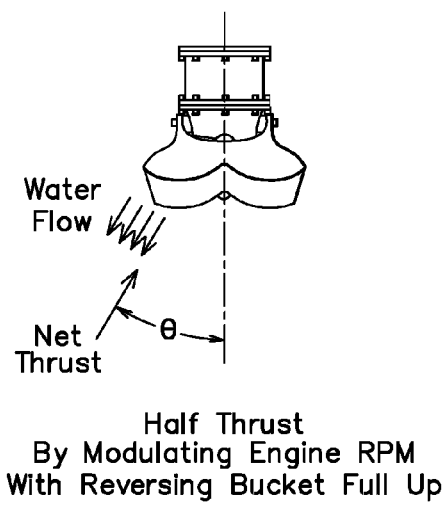
Figure 13G:
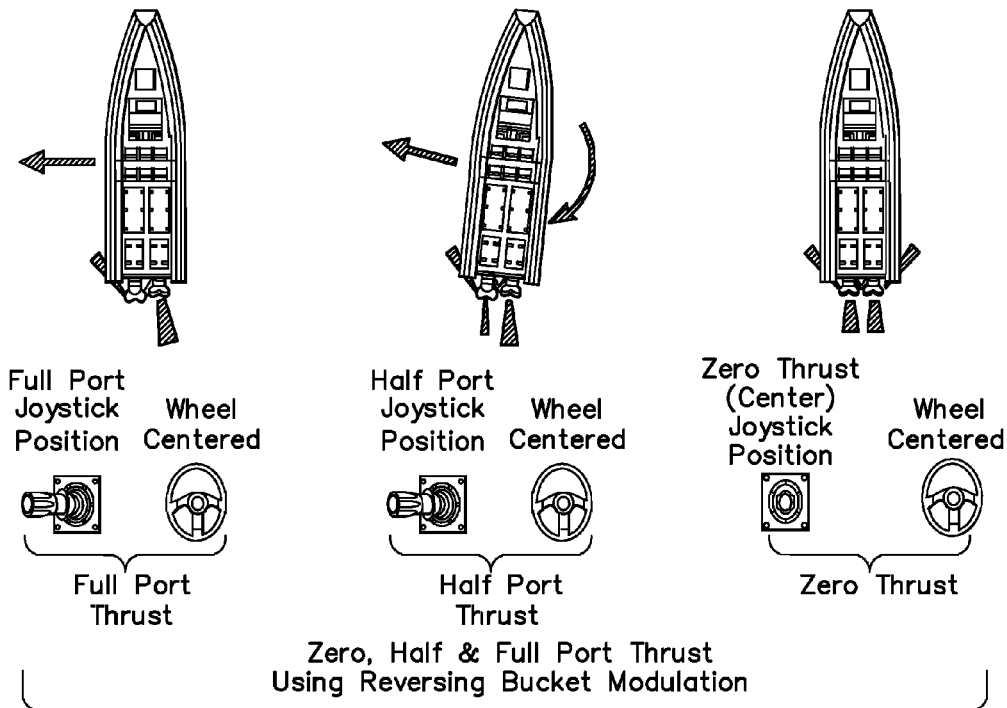
FIG. 13G illustrates resulting vessel movement when modulating the thrust according to the technique illustrated in FIGS. 13C-13D.
Figure 13H:
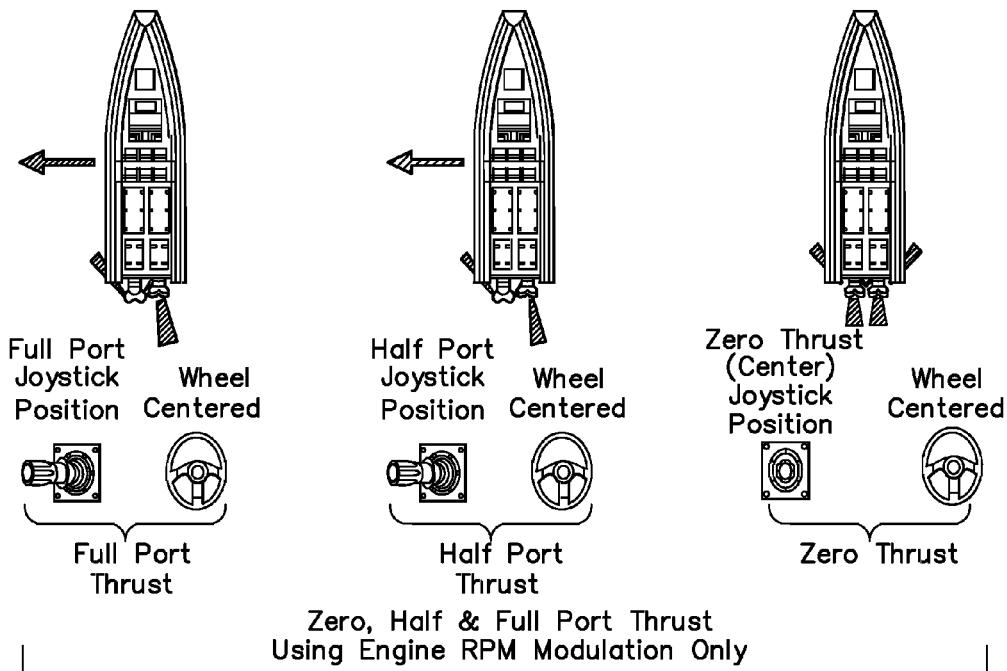
FIG. 13H illustrates resulting vessel movement when modulating the thrust according to the technique illustrated in FIGS. 13E-13F.

FIG. 13B illustrates a signal diagram of another embodiment of a marine vessel control system for a dual waterjet vessel. In this embodiment, the reversing bucket position (port and starboard reversing buckets) is configured by modules 1700, 1703 with respect to movement of the joystick 100 in the X-axis to two discrete positions, fully up and fully down. The output signals of these 1700, 1703 modules, which correspond to bucket position when commanding a translational thrust with a side component, is fed to selector modules 2142, 12143, on lines 1010 and 1013, which select between these signals and the signals from port and starboard bucket position modules 1707, 1709, which correspond to bucket when commanding only a fore-aft translational thrust (no side component). The selector module selects between these input signals to outputs port and starboard bucket actuator signals on lines 1052, 1053, based on whether there is a translational thrust command with a side component or no side component. In particular, the selection module provides the output signals which are the signals on lines 1010 and 1013 when there is a side component and the signals on lines 1017 and 1019 when there is no side component. In addition, the engine rpm for the port and starboard engines are varied, by port engine rpm module 1701 and starboard engine rpm module 1704, to vary proportionally with respect to the x-axis. Referring to FIGS. 13E-F, this embodiment has an advantage in that the for-aft thrust component (the engine RPM's) can be modulated (varied for example from full thrust as illustrated in FIG. 13E to half thrust as illustrated in FIG. 13F) with the reversing bucket at a fixed position, such as full up position, and the nozzle(s) at an angle Θ (presumably required to hold a steady heading of the vessel due to external influences such as water current and/or wind) without effecting the net thrust angle Θ of the waterjet. In contrast, referring to FIGS. 13C-D, it has been found that for the embodiments where the reversing bucket is also used to assist in varying the thrust of the vessel movement, for example where the reversing bucket is moved from a full up position at full thrust as illustrated in FIG. 13C, to a half thrust position that includes movement of the reversing bucket as illustrated in FIG. 13D, the split-flow geometry of the laterally fixed reversing buckets prevents them from modulating the net thrust magnitude of an individual waterjet without affecting the net thrust angle of the waterjet, thereby resulting in some additional net thrust angle +α at the waterjet, resulting in a total net thrust angle of Θ+α at the waterjet. An advantage according to this embodiment, is that by keeping the reversing buckets stationary while modulating engine RPM only (as illustrated in FIGS. 13E & 13F), the control system and hence the operator are able to vary the net thrust magnitude applied to the vessel without applying any unwanted rotational force, thereby resulting in movement of the vessel as illustrated in FIG. 13H. In contrast, referring to FIG. 13G, it has been found that for the embodiments where the reversing bucket is also used to assist in varying the thrust of the vessel movement, when the net thrust angle changes (as illustrated in FIG. 13D), the net rotational moment applied to the vessel is effected. If the vessel is holding a steady heading (no net rotational movement), an unwanted rotational forces applied to the vessel will cause the vessel to rotate when not commanded to do so. This phenomenon is illustrated in FIG. 13G which illustrates in particular that the craft is translating to port with no net rotational force (i.e., holding a steady heading) when commanding Full Port thrust. However, when the joystick is moved strictly in the starboard direction to command half port thrust, an unwanted rotational moment is applied to the vessel, causing an uncommanded heading change.

Figure 14A:
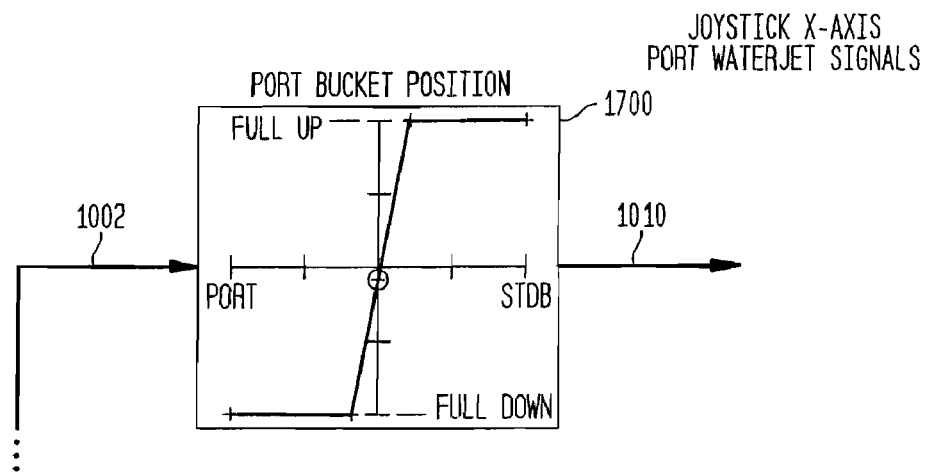
FIGS. 14A-C illustrate an exemplary set of (port) control functions and signals of the vessel control system corresponding to motion of a control stick in the x-direction, for a dual waterjet vessel.
Figure 14B:
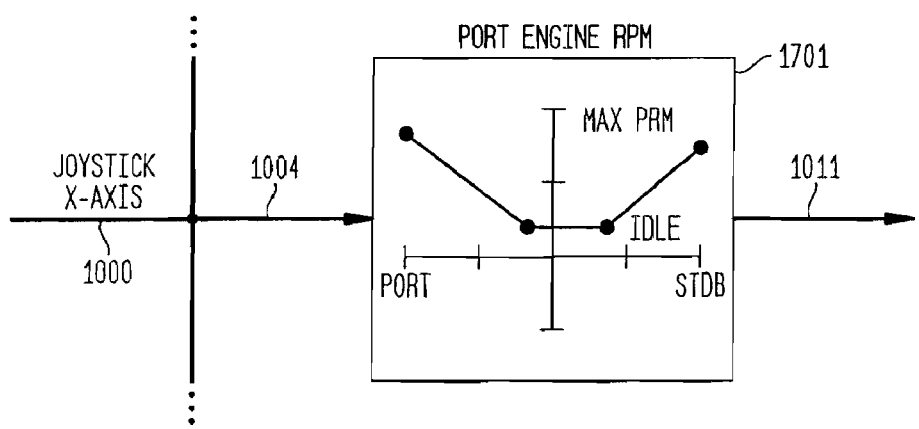
Figure 14C:
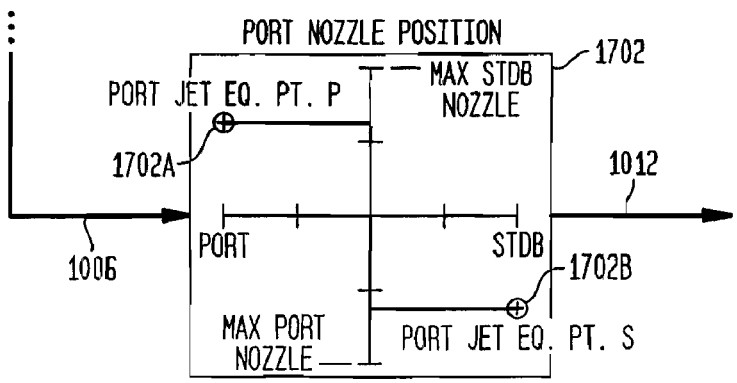

FIGS. 14A-C illustrate, in more detail, the details of the algorithms and functions of FIG. 13A used to control the port reversing bucket actuator (FIG. 14A), the port engine RPM actuator (FIG. 14B) and the port nozzle position actuator (FIG. 14C). Three branch vessel control signals 1002, 1004 and 1006 branch out of vessel control signal 1000 corresponding to a position of the control stick 100 along the x-axis degree of freedom. The branch vessel control signals 1002, 1004 and 1006 are input to respective function modules 1700, 1701 and 1702, and output signals 1010, 1011 and 1012 are used to generate respective actuator control signals, as described with respect to FIG. 13A above.

As described previously, the x-axis degree of freedom of the control stick 100 is used to place the port reversing bucket approximately at the neutral position when the joystick is centered, and motion to starboard will raise the bucket and motion to port will lower the bucket (FIG. 14A). The setpoint 1700A is determined from an underway or free-floating calibration procedure to be the neutral reversing bucket position such that the net thrust along the major axis is substantially zero. Movement of the control stick 100 along the x-axis in the port direction affects nozzle, engine RPM and reversing bucket actuators. Optimum points for the port nozzle position (FIG. 14C), 1702A and 1702B, are determined by dock-side or underway calibration as in obtaining point 1700A. Points 1702A and 1702B are of different magnitudes due to the geometry of the reversing bucket and different efficiency of the propulsion system when the reversing bucket is deployed compared to when the reversing bucket is not deployed.

Port engine RPM is lowest (idling) when the control stick 100 x-axis position is about centered. Port engine RPM is raised to higher levels when the control stick 100 is moved along the x-axis degree of freedom (FIG. 14B). The setpoints indicated by the dark circles are set at the factory or configured at installation, based on, e.g., vessel design parameters and specifications.

Figure 14D:
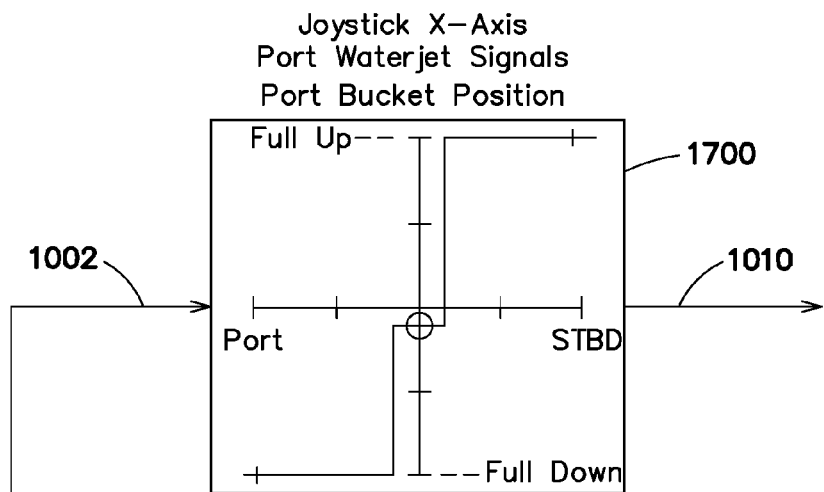
FIGS. 14D-F illustrate another exemplary set of (port) control functions and signals of the vessel control system corresponding to motion of a control stick in the x-direction, for a dual waterjet vessel.
Figure 14E:
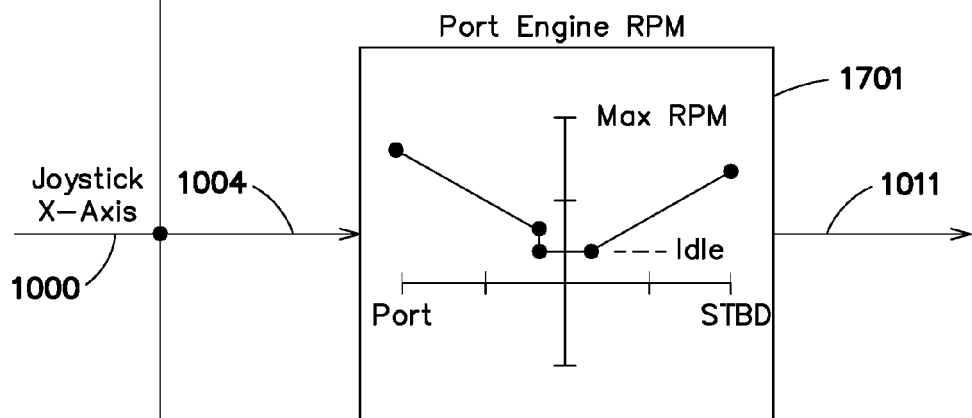
Figure 14F:
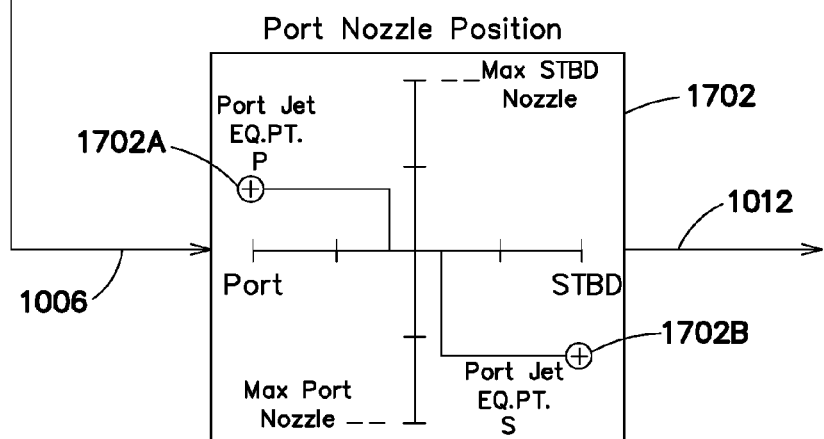

FIGS. 14D-F illustrate, in more detail, the details of the algorithms and functions of the embodiment of FIG. 13B used to control the port reversing bucket actuator (FIG. 14D), the port engine RPM actuator (FIG. 14E) and the port nozzle position actuator (FIG. 14F). As discussed above with respect to FIGS. 14A-C, three branch vessel control signals 1002, 1004 and 1006 branch out of vessel control signal 1000 corresponding to a position of the control stick 100 along the x-axis degree of freedom. The branch vessel control signals 1002, 1004 and 1006 are input to respective function modules 1700, 1701 and 1702, and output signals 1010, 1011 and 1012 are used to generate respective actuator control signals, as described with respect to FIG. 13B above.

The x-axis degree of freedom of the control stick 100 is used to place the port reversing bucket approximately at the neutral position when the joystick is centered, motion to starboard outside the deadband will raise the bucket to a single up position, and motion to port will lower the bucket to a single down position (FIG. 14A-E). The setpoint 1700A can, for example, be determined from an underway or free-floating calibration procedure to be the neutral reversing bucket position such that the net thrust along the major axis is substantially zero. Movement of the control stick 100 along the x-axis in the port direction affects nozzle, engine RPM and reversing bucket actuators, as illustrated. Optimum points for the port nozzle position (FIG. 14F), 1702A and 1702B, can, for example, be determined by dock-side or underway calibration as in obtaining point 1700A. Points 1702A and 1702B may be of the same magnitude or may be of different magnitudes due to the geometry of the reversing bucket and different efficiency of the propulsion system when the reversing bucket is deployed compared to when the reversing bucket is not deployed.

Referring to FIG. 14E, the port engine RPM is lowest (idling) when the control stick 100 x-axis position is about centered. Port engine RPM is raised to higher levels when the control stick 100 is moved along the X-axis degree of freedom, to in combination with the port bucket position, introduce no rotation movement to the vessel, as discussed above. The setpoints indicated by the dark circles are set at the factory or configured at installation, based on, e.g., vessel design parameters and specifications. According to this embodiment, as illustrated in FIG. 14E, the port engine RPM can be stepped up abruptly when moved beyond the port threshold of the center dead band, corresponding to the reversing bucket in the full down position. This can be done to compensate for any difference in thrust efficiencies between the reversing bucket in the full up and full down positions. One advantage of having the step only when the waterjet is reversing is that the lower reversing efficiency with the bucket in the full down position is compensated for even with small thrust commands.

Figure 15A:
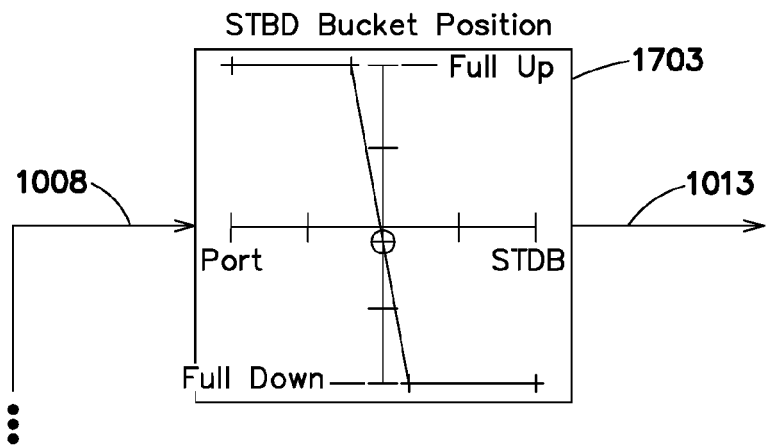
FIGS. 15A-C illustrate an exemplary set of (starboard) control functions and signals of the vessel control system corresponding to motion of a control stick in the x-direction, for a dual waterjet vessel.
Figure 15B:
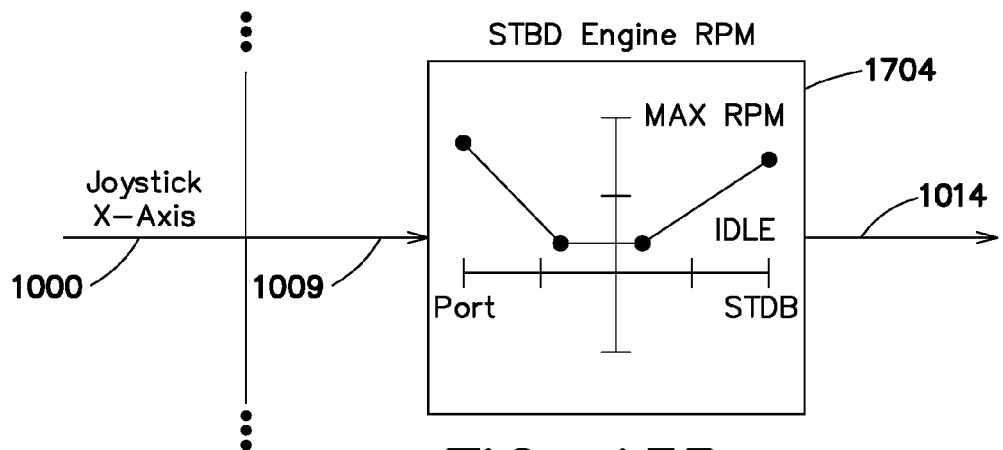
Figure 15C:
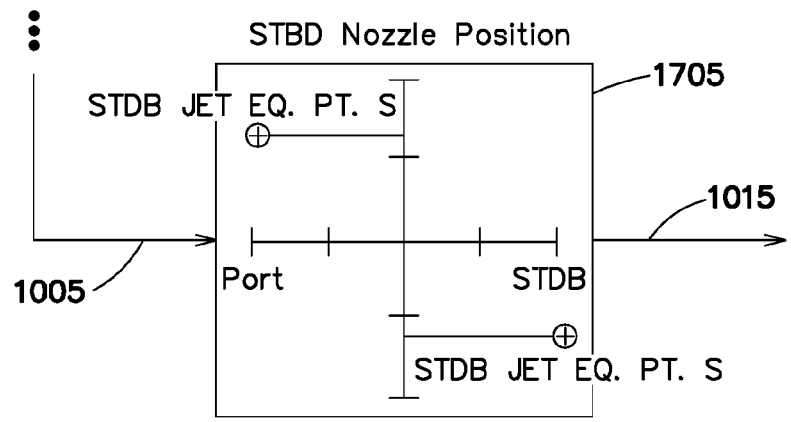

FIGS. 15A-C, illustrate in more detail the algorithms and functions of the embodiment of the vessel control system of FIG. 13A, used to control the starboard reversing bucket actuator (FIG. 15A), the starboard engine RPM actuator (FIG. 15B) and the starboard nozzle position actuator (FIG. 15C). The operation of the starboard reversing bucket, the starboard engine rpm, and the starboard nozzle position are similar to that of the port reversing bucket, the port engine rpm and the port nozzle position discussed above with respect to FIGS. 14A-C. In particular, the three branch vessel control signals 1008, 1009 and 1005 branch out of vessel control signal 1000 (in addition to those illustrated in FIG. 14A-C, above) corresponding to a position of the control stick 100 along the x-axis degree of freedom. The branch vessel control signals 1008, 1009 and 1005 are input to respective function modules 1703, 1704 and 1705, and output signals 1013, 1014 and 1015 are used to generate respective actuator control signals, as described with respect to FIG. 13A, above. The calibration points and functional relationship between the output signals and the vessel control signal are substantially analogous to those described above with respect to FIGS. 14A-C, and are not discussed in detail again here for the sake of brevity.

Figure 15D:
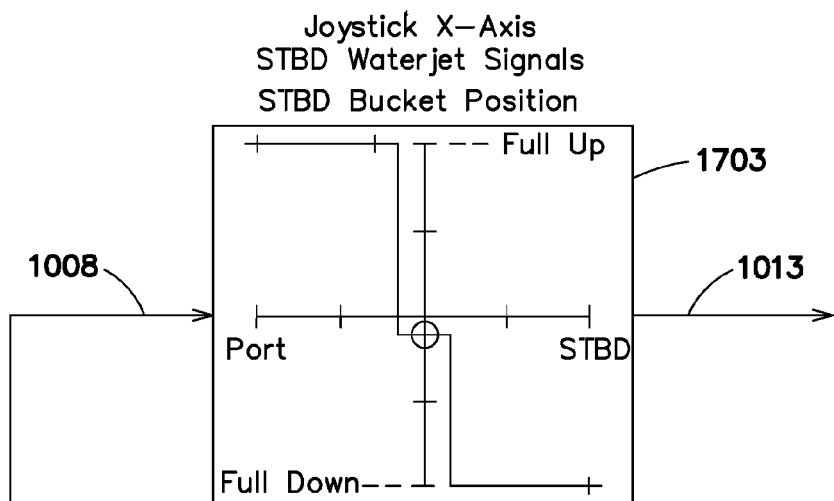
FIGS. 15D-F illustrates another exemplary set of (starboard) control functions and signals of the vessel control system corresponding to motion of a control stick in the x-direction, for a dual waterjet vessel.
Figure 15E:
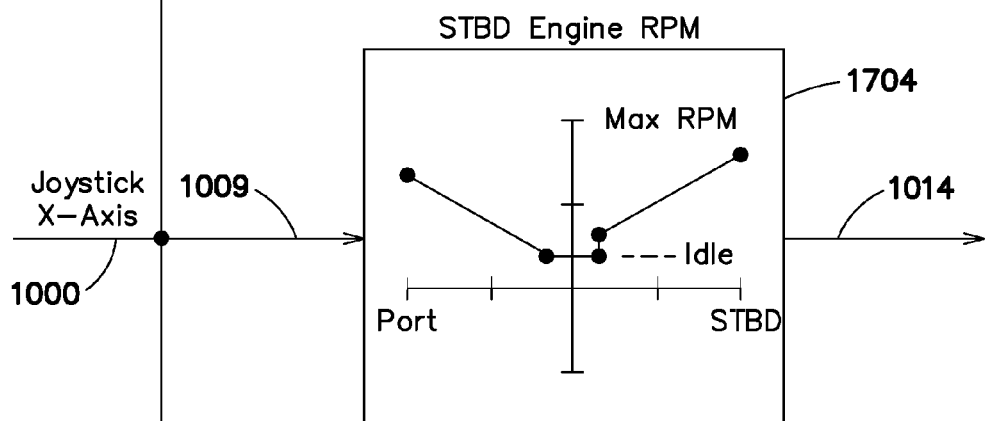
Figure 15F:
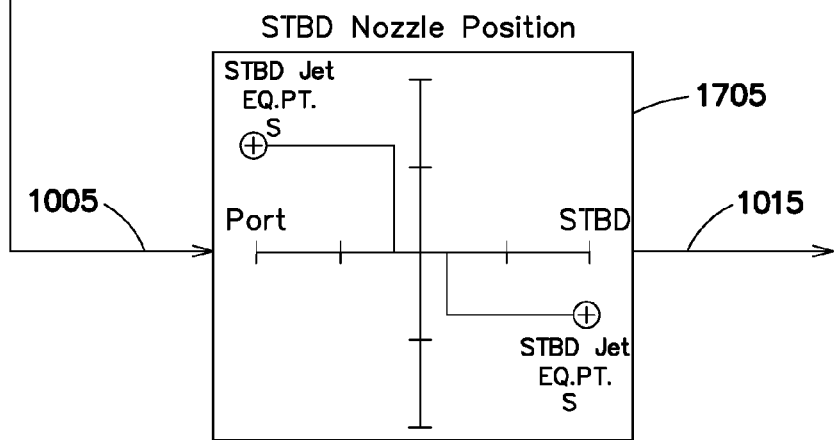

FIGS. 15D-F, illustrate in more detail the algorithms and functions of the embodiment of the vessel control system of FIG. 13B, used to control the starboard reversing bucket actuator (FIG. 15D), the starboard engine RPM actuator (FIG. 15E) and the starboard nozzle position actuator (FIG. 15F). The operation of the starboard reversing bucket, the starboard engine rpm, and the starboard nozzle position are similar to that of the port reversing bucket, the port engine rpm and the port nozzle position discussed above with respect to FIGS. 14D-F. In particular, the three branch vessel control signals 1008, 1009 and 1005 branch out of vessel control signal 1000 (in addition to those illustrated in FIGS. 14D-F, above) corresponding to a position of the control stick 100 along the x-axis degree of freedom. Also as discussed above with respect to FIG. 14E, according to this embodiment, as illustrated in FIG. 15E, the port engine RPM can be stepped up abruptly when moved beyond the port threshold of the center dead band, corresponding to the reversing bucket in the full down position. This can be done to compensate for any difference in thrust efficiencies between the reversing bucket in the full up and full down positions. One advantage of having the step only when the waterjet is reversing is that the lower reversing efficiency with the bucket in the full down position is compensated for even with small thrust commands. The branch vessel control signals 1008, 1009 and 1005 are input to respective function modules 1703, 1704 and 1705, and output signals 1013, 1014 and 1015 are used to generate respective actuator control signals, as described with respect to FIG. 13A, above. The calibration points and functional relationship between the output signals and the vessel control signal are substantially analogous to those described above with respect to FIGS. 14A-C, and are not discussed in detail again here for the sake of brevity.

Figures 16A, 16B:
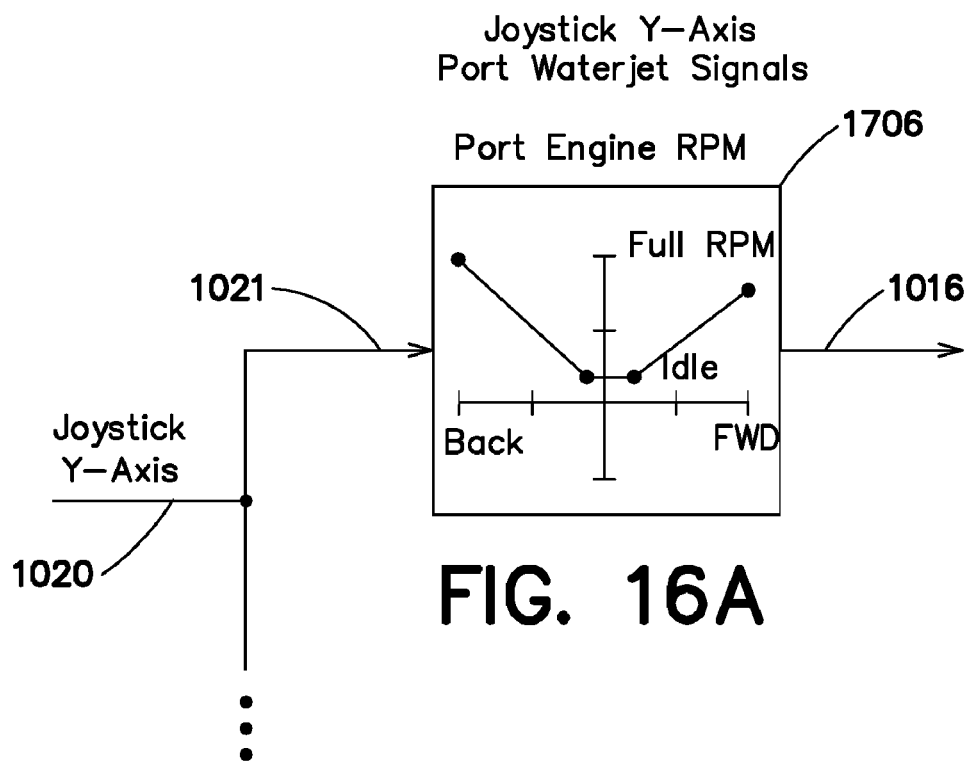
FIG. 16 illustrates an exemplary set of (port) control functions and signals for a dual waterjet vessel corresponding to motion of a control stick in the y-direction.

FIG. 16 illustrates the algorithms for generating control signals to control the port engine RPM actuator (FIG. 16(*a*)) and the port reversing bucket position actuator (FIG. 16(*b*)). Control stick 100 can move along the y-axis to provide vessel control signal 1020, which branches into signals 1021 and 1022, respectively being inputs to function modules 1706 and 1707. Function modules 1706 and 1707 calculate output signals 1016 and 1017, which are respectively used to control the port engine RPM actuator and the port reversing bucket position actuator of the system illustrated in FIG. 13. The port engine RPM varies between approximately idle speed in the vicinity of zero y-axis deflection to higher engine RPMs when the control stick 100 is moved along the y-axis degree of freedom (FIG. 16(*a*)). The port reversing bucket 154P is nominally at a neutral thrust position when the control stick 100 y-axis is in its zero position, and moves up or down with respective forward and backward movement of the control stick 100 (FIG. 16(*b*)).

Figure 17A:
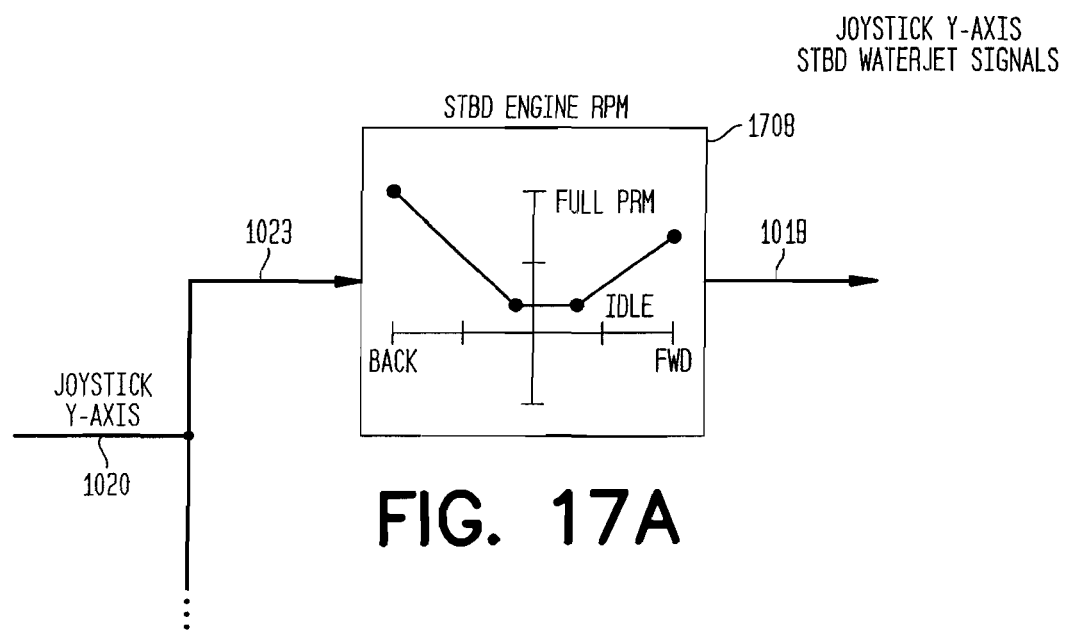
FIG. 17 illustrates an exemplary set of (starboard) control functions and signals for a dual waterjet vessel corresponding to motion of a control stick in the y-direction.
Figure 17B:
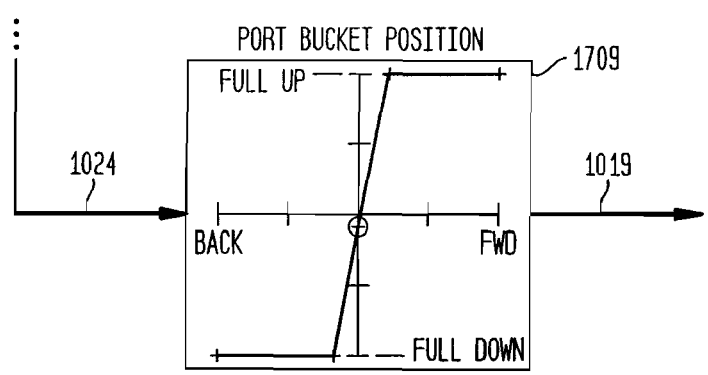

FIG. 17 illustrates the algorithms for generating control signals to control the starboard engine RPM actuator (FIG. 17(*a*)) and the starboard reversing bucket position actuator (FIG. 17(*b*)). Control stick 100 provides vessel control signal 1020 for movement along the y-axis, which branches into signals 1023 and 1024, respectively being inputs to function modules 1708 and 1709. Function modules 1708 and 1709 calculate output signals 1018 and 1019, which are respectively used to control the starboard engine RPM actuator and the starboard reversing bucket position actuator of the system illustrated in FIG. 13. The starboard engine RPM varies between approximately idle speed in the vicinity of zero y-axis deflection to higher engine RPMs when the control stick 100 is moved along the y-axis degree of freedom (FIG. 17(*a*)). The starboard reversing bucket 154S is nominally at a neutral thrust position when the control stick 100 y-axis is in its zero position, and moves up or down with respective forward and backward movement of the control stick 100 (FIG. 17(*b*)).

Figure 18A:
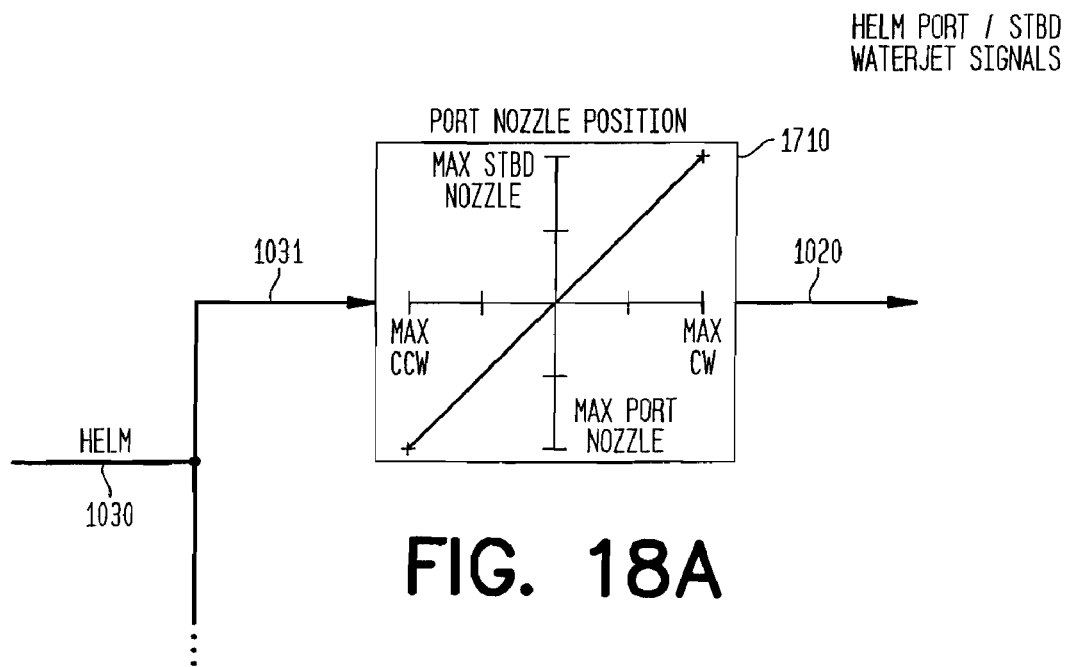
FIG. 18 illustrates an exemplary set of control functions and signals for a dual waterjet vessel corresponding to motion of a helm control apparatus.
Figure 18B:
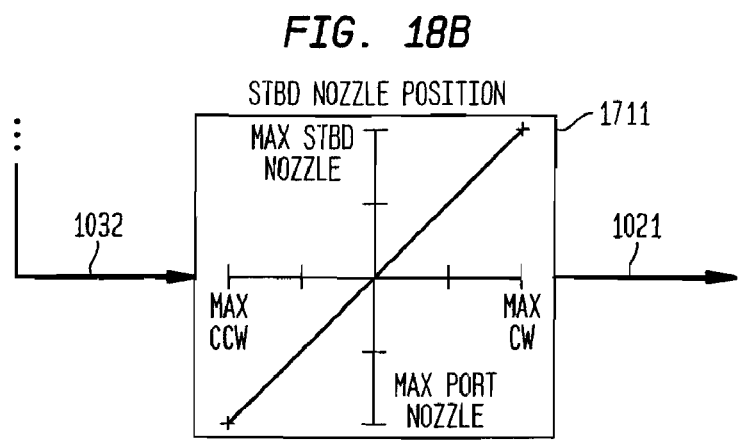

FIG. 18 illustrates the algorithms for generating control signals to control the port and starboard steering nozzle position actuators (FIGS. 18(a) and (b), respectively). Helm control 120 provides vessel control signal 1030, which branches into signals 1031 and 1032, respectively being inputs to function modules 1710 and 1711. Function modules 1710 and 1711 calculate linear output signals 1020 and 1021, which are respectively used to control the port and starboard steering nozzle position actuators of the system illustrated in FIG. 13.

Movement of the helm 120 n the clockwise direction results in vessel movement to starboard. Movement of the helm 120 in the counter-clockwise direction results in vessel movement to port. The functional relationships of FIGS. 18(a) and (b) are illustrative, and can be modified or substituted by those skilled in the art, depending on the application and desired vessel response.

Figure 19A:
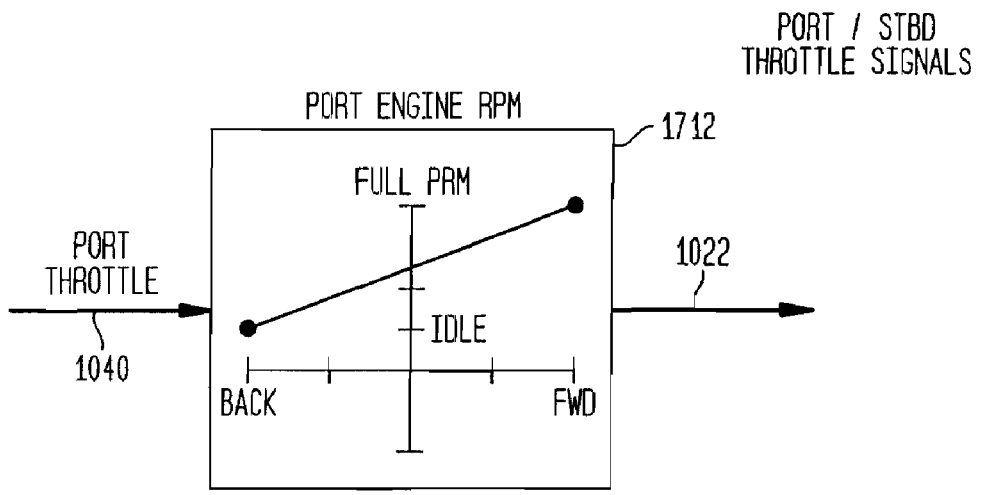
FIG. 19 illustrates an exemplary set of control functions and signals for a dual waterjet vessel corresponding to motion of a throttle control apparatus.

FIG. 19(a) illustrates the algorithm for generating a control signal used to control the port engine RPM actuator. Port throttle controller 110P generates a vessel control signal 1040 that is input to function module 1712. Function module 1712 determines a linear relation between input vessel control signal 1040 and output signal 1022. Thus, with the throttle in a full reverse position, the port engine actuator is in an idle position and with the throttle in the full forward position the port engine is at maximum RPM. The output signal 1022 is used as an input to provide the port engine RPM actuator control signal 1050, as illustrated in FIG. 13.

Figure 19B:
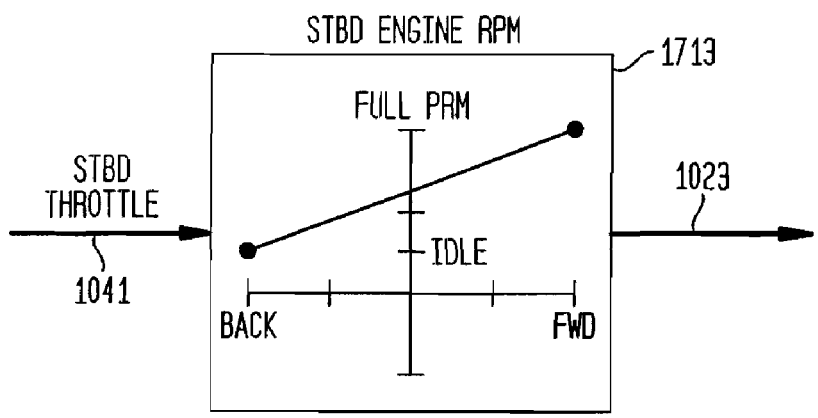

FIG. 19(b) illustrates the algorithm for generating a control signal used to control the starboard engine RPM actuator. Starboard throttle controller 110S generates a vessel control signal 1041 that is input to function module 1713. Function module 1713 determines a linear relation between input vessel control signal 1041 and output signal 1023. This relationship is substantially similar to that of the port engine RPM actuator. The output signal 1023 is used as an input to provide the starboard engine RPM actuator control signal 1051, as illustrated in FIG. 13.

FIG. 20 illustrates a number of exemplary overall actual vessel motions provided by the control system described in FIG. 13 for a vessel having two propulsors with steering nozzles, two reversing buckets and no bow thruster.

FIG. 20(a) illustrates movement of the vessel to port along a curved path when the control stick 100 is in the forward (+y) and the helm 120 is in the turn-to-port position. If the helm 120 is placed in the straight ahead position the vessel moves forward only. If the helm 120 is turned clockwise the vessel moves to starboard FIG. 20(b) illustrates movement of the vessel when the control stick 100 is in the neutral center position. If the helm 120 is turned to port, the vessel rotates about a vertical axis to port. If the helm 120 is in the straight ahead position, no net vessel movement is achieved. Helm 120 motion to starboard is analogous to that for motion to port and will not be described for the sake of brevity.

FIG. 20(c) illustrates movement of the vessel when the control stick 100 is in the to-port position (−x). If the helm 120 is in the turn-to-port position then the vessel both rotates to port about a vertical axis and translates to port. If the helm 120 is in the straight ahead position then the vessel merely translates to port without net forward or rotation movement. Again, helm 120 motion to starboard is analogous to that for motion to port and will not be described for the sake of brevity. FIG. 20 also illustrates movement of the vessel when the control stick 100 is moved to the right (+x position).

FIG. 20(d) illustrates movement of the vessel when the control stick 100 is moved back in the (−y) direction. Here the vessel moves backwards and to the right if the helm 120 is in the to-port position, and the vessel moves straight back if the helm 120 is in the straight ahead position. Helm 120 motion to starboard is analogous to that for motion to port and will not be described for the sake of brevity.

Figure 30:
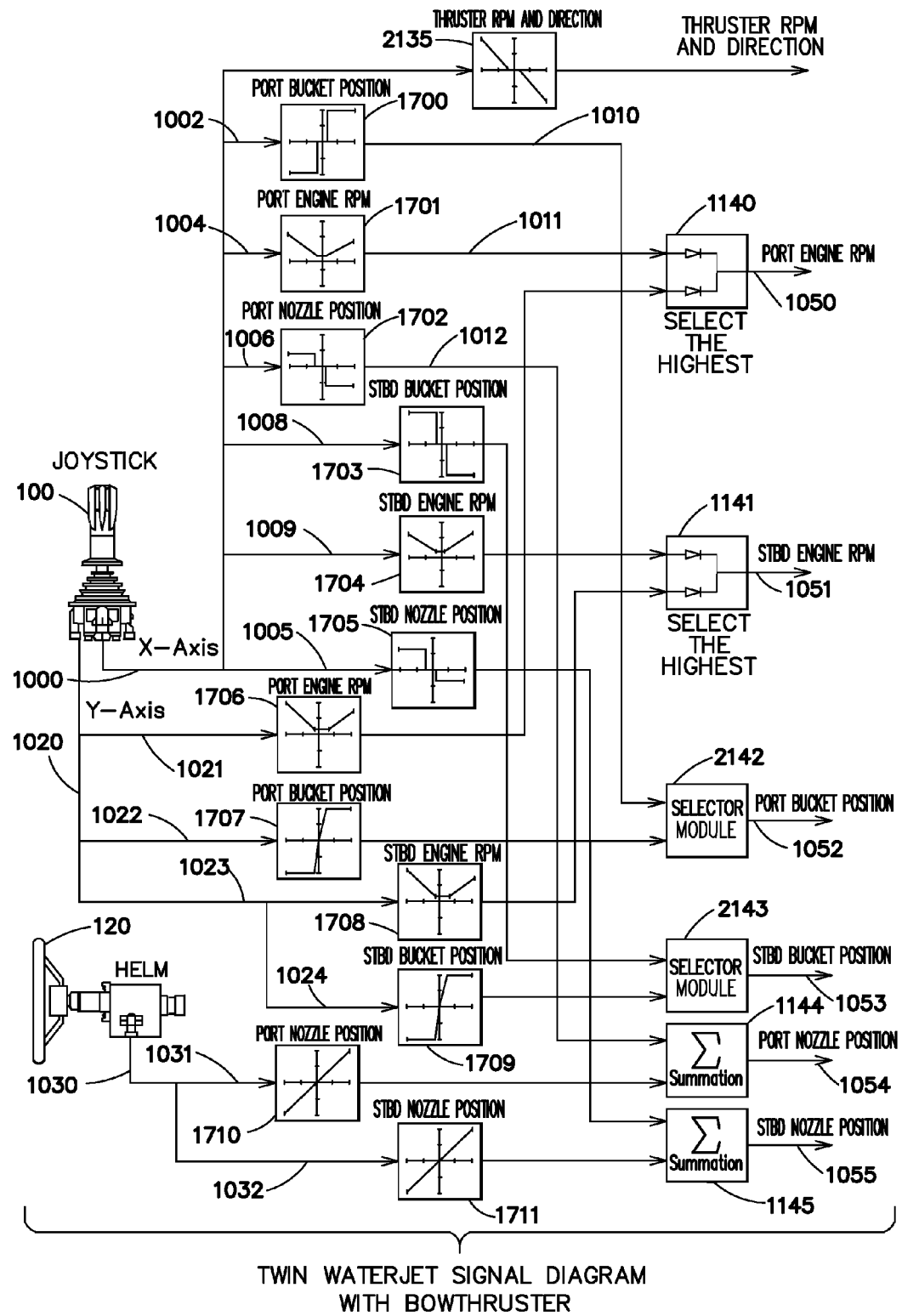
FIG. 30 illustrates a signal diagram of one exemplary embodiment of a marine vessel control system for a vessel comprising dual waterjets and bow thruster.
Figure 31:
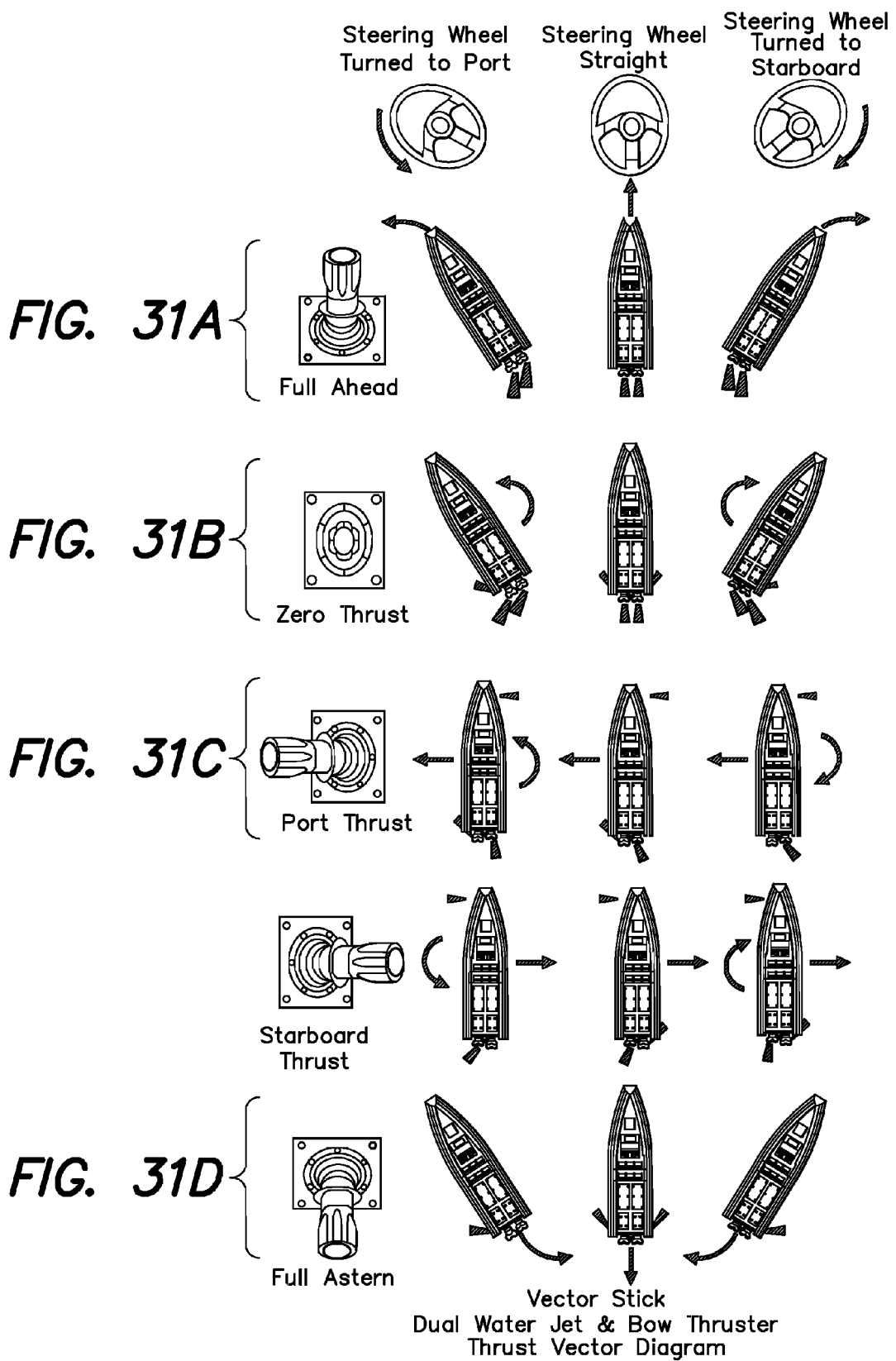
FIGS. 31A-D illustrates maneuvers resulting from motion of a control stick and helm for the embodiment of the marine vessel control system of FIG. 30.

FIGS. 30 and 31 illustrate the signal control modules and resulting vessel movements, respectively, for another embodiment of a control system that can be used to drive a marine vessel having dual waterjets and a bow thruster, with the dual waterjets comprising respective nozzle and reversing buckets. In particular, it is to be appreciated that the system of FIG. 30 is a variation of the system of FIG. 13B, where a bow thruster module 2135 is added to the dual waterjet system and the throttle controls are illustrated as removed for the sake of simplicity.

It is to be understood that FIG. 30 has many of the same components as FIG. 13B, that these components have been numbered with either identical or similar reference numbers (some references numbers have been eliminated), and that the description of each of the components of FIG. 32 has not been duplicated here for the sake of brevity. It is also to be appreciated that although there is no throttles 110P, 110S illustrated in FIG. 30 (See FIG. 8), that such throttles can be part of the control system, as well as other controllers used in the art. In addition, it is to be appreciated that any or all of the joystick 100, helm 120, and throttles 110P, 110S, can be replaced with an interface to a remote control system, such as described above with respect to FIG. 29, that receives any or all of control signals such as any or all of net transverse translational thrust commands, net forward or reverse translational thrust commands, and net rotational thrust commands, and which can be combined and translated into either or both of a net translational and/or net rotational thrust commands. In the embodiment of FIG. 30, there is provided an additional thruster and rpm module 2135, that is substantially the same a the bow thruster modules of FIGS. 8 and 32, except that the functional module has a deadband that corresponds with the deadband of the other functional control modules such as modules 1700-1706, for movement along, for example, the X-axis of the controller. This deadband characteristic is particularly useful for dual waterjet control systems that drive the corresponding reversing buckets to discrete positions, as has been described herein for example with respect to FIG. 30 and also as described elsewhere herein, as the deadband allows the buckets to be moved to the discrete positions without developing any thrust from the waterjets or thrusters.

It is to be appreciated that a plurality of the algorithms or control modules described in FIG. 30 are substantially the same as the algorithms or control modules described with respect to FIG. 13B, with the addition of signals and control module 2135 t for controlling a bow thruster. In particular, substantially the same control signals and logic modules can be used for the dual waterjet control system of FIG. 13 and the dual waterjet and bow thruster control system of FIG. 30. However, the calibration points and parameters should change to compensate for the added thrust and rotational moment that would be provided by the bow thruster. It should be appreciated that one of the reasons for adding a bow thruster to any of the dual waterjet embodiments described herein is that as craft sizes increase, length to weight ratios typically increase and power to weight ratios typically decrease, reducing the vessels ability to develop sufficient side thrust without a bow thruster.

FIGS. 31A-D illustrates a number of exemplary overall actual vessel motions provided by the control system described in FIG. 30 for a vessel having two propulsors with steering nozzles and two corresponding reversing buckets and a bow thruster, which under direction of the vessel control system produce the illustrated vessel movements. It is to be appreciated that the vessel movements illustrated in FIG. 31 and for any of the embodiments described herein, are illustrated for corresponding movements of a control stick and helm, however the controllers can be any controller used in the art and can be signals received from a remote controller at a control interface, as has been described herein.

FIG. 31A illustrates movement of the vessel to port along a curved path when the control stick 100 is in the forward (+y) and the helm 120 is in the turn-to-port position. If the helm 120 is placed in the straight ahead position the vessel moves forward only. If the helm 120 is turned clockwise the vessel moves to starboard FIG. 31B illustrates movement of the vessel when the control stick 100 is in the neutral center position. If the helm 120 is turned to port, the vessel rotates about a vertical axis to port. If the helm 120 is in the straight ahead position, no net vessel movement is achieved. Helm 120 motion to starboard is analogous to that for motion to port and will not be described for the sake of brevity.

FIG. 31C illustrates movement of the vessel when the control stick 100 is in the to-port position (−x). If the helm 120 is in the turn-to-port position then the vessel both rotates to port about a vertical axis and translates to port. If the helm 120 is in the straight ahead position then the vessel merely translates to port without net forward or rotation movement. Again, helm 120 motion to starboard is analogous to that for motion to port and will not be described for the sake of brevity. FIG. 20 also illustrates movement of the vessel when the control stick 100 is moved to the right (+x position), which is analogous to the vessel movement to port, and therefore the description of each vessel movement is not repeated.

FIG. 31D illustrates movement of the vessel when the control stick 100 is moved back in the (−y) direction. Here the vessel moves backwards and to the right if the helm 120 is in the to-port position, and the vessel moves straight back if the helm 120 is in the straight ahead position, and to the left if the helm is in the to starboard position.

As can be seen herein, it is the case for both the single and dual propulsor vessel control systems, both with and without bow thrusters as described herein, we see that vessel motion is in accordance with the movement of the vessel control apparatus. Thus, one advantage of the control systems of the invention is that it provides a more intuitive approach to vessel control that can be useful for complex maneuvers such as docking. It is, of course, to be appreciated that the dynamics of vessel movement can vary widely depending on the equipment used and design of the vessel. For example, we have seen how a single-propulsor vessel and a dual-propulsor vessel use different actuator control signals to achieve a similar vessel movement. One aspect of the present invention is that it permits, in some embodiments, for designing and implementing vessel control systems for a large variety of marine vessels. In some embodiments, adapting the control system for another vessel can be done simply by re-programming the algorithms implemented by the above-described function modules and/or re-calibration of the key points on the above-described curves, that determine the functional relationship between a vessel control signal and an actuator control signal.

One aspect of marine vessel operation and control that may cause differences in vessel response is the design and use of the reversing buckets. Two types of reversing buckets are in use with many waterjet-propelled vessels: an "integral" design, which rotates laterally with a steering nozzle to which it is coupled, and a "laterally-fixed" design, which does not rotate laterally with the steering nozzle, and remain fixed as the steering nozzle rotates. Both integral and laterally-fixed designs can be dropped or raised to achieve the reversing action necessary to develop forward, neutral or backing thrust, but their effect on vessel turning and lateral thrusts is different.

The control system of the present invention can be used for both types of reversing buckets, as well as others, and can be especially useful for controlling vessels that have the laterally-fixed type of reversing buckets, which have traditionally been more challenging to control in an intuitive manner, as will be explained below. The following discussion will illustrate the two types of reversing buckets mentioned above, and show how their response differs. The following discussion also illustrates how to implement the present control system and method with the different types of reversing buckets.

Figures 21A, 21B, 21C:
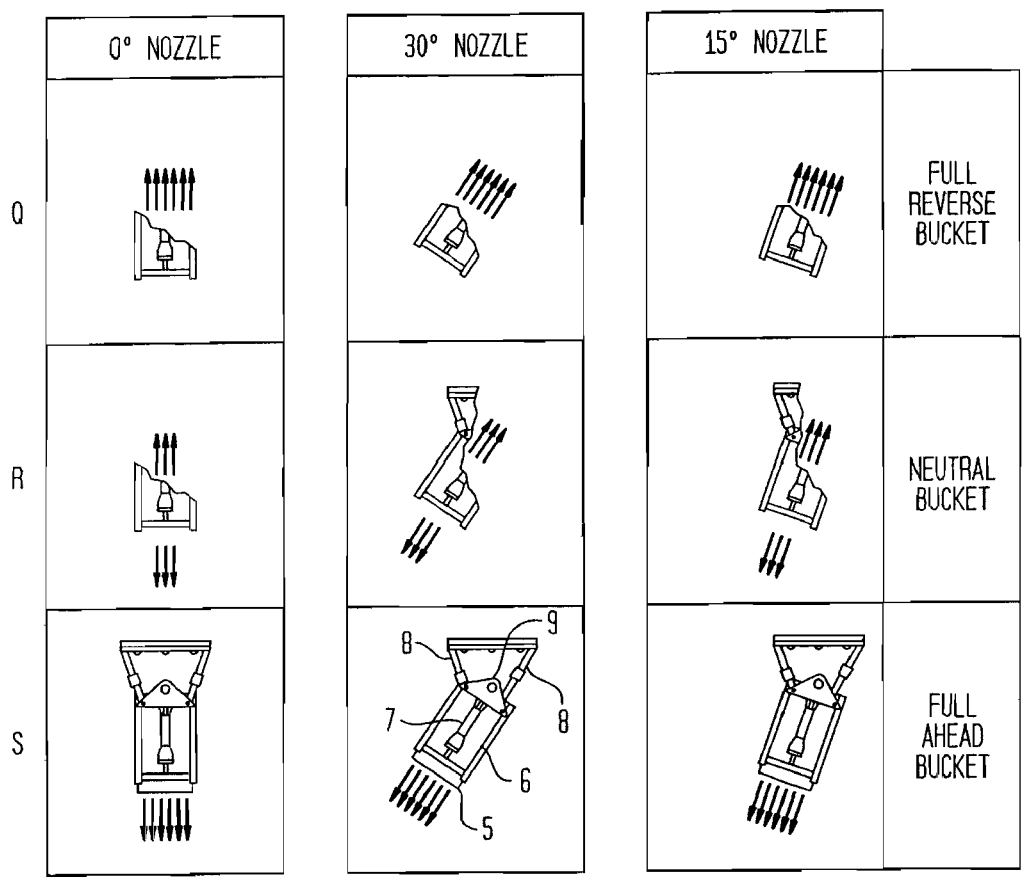
FIG. 21 illustrates an exemplary subset of motions of an integral reversing bucket and steering nozzle.

FIG. 21 illustrates an integral-type reversing bucket 5 that can be raised and lowered as described previously using reversing bucket actuator 7. The reversing bucket 5 and actuator 7 are coupled to, and laterally rotate with steering nozzle 6. The steering nozzle 6 and reversing bucket 5 assembly rotates laterally by movement of steering nozzle actuators 8, pivoting on trunion 9.

Several exemplary modes of operation of the combined reversing bucket and steering nozzle are illustrated in FIG. 21. The columns of the figure (A, B and C) illustrate the steering nozzle 6 being turned along several angles (0°, 30°, 15°) of lateral rotation. The rows (Q, R and S) illustrate several positions (full reverse, neutral and full ahead) of the reversing bucket 5. In the figure, the forward direction is to be understood to be toward the top of the figure and the aft direction is to the bottom, accordingly, the port direction is to the left and the starboard direction is to the right of the figure.

FIG. 21 (col. A, row Q) illustrates the steering nozzle 6 in a 0° position (straight ahead) and the reversing bucket 5 in the full-reverse (lowered) position. The resulting combined thrust is then in the backing direction with no net lateral component. The arrows show the resulting direction of flow of water, which is generally opposite to the direction of the resulting thrust on the vessel.

FIG. 21 (col. A, row R) and (col. A, row S) also illustrates the steering nozzle 6 in the straight ahead position, but the reversing bucket 5 is in the neutral position (col. A, row R) and in its raised position (col. A, row S). Accordingly, no net thrust is developed on the vessel in (col. A, row R) and full ahead thrust is developed on the vessel in (col. A, row S).

FIG. 21 (col. B, row Q-col. B, row S) illustrates the steering nozzle 6 turned 30° with respect to the vessel's centerline axis. By progressively raising the reversing bucket 5 from the backing position (col. B, row Q) to the neutral position (col. B, row R), or the ahead position (col. B, row S) thrust is developed along an axis defined by the direction of the steering nozzle 5. That is, in an integral reversing bucket design, the net thrust developed by the combined reversing bucket and steering nozzle is along a direction in-line with the steering nozzle axis.

FIG. 21 (col. C, row Q-col. C, row S) illustrates a similar maneuver as that of FIG. 21 (col. B, row Q-col. B, row S), except that the angle of steering is 15° with respect to the vessel's centerline rather than 30°.

Figure 22A:
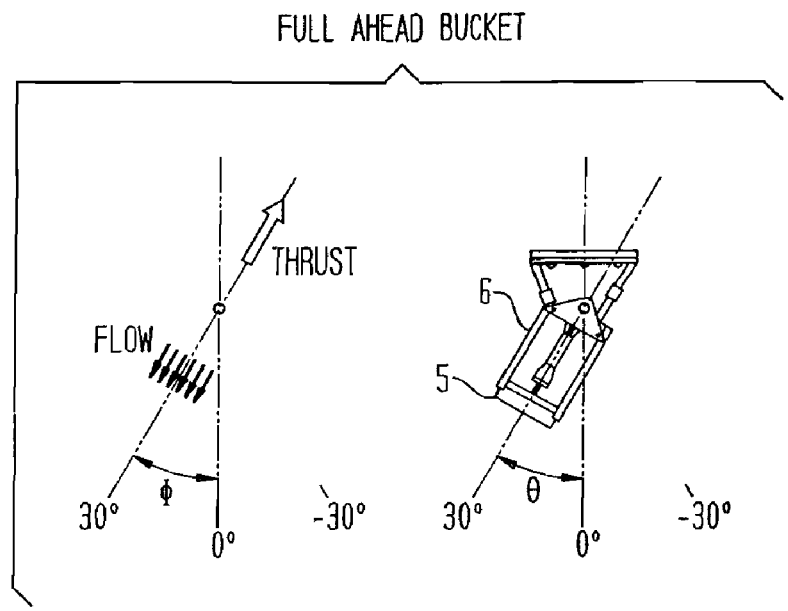
FIG. 22 illustrates thrust and water flow directions from the integral reversing bucket and steering nozzle of FIG. 21.

FIG. 22 illustrates the relation between the water flow direction and the resulting thrust for a configuration having an integral-type reversing bucket 5 coupled to a steering nozzle 6 as in FIG. 21. FIG. 22(a) illustrates a case with a 30° steering angle and the reversing bucket 5 in the full ahead (raised) position, as shown before in FIG. 21 (col. B, row S). The waterjet flow direction is in the same direction as the steering nozzle 5, with a resulting net thrust being forward and to starboard at an angle of substantially 30°.

Figure 22B:
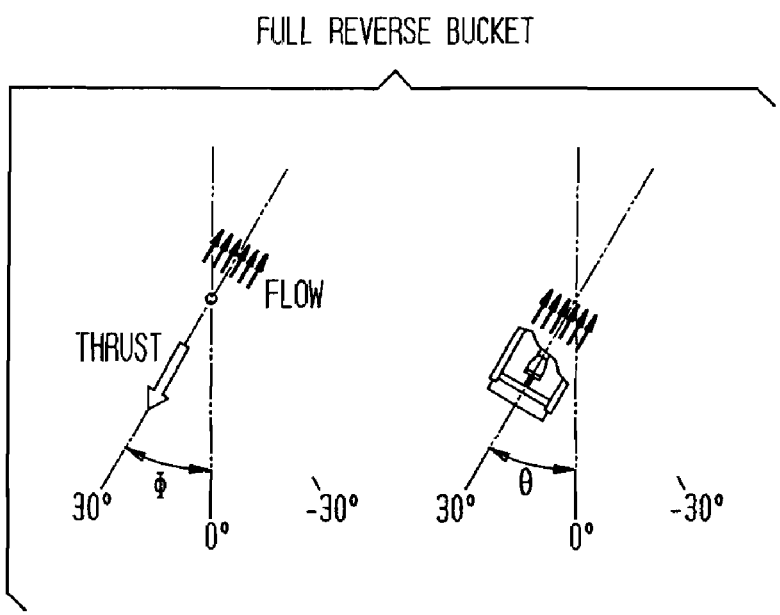

FIG. 22(b) illustrates the steering nozzle 6 at a 30° steering angle and the reversing bucket 5 being in the full reverse (lowered) position as illustrated in FIG. 21 (col. B, row Q). The resulting flow is in a direction along the axis of the steering nozzle 6, but reversed by 180° from it. The resulting net thrust is then to the rear and port side of the vessel. Note that vessel design and placement of the nozzle and bucket assembly can impact the actual direction of translation and rotation of the vessel resulting from application of said thrust at a particular location on the vessel.

Figure 23:
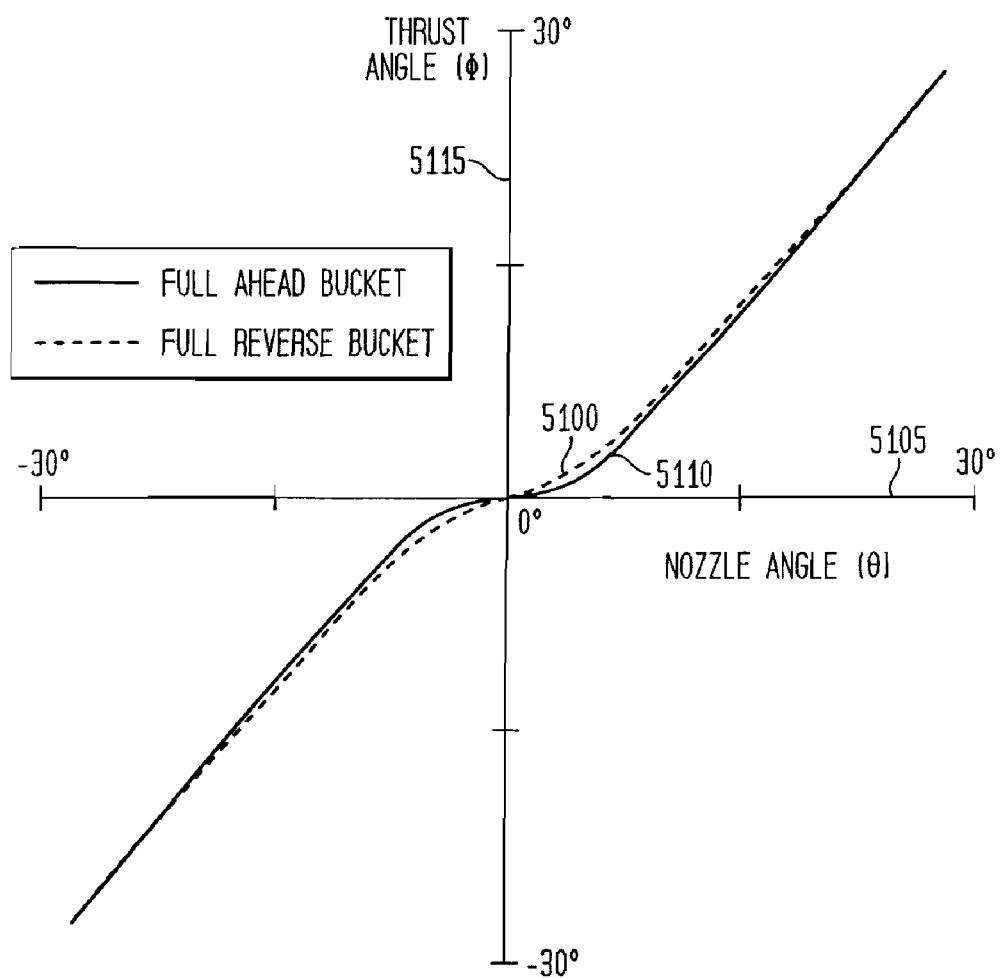
FIG. 23 illustrates plots of thrust angle versus nozzle angle for the integral reversing bucket and steering nozzle assembly of FIG. 21.

FIG. 23 illustrates the dynamic relationship between the steering nozzle 6 angle and the direction of the resulting thrust in a vessel using an integral reversing bucket 5. The horizontal axis 5105 represents an exemplary range of rotation of the steering nozzle 6 about the nominal 0° position (straight ahead). The vertical axis 5115 represents the angle of the thrust developed. Two curves are given to show the direction of the thrust for an integral reversing bucket 5 placed in the full ahead position (solid) 5110 and in the full reverse position (dashed) 5100. It can be seen that in either case, the direction of the thrust developed is substantially in-line with that of the applied steering nozzle direction. That is, the results for the full ahead position 5110 and the results for the full reverse position 5100 are in similar quadrants of the figure.

Figure 33:
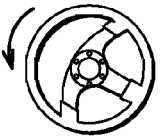
FIG. 33 illustrates some exemplary vessel movements for a vessel configured with dual waterjets and corresponding laterally fixed reversing buckets and a vessel configured with dual waterjets and corresponding integral reversing buckets.

FIG. 33 illustrates an embodiment of a marine vessel control system (cabling) diagram for a dual waterjet propulsion system with integral reversing buckets. It is to be appreciated that the marine vessel control system need not comprise a plurality of vessel control apparatus as illustrated in FIG. 33 and can have different control apparatus are described herein. For example, as will be discussed herein with respect to for example FIGS. 28-29, the control system can comprise an interface (control box) 130 that receives vessel control signals from a remote control system 131. For example, the remote control system may provide digital words, e.g. in an ASCII format or any other suitable format to command the control system, or the remote control system may provide analog signal that, for example, mimic the analog signals provided by joystick and/or helm control apparatus as described herein.

As can be seen from FIG. 33 the control unit of the control system can receive control signals from the various control apparatus and provide resulting actuator control signals to marine vessel having two water jets comprising two nozzles with corresponding integral reversing buckets. The control system can comprise a set of functional modules, for example, stored within control processor unit, that receive and translate control signals such as any or all of net transverse translational thrust commands, net forward or reverse translational thrust commands, and net rotational thrust commands, which can be translated into any/or all of net translational and net rotational thrust commands, and from these commands generate the output actuator control signals provided by the control processor unit.

Figure 35:
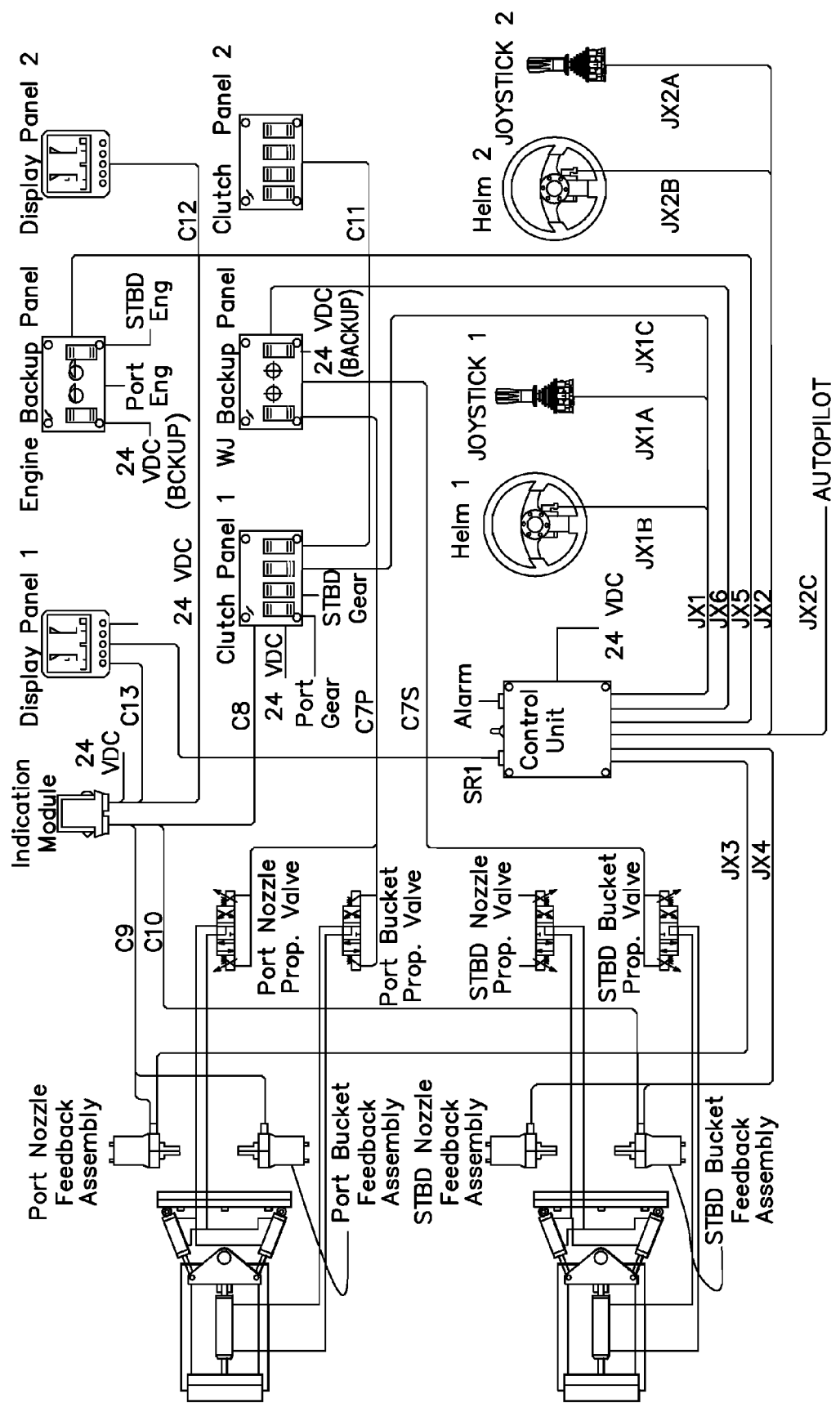
FIG. 35 illustrates a cabling diagram of an embodiment of a marine vessel control system for a vessel equipped with a dual waterjet propulsion system and with corresponding integral reversing buckets.

Referring now to FIG. 35, there is illustrated one embodiment of a signal diagram for a first control zone of the marine vessel control system of FIG. 33. In particular, FIG. 35 illustrates an embodiment of a control signal diagram for directing the marine vessel, having dual water jets comprising two nozzles with corresponding integral reversing buckets, to port with the first zone of operation of the control system corresponding to movement of a vessel control apparatus as shown in Zone 1 of FIG. 34.

Figure 36:
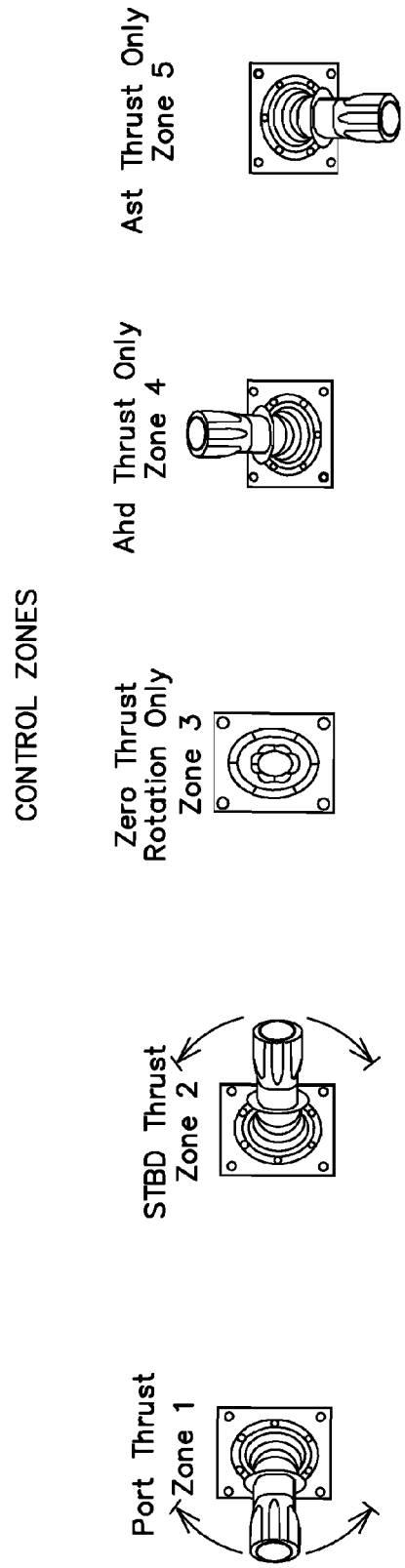
FIG. 36 illustrates movements of a control apparatus for five zones of an embodiment of the marine vessel control system of FIG. 35.

Referring now to FIG. 36, there is illustrated one embodiment of a signal diagram for a second control zone of the marine vessel control system of FIG. 33. In particular, FIG. 36 illustrates an embodiment of a control signal diagram for directing the marine vessel to starboard with the second zone of operation of the control system corresponding to movement of a vessel control apparatus as shown in Zone 2 of FIG. 34.

Figure 37:
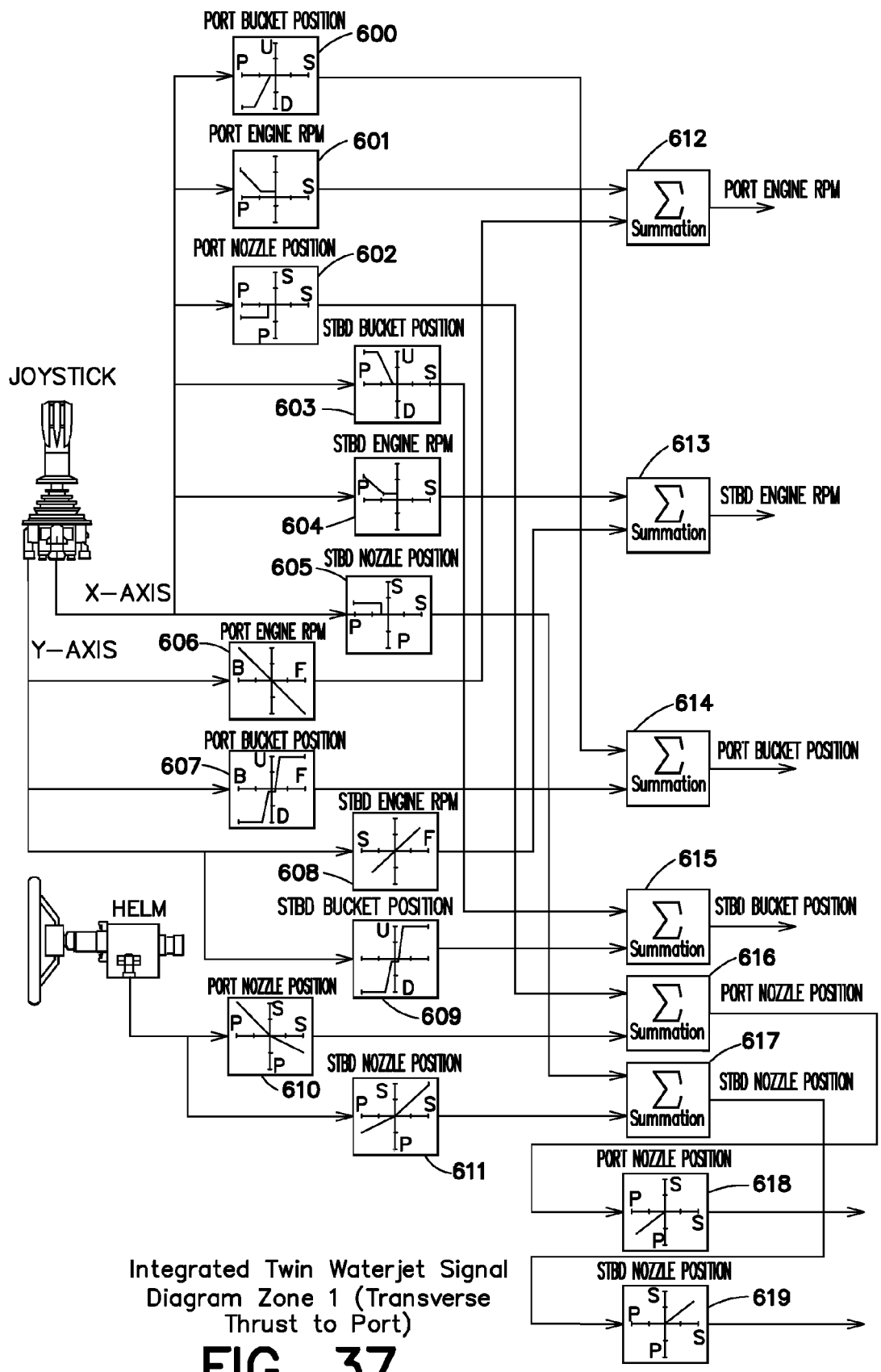
FIG. 37 illustrates a signal diagram for a first control zone of the marine vessel control system of FIG. 35.

Referring now to FIG. 37, there is illustrated one embodiment of a signal diagram for a third control zone of the marine vessel control system of FIG. 33. In particular, FIG. 37 illustrates an embodiment of a control signal diagram for directing the marine vessel to substantially rotate only with the third zone of operation of the control system corresponding to movement of a vessel control apparatus as shown in Zone 3 of FIG. 34.

Figure 38:
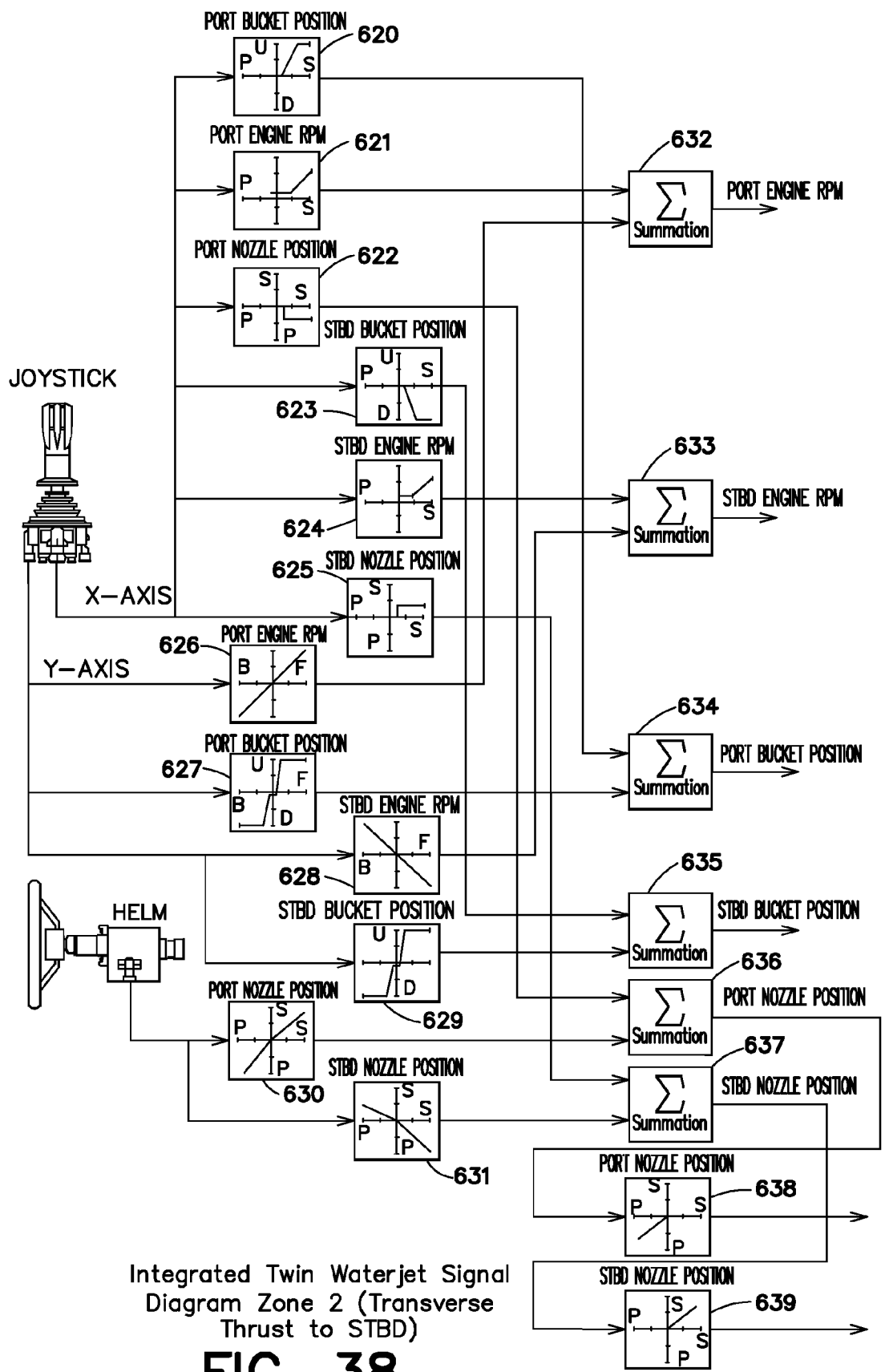
FIG. 38 illustrates a signal diagram for a second control zone of the marine vessel control system of FIG. 35.

Referring now to FIG. 38, there is illustrated one embodiment of a signal diagram for a fourth control zone of the marine vessel control system of FIG. 33. In particular, FIG. 38 illustrates an embodiment of a control signal diagram for directing the marine vessel to thrust ahead only with the fourth zone of operation of the control system corresponding to movement of a vessel control apparatus as shown in Zone 4 of FIG. 34.

Figure 39:
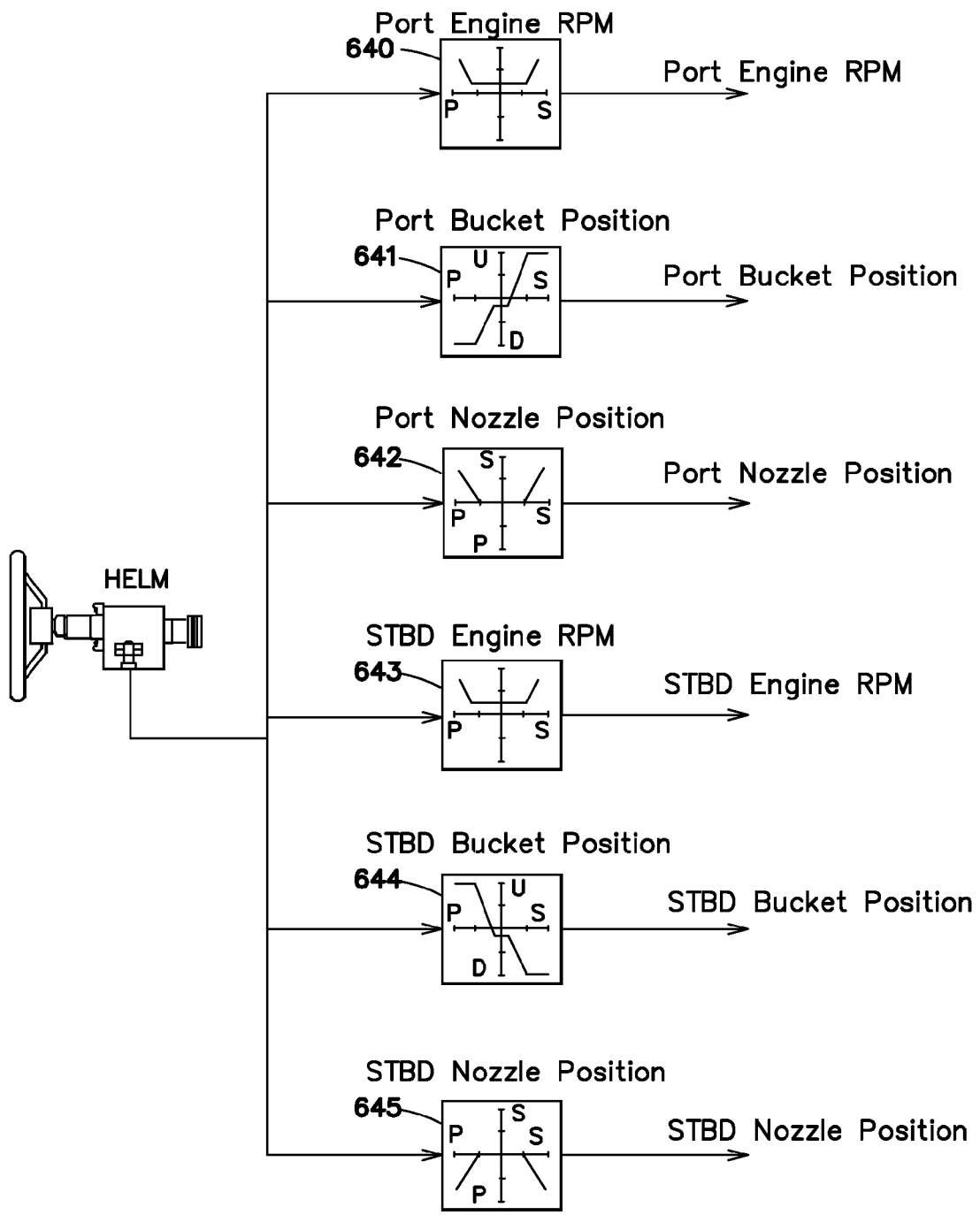
FIG. 39 illustrates one embodiment of a signal diagram for a third control zone of the marine vessel control system of FIG. 35.
Figure 40:
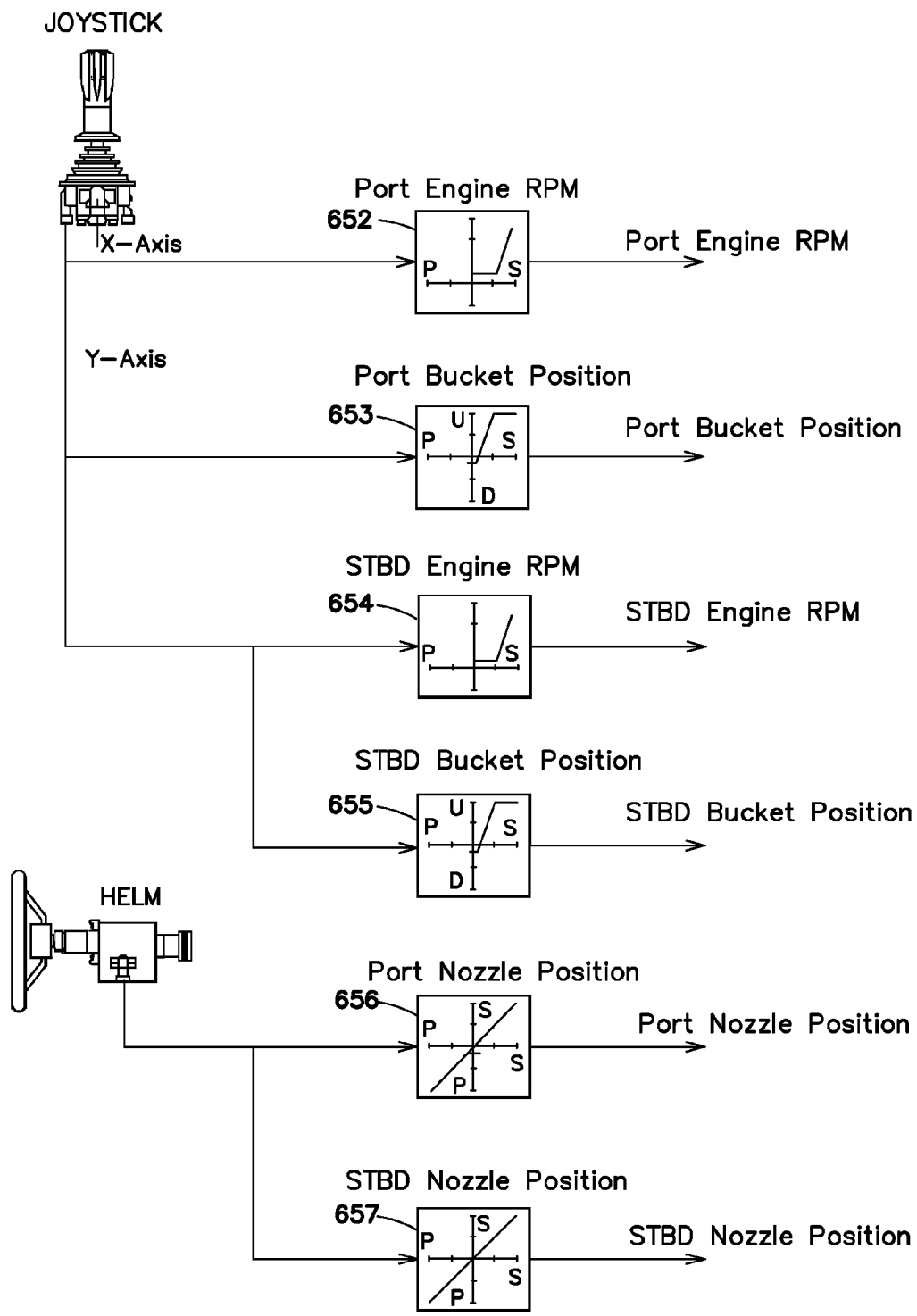
FIG. 40 illustrates a signal diagram for a fourth control zone of the marine vessel control system of FIG. 35.
Figure 41:
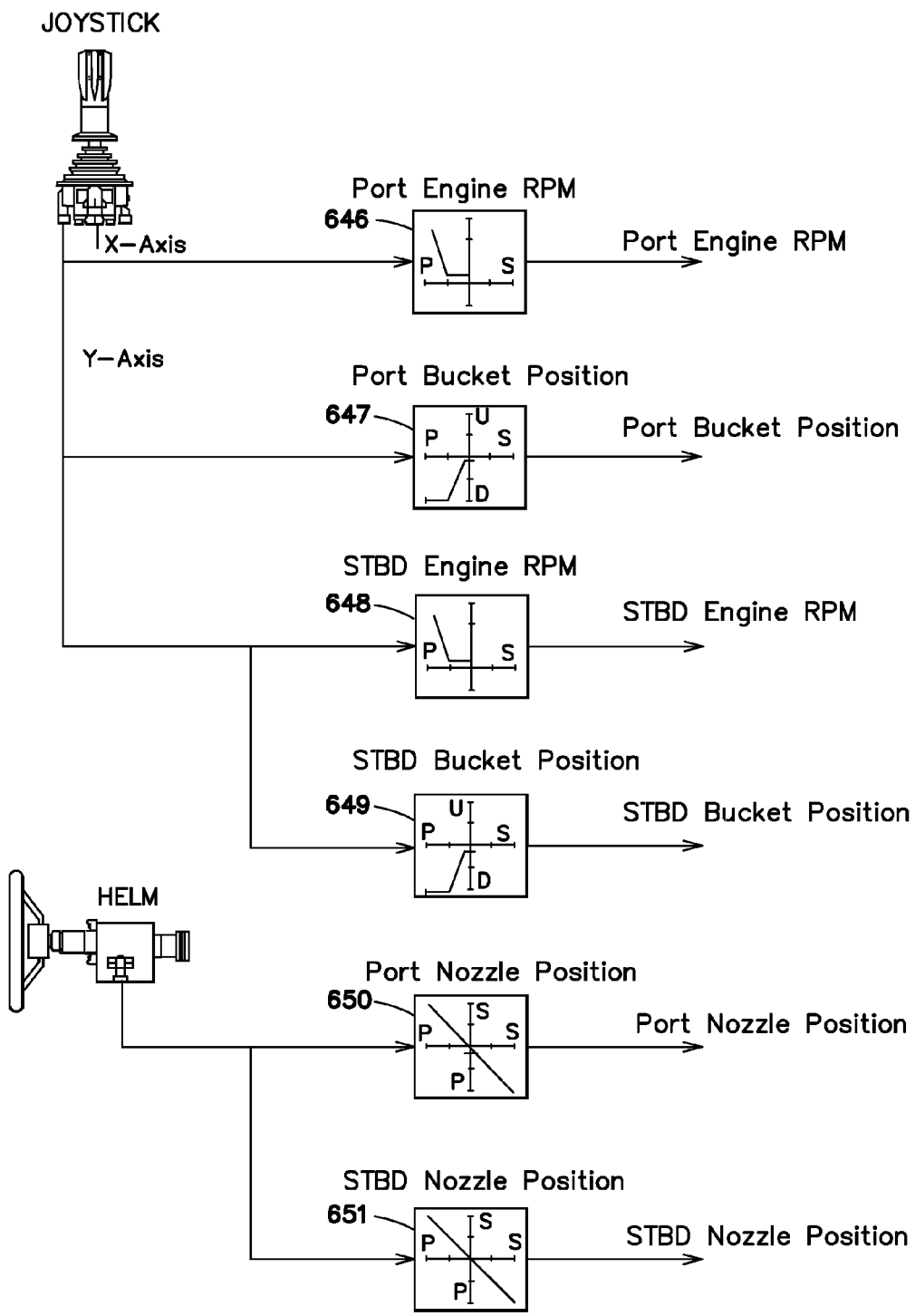
FIG. 41 illustrates one embodiment of a signal diagram for a fifth control zone of the marine vessel control system of FIG. 35.

Referring now to FIG. 39, there is illustrated one embodiment of a signal diagram for a fifth control zone of the marine vessel control system of FIG. 33. In particular, FIG. 39 illustrates an embodiment of a control signal diagram for directing the marine vessel to thrust astearn only with the fifth zone of operation of the control system corresponding to movement of a vessel control apparatus as shown in Zone 5 of FIG. 34.

It is to be appreciated that the control system controller or processor receives and translates the control signals from any of the herein described control apparatus such as any or all of net transverse translational thrust commands, net forward or reverse translational thrust commands, and net rotational thrust commands, and combines and/or translates these commands into either or both of a net translational and/or net rotational thrust commands.

FIG. 24 illustrates a laterally-fixed reversing bucket 5A that can be moved as described previously using a reversing bucket actuator (not shown in this figure). The reversing bucket 5A and its actuator are not coupled to the steering nozzle 6A, but are coupled to a waterjet housing or other support which is fixed to the vessel and do not rotate laterally with the steering nozzle 6A. The steering nozzle 6A rotates laterally by movement of steering nozzle actuators (not shown in this figure). Reference can be made to FIG. 5 which illustrates a more detailed side view of a laterally-fixed reversing bucket assembly and steering nozzle. A result of this configuration is that, in addition to reversing the forward-aft portion of the waterjet, the reversing bucket 5A redirects the water flow with respect to the vessel's centerline. In most designs, some curvature of the reversing bucket 5A surface exists and affects the exact direction in which the exiting water flows from the reversing bucket. Also, some designs of laterally-fixed reversing buckets comprise tube-like channels which force the flow to have a certain path along the tube. Others are split into a port and a starboard portion, such that the fraction of the waterjet traveling in the port or the starboard portions depends on the angle of the steering nozzle and affects the thrust accordingly.

Several exemplary modes of operation of the laterally-fixed reversing bucket 5A and steering nozzle 6A are illustrated in FIG. 24. The columns of the figure (A, B and C) illustrate the steering nozzle 6A being turned along several angles (0°, 30°, 15°) of lateral rotation. The rows (Q, R and S) illustrate several positions (full reverse, neutral and full ahead) of the reversing bucket 5A. As in FIG. 21, the forward direction is to the top of the figure and the aft direction is to the bottom, accordingly, the port direction is to the left and the starboard direction is to the right of the figure.

FIG. 24 (col. A, row Q) illustrates the steering nozzle 6 in a 0° position (straight ahead) and the reversing bucket 5A in the full-reverse (lowered) position. The resulting combined thrust is then in the backing direction with no net lateral component. Note that there are two lateral components to the waterjet flow in that the port and starboard contributions cancel one another. The arrows show the resulting direction of flow of water, which is generally opposite to the direction of the resulting thrust.

FIG. 24 (col. A, row R) and (col. A, row S) illustrates the steering nozzle 6A in the straight ahead position, but the reversing bucket 5A is in the neutral position in (col. A, row R) and in its raised position in (col. A, row S). No net thrust is developed with the reversing bucket 5A as illustrated in (col. A, row R) and full ahead thrust is developed with the reversing bucket 5A as illustrated in (col. A, row S).

FIG. 24 (col. B, row Q-col. B, row S) illustrates the steering nozzle 6A turned 30° with respect to the vessel's centerline axis. By progressively raising the reversing bucket 5A, from backing position (col. B, row Q), to neutral position (col. B, row R), or ahead position (col. B, row S) thrust is developed along an axis defined by the direction of the steering nozzle 6A. It can be seen, e.g. by comparing the thrust generated in FIG. 21 (col. B, row R) and FIG. 24 (col. B, row R), that the reversed component of the flow in the laterally-fixed reversing bucket 5A is not along the same axis as the steering nozzle 6A, while the integral reversing bucket 5 gave an in-line (but opposing) reversed flow component direction with respect to steering nozzle 6.

FIG. 24 (col. C, row Q-col. C, row S) illustrates a similar maneuver as that of FIG. 24 (col. B, row Q-col. B, row S), except that the angle of steering is 15° with respect to the vessel's centerline rather than 30°.

Figure 25A:
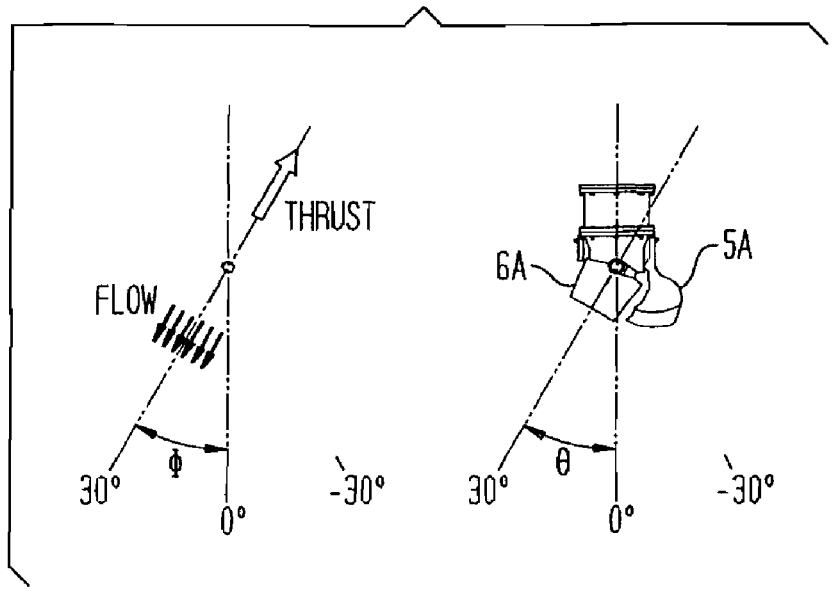
FIG. 25 illustrates thrust and water flow directions from the laterally-fixed reversing bucket and steering nozzle of FIG. 24.

FIG. 25 illustrates the relation between the water flow direction and the resulting thrust for a configuration having a laterally-fixed type reversing bucket 5A and a steering nozzle 6A as illustrated in FIG. 24. FIG. 25(a) illustrates a case with a 30° steering angle of the steering nozzle 6A and the reversing bucket 5A in the full ahead (raised) position, as shown before in FIG. 24 (col. B, row S). The flow direction is in the same direction as that of the steering nozzle 5A, with a resulting net thrust being forward and to port.

Figure 25B:
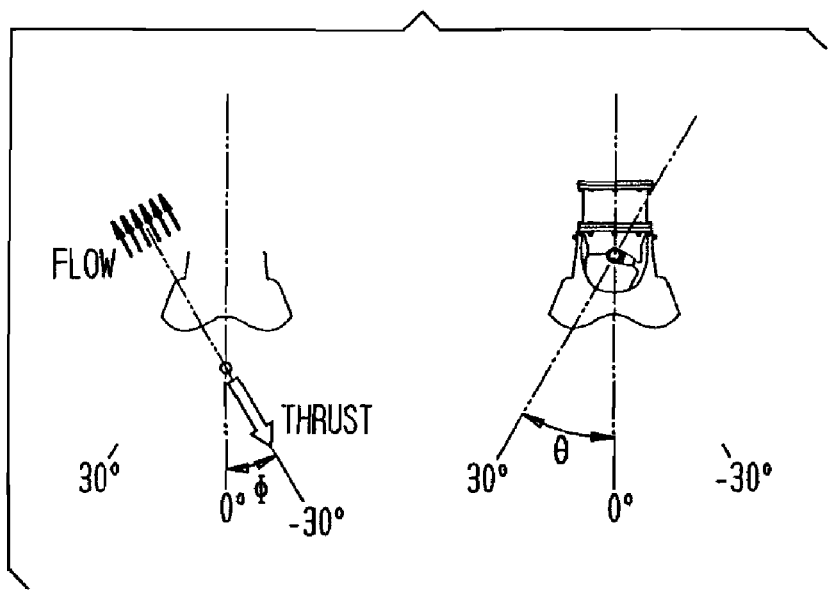

FIG. 25(b) illustrates the steering nozzle 6A at a 30° steering angle to port and the reversing bucket 5A being in the full reverse (lowered) position. For this configuration, the resulting water flow is in a different direction than that of the steering nozzle 6A, and not along its axis. The resulting net thrust imparted to the vessel is to the rear and starboard side of the vessel. The reverse thrust can be at an angle greater than the 30° nozzle angle 6A because the flow channel within the reversing bucket 5A plays a role in steering the vessel. It is to be appreciated that the vessel design and placement of the nozzle and bucket assembly can impact the actual direction of translation and rotation of the vessel resulting from application of said thrust at a particular location on the vessel.

One thing that is apparent from comparing the integral and the laterally-fixed types of reversing buckets is that the lateral component of thrust due to the reversed component of the waterjet in the integral type reversing bucket is in a direction substantially reflected about the vessel's major axis (centerline) compared to the same thrust component developed by using a laterally-fixed reversing bucket. In other words, the resultant thrust for the integral reversing bucket 5 will be to the port side of the vessel, whereas the resultant thrust with the laterally-fixed reversing bucket 5A will be to the starboard side of the vessel.

Figure 26:
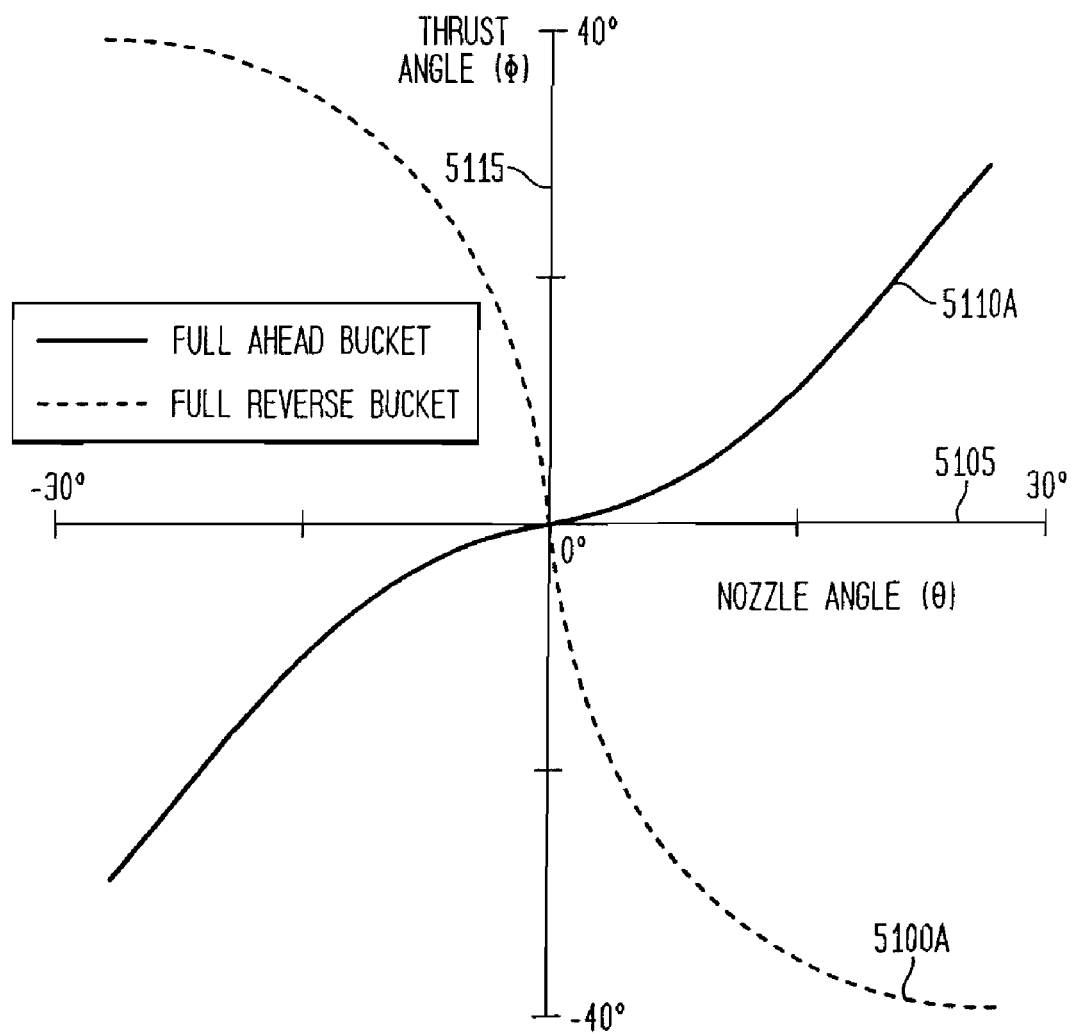
FIG. 26 illustrates plots of thrust angle versus nozzle angle for the laterally-fixed reversing bucket and steering nozzle assembly of FIG. 24.

FIG. 26 illustrates the dynamic relationship between the steering nozzle 6A angle and the direction of the resulting thrust in a vessel using a laterally-fixed reversing bucket 5A. The horizontal axis 5105 represents an exemplary range of rotation of the steering nozzle 6A about the nominal 0° position (straight ahead). The vertical axis 5115 represents the angle of the thrust developed. Two curves are given to show the direction of the thrust for a laterally-fixed reversing bucket 5A placed in the full ahead position (solid) 5110A and in the full reverse position (dashed) 5100A. It can be seen that in the full reverse case, the direction of the thrust developed is substantially out-of-line with that of the applied steering nozzle direction. That is, the results for the full ahead position 5110A and the results for the full reverse position 5100A are in different quadrants of the figure.

According to some aspects of the present invention, problems related to the use of laterally-fixed reversing buckets in some embodiments can be overcome. The primary problem with respect to controlling waterjets with laterally-fixed reversing buckets is predicting the overall effect of variable amounts of reverse thrust. This is a significant problem, as the reversing component is not only deflected substantially out of line with steering nozzle angle but at varying degrees with respect to nozzle position. Through the use of specially designed algorithms or control modules and simplified calibration methods, the present invention can in some cases anticipate and correct for such discrepancies and in other cases avoid the influences of these discrepancies all together. The result is a smooth and intuitive operation of the vessel. This of course does not limit the scope of the present invention, and it is useful for many types of reversing buckets.

In some embodiments, the marine vessel may have coupled steering nozzles or propulsor apparatus. For example, it is possible to use two steering nozzles that are mechanically-coupled to one another and rotate in unison by installing a cross-bar that links the two steering nozzles and causes them to rotate together. A single actuator or set of actuators may be used to rotate both steering nozzles in this embodiment. Alternatively, the steering nozzles may be linked electrically by controlling both nozzles with the same actuator control signal. It is possible to split an actuator control signal so that separate actuators controlling each steering nozzle are made to develop the same or similar movements.

Figure 27:
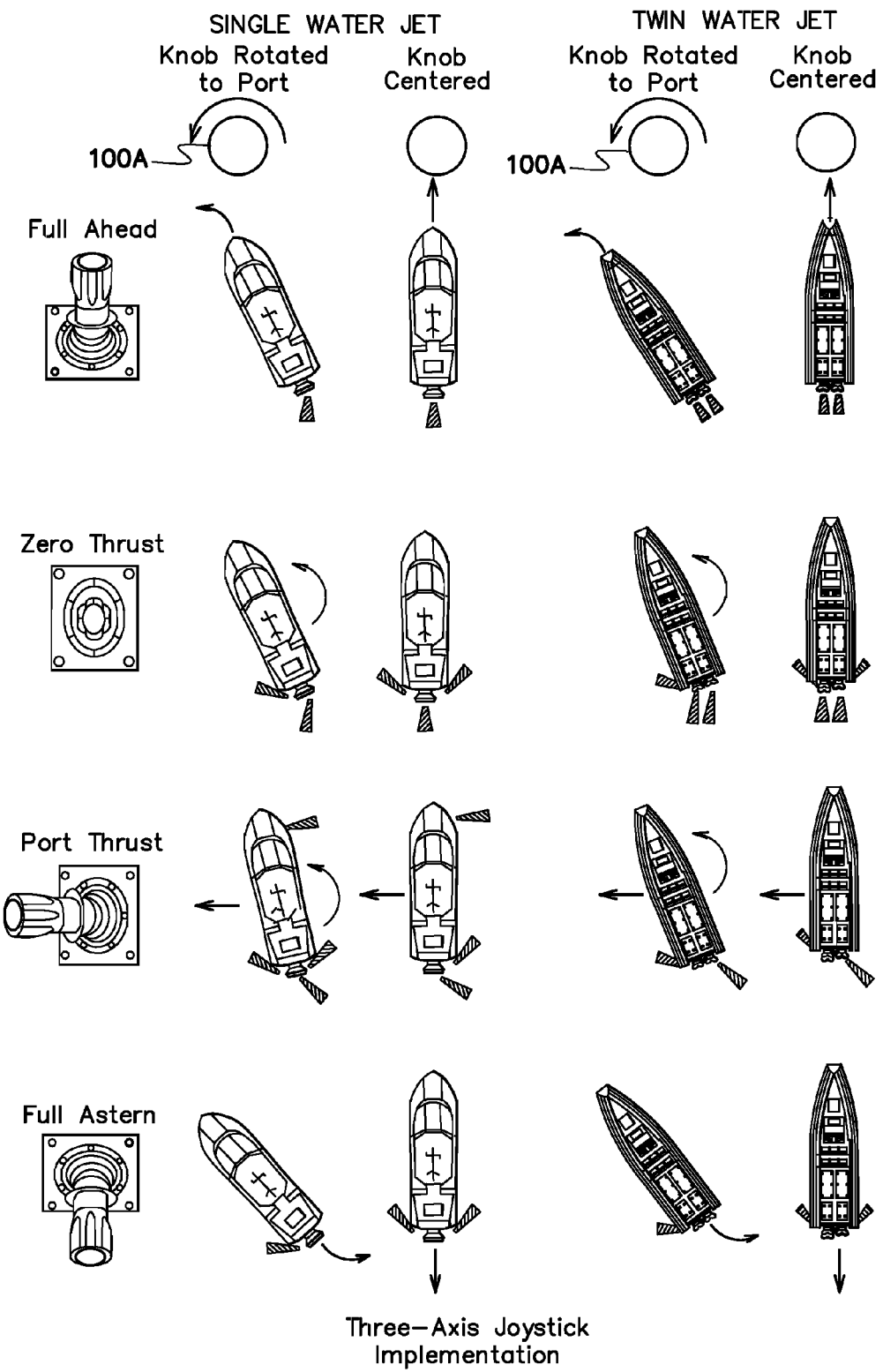
FIG. 27 illustrates an alternate embodiment of a vessel control apparatus to be used with embodiments of marine vessel control system of this disclosure, and resulting vessel maneuvers.

FIG. 27 illustrates an alternate embodiment of a vessel control apparatus 100A to be used with the various embodiments of marine vessel control system of this disclosure, and exemplary resulting vessel maneuvers. In particular, it is to be appreciated that the vessel control apparatus can be a three-axis (degree of freedom) control or joystick 100A as illustrated in FIG. 27, instead of a two-axis control or joystick and a helm, as has been described by way of example herein. FIG. 27 illustrates some exemplary resulting maneuvers provided by the herein described marine vessel control system for exemplary motion of the three-axis control stick for a single waterjet vessel, which corresponds to but is a subset of the resulting maneuvers illustrated in FIGS. 12A-12D. FIG. 27 also illustrates some exemplary resulting maneuvers provided by the herein described marine vessel control system for exemplary motion of the three-axis control stick for a twin waterjet vessel, which corresponds to but is a subset of the resulting maneuvers illustrated in FIGS. 20A-20D.

Figure 28:
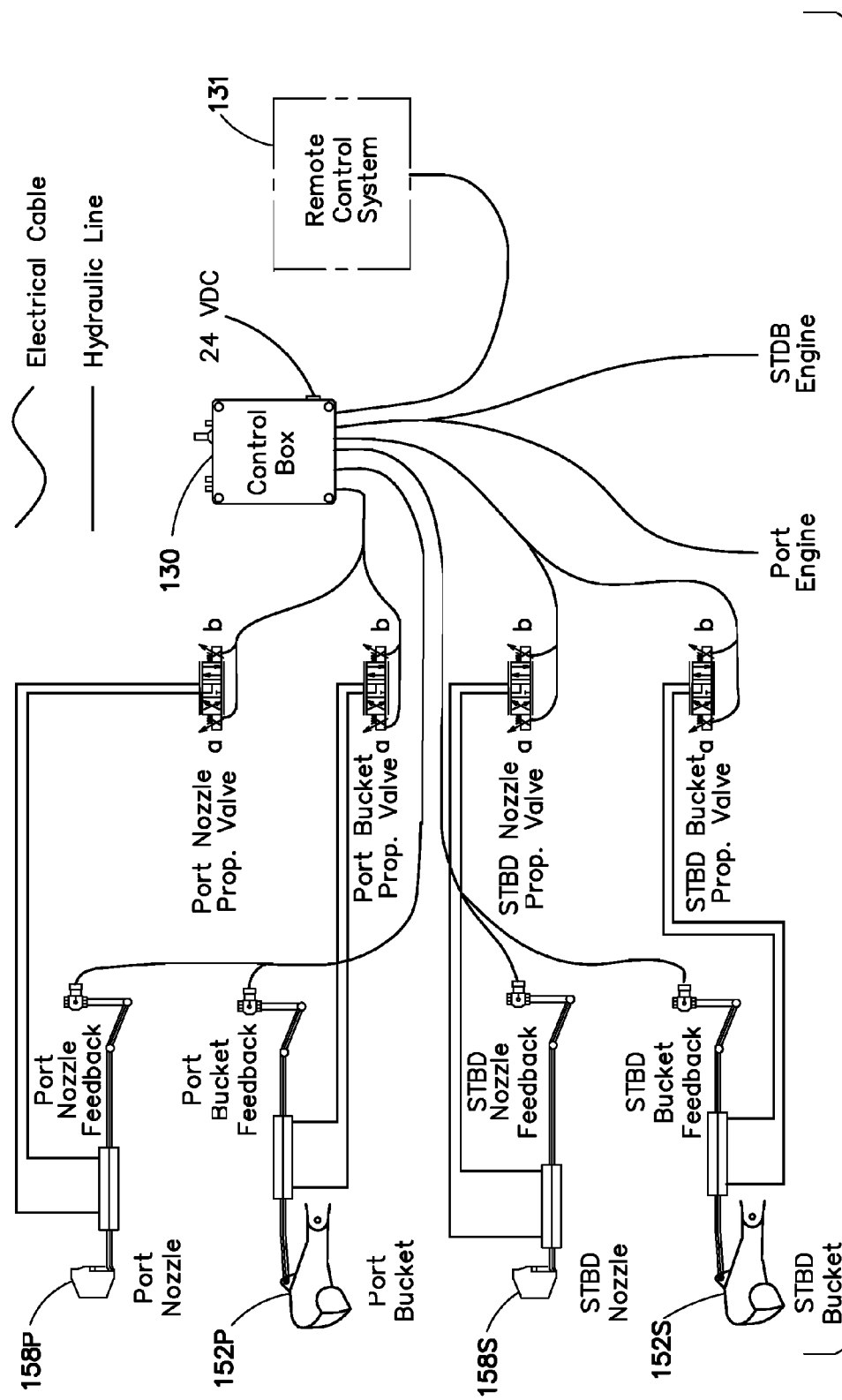
FIG. 28 illustrates a control system (cabling) diagram for an alternative embodiment of a dual waterjet propulsion system, with a remote control interface.

FIG. 28 illustrates an alternative embodiment of a marine vessel control system (cabling) diagram for a dual waterjet propulsion system, with a remote control interface 130. It is to be appreciated that the marine vessel control system need not comprise a vessel control apparatus or a plurality of vessel control apparatus as has been described herein by way of example. Alternatively, the control system can comprise an interface (control box) 130 that receives vessel control signals from a remote control system 131. For example, the remote control system may provide digital words, e.g. in an ASCII format or any other suitable format to command the control system, or the remote control system may provide analog signal that, for example, mimic the analog signals provided by joystick and/or helm control apparatus as described herein.

As will be discussed further with respect to FIG. 29, the control box 130 and the control system can receive these signals and provide resulting actuator control signals to marine vessel having for example two waterjets comprising two nozzles 158P and 158S, and two reversing buckets 152P and 152S. It is to be appreciated that the operation of this system, other than the interface to and translation of signals from the remote control system, is substantially the same as that of FIG. 7 discussed above, and like parts have been illustrated with like reference numbers and a description of such parts is omitted here for the sake of brevity. Specifically, the control system can comprise a set of functional modules, for example, stored within control processor unit 130, that receive and translate control signals such as any or all of net transverse translational thrust commands, net forward or reverse translational thrust commands, and net rotational thrust commands, which can be translated into any/or all of net translational and net rotational thrust commands, and from these commands generate the output actuator control signals provided by the control processor unit 130.

Figure 29:
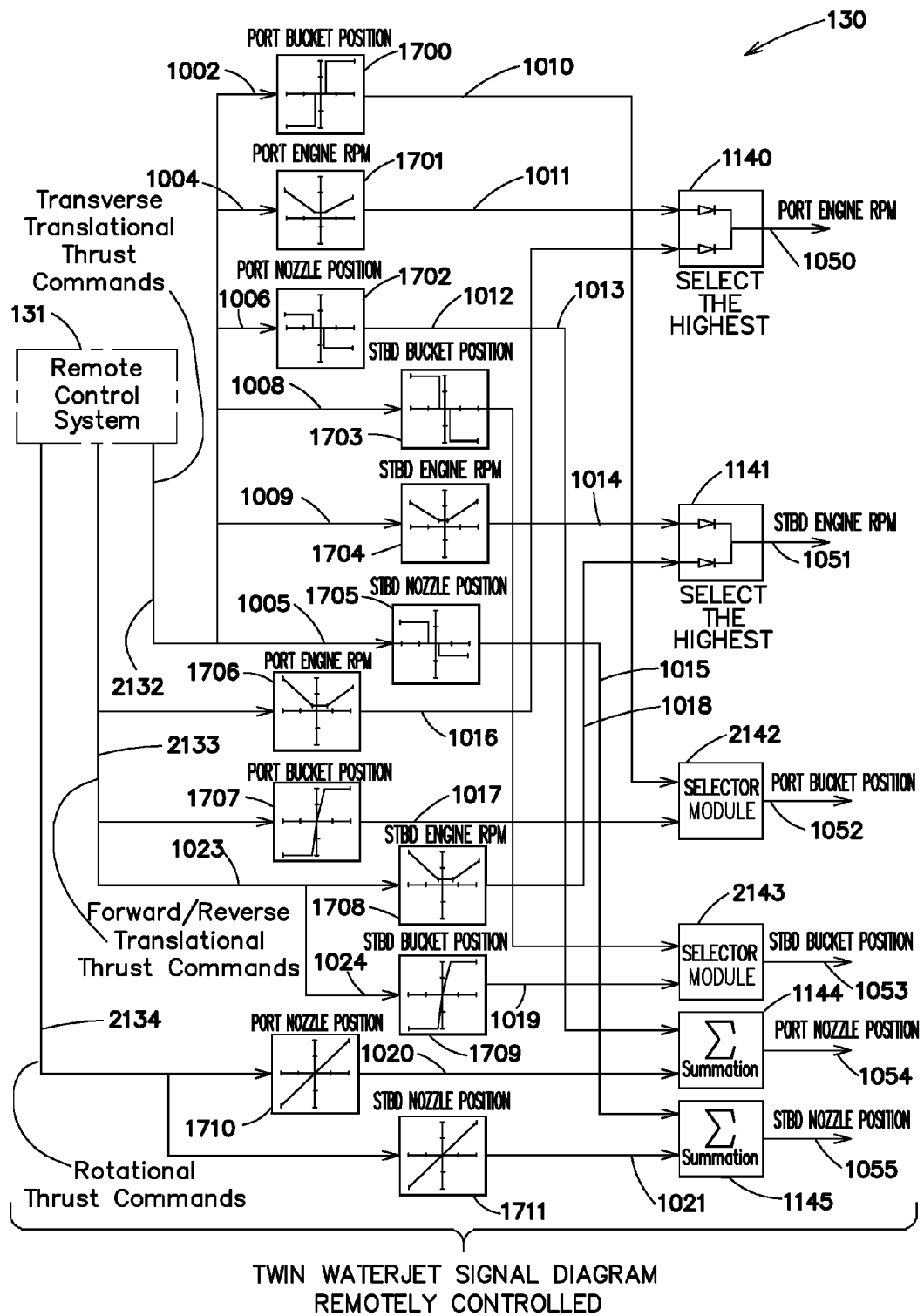
FIG. 29 illustrates an exemplary signal diagram for the embodiment of the marine vessel control system for a dual waterjet vessel, with a remote control interface of FIG. 28.

Referring now to FIG. 29, there is illustrated one exemplary signal diagram for the marine vessel control system comprising a dual waterjet vessel and a remote control interface, as illustrated in FIG. 28. In particular FIG. 29 illustrates a signal diagram of another embodiment of a marine vessel control system for a dual waterjet vessel, which is an variation of the embodiment illustrated in FIG. 13B, wherein any and/or all of the vessel control apparatus, such the joystick 100, helm 120, and port and/or starboard throttles 110P, 110S have been replaced with the remote control system interface 130 that receives control signals from a remote control system 131. It is to be appreciated that the operation of this vessel control system 130 and resulting signal diagram, other than the interface to and translation of signals from the remote control system, is substantially the same as that of FIG. 13B discussed above, and therefore like parts have been illustrated with like reference numbers and a bulk of the description of such parts is omitted here for the sake of brevity.

Summarizing, the remote control interface also referred to herein as controller or processor 130 receives and translates control signals such as any or all of net transverse translational thrust commands on line 2132, net forward or reverse translational thrust commands on line 2133, and net rotational thrust commands on line 2134, which can be combined and translated into either or both of a net translational and/or net rotational thrust commands. It is to be appreciated that the net translational thrust command on line 2132 corresponds, in other embodiments having for example a first vessel controller such as the joystick controller 100 (see for example FIG. 13B) to movement of a first vessel controller apparatus off of center along at least one degree of freedom such as the X-axis. The reversing bucket position (port and starboard reversing buckets) is configured by modules 1700, 1703 in response to the received net transverse translational thrust commands on line 2132, to one of two discrete positions, fully up and fully down. In addition, the engine rpm for the port and starboard engines are varied, by port engine rpm module 1701 and starboard engine rpm module 1704, to vary proportionally with respect to the net transverse translational thrust commands on line 2132.

It is to be appreciated that the controller as programmed as illustrated in FIG. 29 provides a set of actuator control signals 1052, 1053 so that the first reversing bucket and the second reversing bucket are positioned so that substantially no net rotational force is induced to the marine vessel for received net translational thrust commands. In particular, the processor is programmed to provide the actuator control signals 1052, 1053 so that the first reversing bucket is positioned in one of a first and a second discrete position and so that the second reversing bucket is positioned in one of the first and the second discrete positions. In some embodiments, the first discrete position is a substantially full up position and the second discrete position is a substantially full down position. In particular, as illustrated in FIG. 29, the first (port) reversing bucket is configured to be in the first discrete position which is a substantially full up position and the second reversing bucket (starboard) is positioned to be in the second discrete position which is a substantially full down position, for net translation thrust commands with a starboard component, and vice versa for net translational thrust commands with a port component. In addition, as has been discussed above with respect to FIGS. 14B and 15B, the controller or processor is programmed to provide another set of actuator control signals 1050, 1051 so that an engine rpm of the first and second steering nozzles varies proportionally to the net translational thrust command. In addition, for some embodiments as has been discussed above with respect to FIGS. 14E and 15E, the processor is programmed to provide the actuator control signals 1050, 1051 so that the engine rpm of one of the port and starboard steering nozzles has a step up in engine rpm from the rpm value that varies proportionally to the net translational thrust command, when the corresponding one of the first and second reversing buckets is in a substantially full down position and vice versa.

As has been discussed above with reference to FIGS. 13E-F, this embodiment has an advantage in that the for-aft thrust component (the engine RPM's) can be modulated (varied for example from full thrust as illustrated in FIG. 13E to half thrust as illustrated in FIG. 13F) with the reversing bucket at a fixed position, such as full up position, and the nozzle(s) at an angle Θ (presumably required to hold a steady heading of the vessel due to external influences such as water current and/or wind) without affecting the net thrust angle Θ of the waterjet. An advantage according to this embodiment, is that by keeping the reversing buckets stationary while modulating engine RPM only (as illustrated in FIGS. 13E & 13F), the control system and hence the operator are able to vary the net thrust magnitude applied to the vessel without applying any unwanted rotational force, thereby resulting in movement of the vessel as illustrated in, for example, FIG. 13H, and FIG. 20 and FIG. 27, as well as FIG. 31 to be described herein.

While the embodiments shown in FIGS. 13A and 13B describe an intuitive control implementation that uses laterally fixed reversing buckets (described in FIGS. 24, 25 and 26), similar results can be achieved using integral reversing buckets (described in FIGS. 21, 22 and 23). There are significant differences, however, in the force (and subsequent motion) response to nozzle movements with systems and vessels equipped with integral reversing buckets as compared to systems that use the laterally fixed type of reversing bucket.

One example of a difference in response to nozzle movements between the two types of buckets is the response to forward and reverse thrust with the nozzle in a non-neutral position. FIG. 33 shows the response of two different craft, one with laterally fixed buckets (column A) and one with integral buckets (column B). Both craft in the example are controlled with a conventional system where the steering wheel directly controls the nozzle positions and each lever controls the respective reversing bucket. Column A of FIG. 33 shows the craft equipped with laterally fixed buckets response to ahead and astern thrust commands while the steering wheel is rotated counter clockwise. In both ahead and astern thrust maneuvers the craft rotates counter clockwise, the same direction as the wheel movement.

In contrast, Column B of FIG. 33 shows a craft that is equipped with integral reversing buckets response to ahead and astern thrust commands while the steering wheel is rotated counter clockwise. In the ahead thrust case the craft rotates counter clockwise, however, the craft responds with the opposite rotation when thrusting astern. The clockwise rotation of the craft while thrusting astern is in the opposite direction of the steering wheel movement, and is an artifact of the systems with integral reversing buckets.

Another example of a difference in response to nozzle movements between systems with the laterally fixed and integral reversing buckets is the craft's response to nozzle movements while the reversing buckets are in a neutral thrust position. Column A of FIG. 34 shows a craft's, equipped with laterally fixed reversing buckets, response to a counter-clockwise steering command while the buckets are positioned at neutral thrust. The craft rotates counter-clockwise with little or no translation.

In contrast column B of FIG. 34 shows a craft's, equipped with integral reversing buckets, response to a counter-clockwise steering command while the buckets are positioned at neutral thrust. As illustrated, there is no significant net translation or rotation thrust for systems that are equipped with integral reversing buckets.

Yet another difference between the response characteristics of the two types of reversing buckets is the absence of significant force coupling between steering and bucket commands for systems equipped with the integral reversing bucket as compared to systems equipped with the laterally fixed type reversing buckets. The absences of force coupling for systems equipped with the integral bucket is illustrated in FIGS. 22A and 22B where it is illustrated that angle Φ remains substantially constant when the reversing bucket position changes from ahead to astern. In contrast, the steering and reversing forces are severely coupled for systems equipped with the laterally fixed reversing revering bucket, as illustrated in FIGS. 25A and 25B where the thrust angle Φ changes significantly with bucket movements. Due to the absence of any significant force coupling with systems equipped with the integral reversing bucket, it is not necessary to maintain the reversing bucket at discrete positions when a net transverse thrust is being commanded as is done with systems equipped with laterally fixed reversing buckets according to some embodiments of the invention.

Accordingly, for a system that uses integral reversing buckets instead of laterally fixed reversing buckets and that is also desired to induce a net force in the direction of motion of the first control apparatus joystick, levers or similar device) and second control apparatus (helm, tiller or similar device) or a control device with three degrees of freedom (such as a three-axis joystick), there is a need to implement a different set of control algorithms than what is used for the laterally fixed reversing buckets (e.g., FIGS. 13A and 13B).

An example of a waterjet control system that uses and commands integral reversing buckets according to one embodiment of the invention, is shown in FIG. 35. One difference between the system of the invention shown in FIG. 35 and the embodiments of a system shown in FIGS. 6 and 7 (for a vessel equipped with laterally fixed reversing buckets) is that the individual thrust vectors of each waterjet for the systems of FIGS. 6 & 7 respond to reversing bucket movements as described in FIGS. 24, 25 and 26 and, in contrast, the system of FIG. 35 (for a vessel equipped with integral reversing buckets) responds to reversing bucket movements as described in FIGS. 21, 22 and 23.

One system and method of compensating for the response characteristics of a vessel equipped with waterjets with integral reversing buckets according to the invention, separates the control algorithms into five separate control zones as shown in FIG. 36, and which are illustrated in more detail in FIGS. 37-41. By separating the algorithms into different zones, the difference in response characteristics of the waterjet with an integral reversing bucket, for example between ahead thrust and reverse thrust, can be compensated for by applying a different set of curves for the respective zones. This embodiment of such a system splits the control curves into five different zones that relate to the direction of applied net translational thrust: Port Thrust, Starboard Thrust, Zero Thrust (rotation only), Ahead Thrust Only (i.e., no side or reverse thrust) and Astern Thrust Only, as shown in FIG. 36. It is, of coarse, possible to create more or less than five zones, depending on how the algorithms and function modules are designed. One underlying goal of this embodiment of the invention is to create a system that compensates for the discontinuities in the force and motion created by the combination of propulsion devices and integral reversing buckets in response to command or actuator inputs, for example, by changing the nozzle position mapping in response to helm input signals that correspond to transitioning from ahead thrust (zone 4 as illustrated in FIG. 36) to astern thrust (zone 5 as illustrated in FIG. 36).

FIGS. 37-41 contain example algorithms for zones 1-5 respectively of a system for controlling waterjets with integral reversing buckets/nozzles, according to one embodiment of the invention. Because the effects of the waterjet thrust contribute to the net translational and rotational forces imparted to a vessel in different ways, depending on the direction of net translational thrust (zone), each zone has a dedicated algorithm such that the controller automatically implements the algorithm when transitioning from one zone to another. Each zone-specific algorithm contains a different mapping of the control devices (e.g., joystick, helm, and tiller) to the propulsion devices (e.g., steering nozzle, reversing bucket, engine RPM). For example, when thrusting ahead with no side thrust (Zone 4 of FIG. 36 and FIG. 40), modules 656 and 657 are configured to turn the nozzles in the starboard direction when the helm is turned to starboard (CW). In contrast, when thrusting astern with no side thrust (Zone 5 of FIG. 36 and FIG. 41), modules 650 and 651 are configured to turn both nozzles to port when the helm is turned to starboard (CW). Thus, as can be seen from FIGS. 40 and 41, the control algorithms according to this embodiment in essence flip the nozzle relationship with respect to helm movements from when the first control apparatus (e.g. joystick is in the thrust ahead position (Zone 4 of FIG. 36) to when the first control apparatus is in the thrust astern position (Zone 5 of FIG. 36), so that the rotational force imparted to vessel is in the same direction as the helm movement.

Figure 42:
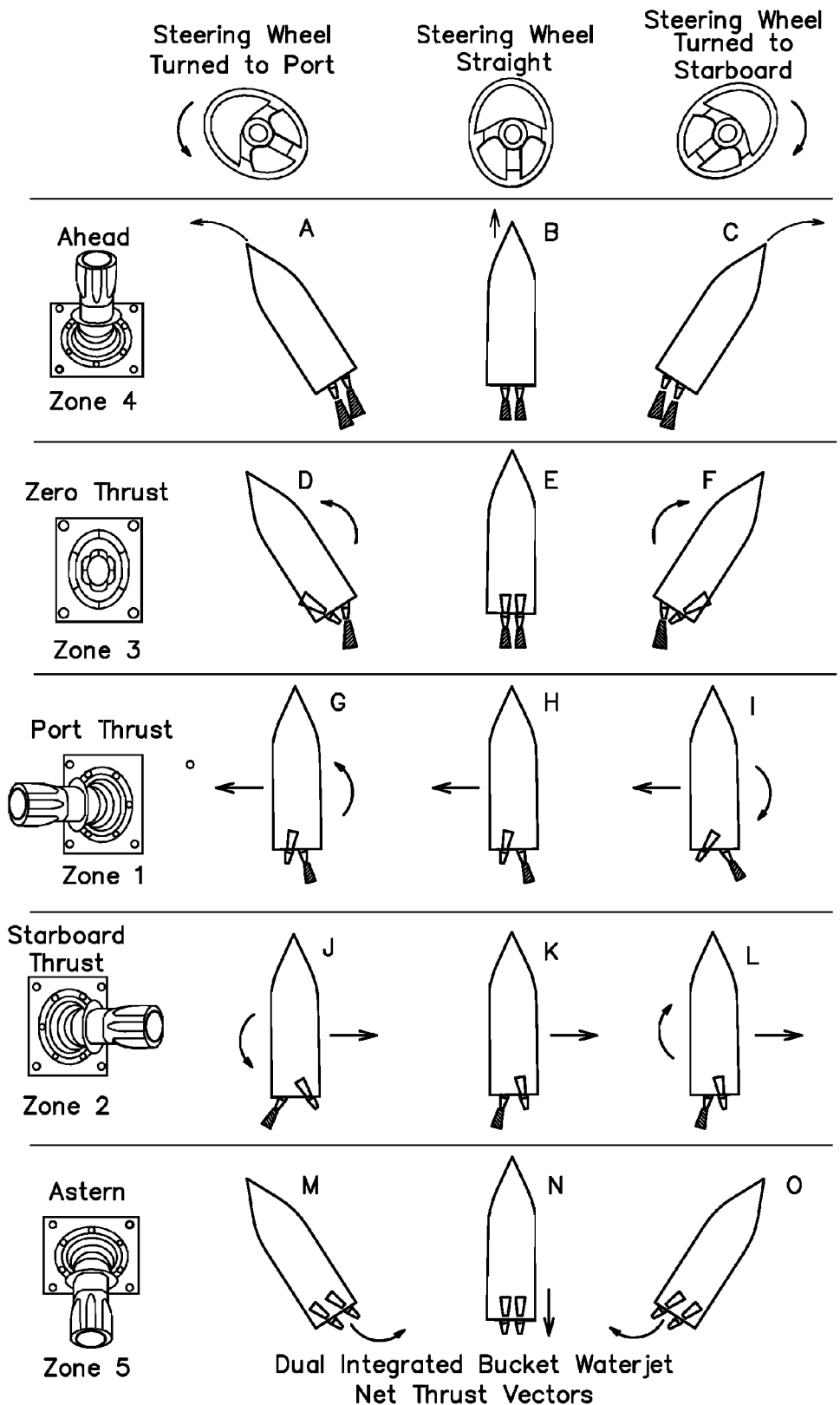
FIG. 42 illustrates exemplary movements by the marine vessel equipped with dual integrated waterjet and reversing buckets, and configured with the marine vessel control system of FIGS. 35-41.

FIG. 42 illustrates a Net Thrust Diagram that illustrates a plurality of thrust forces for a plurality of controller conditions, that are provided to a vessel configured with the herein described embodiment of a system and that is equipped with two waterjets that use an integral reversing bucket/nozzle. For example, the resulting forces imparted to the vessel for a starboard turn when thrusting ahead is shown as maneuver C. In addition, the resulting forces imparted to the vessel where the helm is turned to starboard and while the craft is reversing is shown as maneuver O. By comparing maneuvers C and O, one can see that in order to maintain a clockwise rotation (bow moving in the starboard direction) as commanded by the steering wheel (or steering tiller) when using an integral reversing bucket/nozzle, the nozzles should be pointing in the starboard direction when thrusting ahead and in the port direction when thrusting astern. In contrast, as was previously described, a craft that is equipped with laterally fixed reversing buckets maintains the nozzles pointed in the starboard direction for a starboard (CW) turn when thrusting ahead or thrusting astern. This can be seen in FIGS. 13A, 13B, 18A and 18B where module 1710 for the port nozzle and 1711 for the starboard nozzle are used for both thrusting ahead and thrusting astern maneuvers. In addition, the response of the craft when thrusting ahead and turning to starboard is shown in FIG. 20A and the response of the craft when thrusting astern turning to starboard is shown in FIG. 20B.

Referring again to FIG. 42, the response of a vessel configured according to the herein described embodiment of a system and equipped with integral reversing bucket/nozzles, to CCW rotations of the wheel or tiller is shown in maneuvers A (thrusting ahead) and M (thrusting astern). It is to be appreciated that these nozzle movements are similar to the CW turning maneuver described above, however, the nozzles are configured to turn in the opposite directions, as shown in modules 656 and 657 for zone 4 and modules 650 and 651 for zone 5. Thus, as can be seen from FIGS. 40 and 41, the control algorithms according to this embodiment flip the nozzle and helm relationship from when the first control apparatus (e.g. joystick is in the thrust ahead position (Zone 4 of FIG. 36) to when the first control apparatus is in the thrust astern position (Zone 5 of FIG. 36), so that the rotational force imparted to vessel is in the same direction as the helm movement.

Another example of control/propulsion device mapping that is different between vessels equipped with laterally fixed reversing buckets and vessels configured according to the herein described embodiment of a system and equipped with integral reversing bucket/nozzles is for the case where there is no net translational thrust, i.e., only rotational thrust being imparted provided to the vessel (illustrated as zone 3 in FIG. 36). As shown in FIG. 34, a craft equipped with laterally fixed reversing buckets can develop a rotational moment by turning the nozzles while the revering buckets remain at a neutral thrust position (column A). In contrast, a vessel with an integral reversing bucket/nozzle, however, is not able to develop a turning moment by rotating the nozzles while at a neutral thrust (as illustrated in column B of FIG. 34). Consequently, the integral reversing bucket/nozzle system needs an algorithm or mapping for the individual nozzles when no translational thrust is commanded, such that the nozzles can operate independently (not parallel) to induce a net turning moment on the vessel. FIG. 39 shows a mapping diagram for zone 3 of the herein described embodiment of a system. It is to be appreciated that since the condition for zone 3 is zero translational thrust, the joystick inputs have been left out of the diagram for simplification.

Due to the inability of vessels with integral reversing bucket/nozzles, to develop rotational thrust while both reversing buckets are set to neutral (as illustrated in FIG. 34), according to one embodiment of the system of the invention, a control scheme is implemented where the nozzles and/or buckets are operated differentially while applying little or no translational thrust to the craft. FIG. 39 illustrates an embodiment of a configuration for developing rotational thrust with little or no translational thrust. Taking for example maneuver F as shown in FIG. 42, where the helm is turned to starboard while the joystick is centered, the Module 641 (FIG. 39) of the invention progressively moves the port bucket in the up direction while the module 644 progressively moves the starboard bucket in the down direction, thereby creating a turning force couple (moment) on the vessel without creating a substantial net translational thrust. Since the amount of turning force created by the differential thrust of the waterjets is limited while the nozzles are maintained in a parallel orientation, additional modules 642, 645 also progressively turn the port nozzle in the starboard direction (module 642) and the starboard nozzle in the port direction (module 645) so as to toe or point in the nozzles. Increasingly toeing (or pointing) in the nozzles will increase the moment arm of the resultant force created by the two waterjets significantly while applying a relatively negligible side force. In addition to actuating the reversing buckets differentially and toeing in the nozzles, modules 640 and 643 are also configured to progressively increase engine RPM once the helm or tiller is moved beyond a threshold point. Thus according to this embodiment of the invention, the system provides rotation forces on the vessel equipped with integral reversing deflectors with little or no translation forces by progressively pointing in the steerable propulsors and/or applying a differential RPM to the propulsors as a function of increased helm or tiller rotation. However, it is to be understood that the exact combination of reversing bucket movements, steering nozzle movements, and engine RPM levels shown in the embodiment of FIG. 39 are not required to achieve the same or similar results. For example, the engine RPM can be increased at different points in the mapping or not at all with varying levels of effectiveness. In addition, the extent of toeing in the nozzles can be changed or eliminated, also with varying levels of effectiveness.

As with vessels equipped with laterally fixed reversing buckets (such as illustrated in FIGS. 13H and 20C), vessels equipped with integral reversing buckets/nozzles are able to induce combinations of transverse and rotational thrust that will allow the craft to translate sideways while at the same time apply varying amounts of rotational thrust. Due to the differences that have been discussed herein, however, the nozzle and reversing bucket movements that create a net transverse thrust (with or without rotational thrust) are substantially different. Referring to Zone 1 (thrusting to port) of FIG. 42, the maneuver where a transverse thrust is applied to the craft without a rotational thrust is identified as maneuver H. The actuation of the reversing buckets, steering nozzles and engine RPM to achieve maneuver H can be determined from the control diagram of FIG. 37.

Let us first consider the case of maneuver H where the craft is translating sideways with little or no forward or reverse thrust. In this case, a neutral Y-Axis signal will be created by the joystick and transmitted to modules 606, 607, 608 and 609 resulting in a neutral contribution (neither forward nor reverse) to the positioning of the reversing buckets and no contribution (other than idle) to the engine RPM. As the x-axis signal is increased beyond the threshold that transitions from Zone-3 to Zone-1, the port nozzle is positioned (by module 602) in a discrete position in the port direction and the starboard nozzle is positioned (by module 605) in a discrete position in the starboard direction. The respective positions of the port and starboard nozzles correspond to the equilibrium point where translational thrust can be applied in any direction without inducing a rotational or yawing force. These positions usually correspond to angles where both nozzles are pointed along respective center lines that intersect at or near the center of rotation of the craft. Nozzles that are positioned in this manner are sometimes referred to as being in a toe-out configuration As long as the helm or steering wheel remains in a neutral position that corresponds to no rotational thrust, the nozzles will both remain in these respective discrete positions.

As illustrated by modules 600 and 601, progressively moving the joystick to increase the magnitude of net transverse thrust in the port direction will lower the reversing bucket and increase the engine RPM of the port reversing bucket, thereby increasing the reverse thrust of the port waterjet. At the same time, as illustrated by modules 603 and 604, by moving the joystick to port will lift the starboard reversing bucket and increase the RPM of the starboard engine. As long as the joystick is centered along the Y-axis, the reversing thrust of the port waterjet and the ahead thrust of the starboard waterjet will remain substantially equal in magnitude so as to induce a net transverse thrust without inducing a net forward or reverse thrust.

Adding a rotational thrust in the port or counter clockwise direction (maneuver G of FIG. 42) is achieved by rotation of the helm or steering wheel counter clockwise. As indicated by modules 610 and 611 of FIG. 37, moving the steering wheel to port (CCW) will move the port nozzle in the starboard direction and the starboard nozzle in the port direction. This is achieved by creating an additional starboard movement with module 610 for the port waterjet based on the magnitude of the wheel rotation and adding it to the discrete position output from module 602 at summing module 616. Similarly, an additional port movement is added to the starboard nozzle by module 611 and summed with the discreet output of module 605 at summing module 617. So as to not create a situation where the nozzles are allowed to move to a point beyond the neutral position such that the direction of translational thrust differs from the joystick movement, absolute limits are placed on the nozzle movements with module 618 for the port nozzle and 619 for the starboard nozzle. Module 618 will not allow the port nozzle to move to the starboard side of neutral (straight ahead) and module 619 will not allow the starboard nozzle to move to the port side on neutral. It is to be appreciated, however, that for cases where there is not enough rotational thrust available in one direction as provided by the system described herein, the limits set by modules 618 and 619 can be extended.

It is to be understood that the magnitude of deflection of the port and starboard steering nozzles in response to helm movements need not be the same as long as there are minimal changes in translational thrust resulting from movements of the steering wheel or tiller. The optimum amounts of nozzle movement for each nozzle in response to steering commands depends heavily on the hydrodynamics of the craft during side thrusting operations as well as the hull-waterjet interactions for each waterjet. These points can be estimated with application-specific modeling or determined during a sea trial.

It is understood that Zone 2 of FIG. 42 is substantially a mirror image of Zone 1, and therefore the corresponding modules of FIG. 38 and the resulting maneuvers J, K and L illustrated in FIG. 42 will not be discussed in detail here again, for the sake of brevity.

Figure 43:
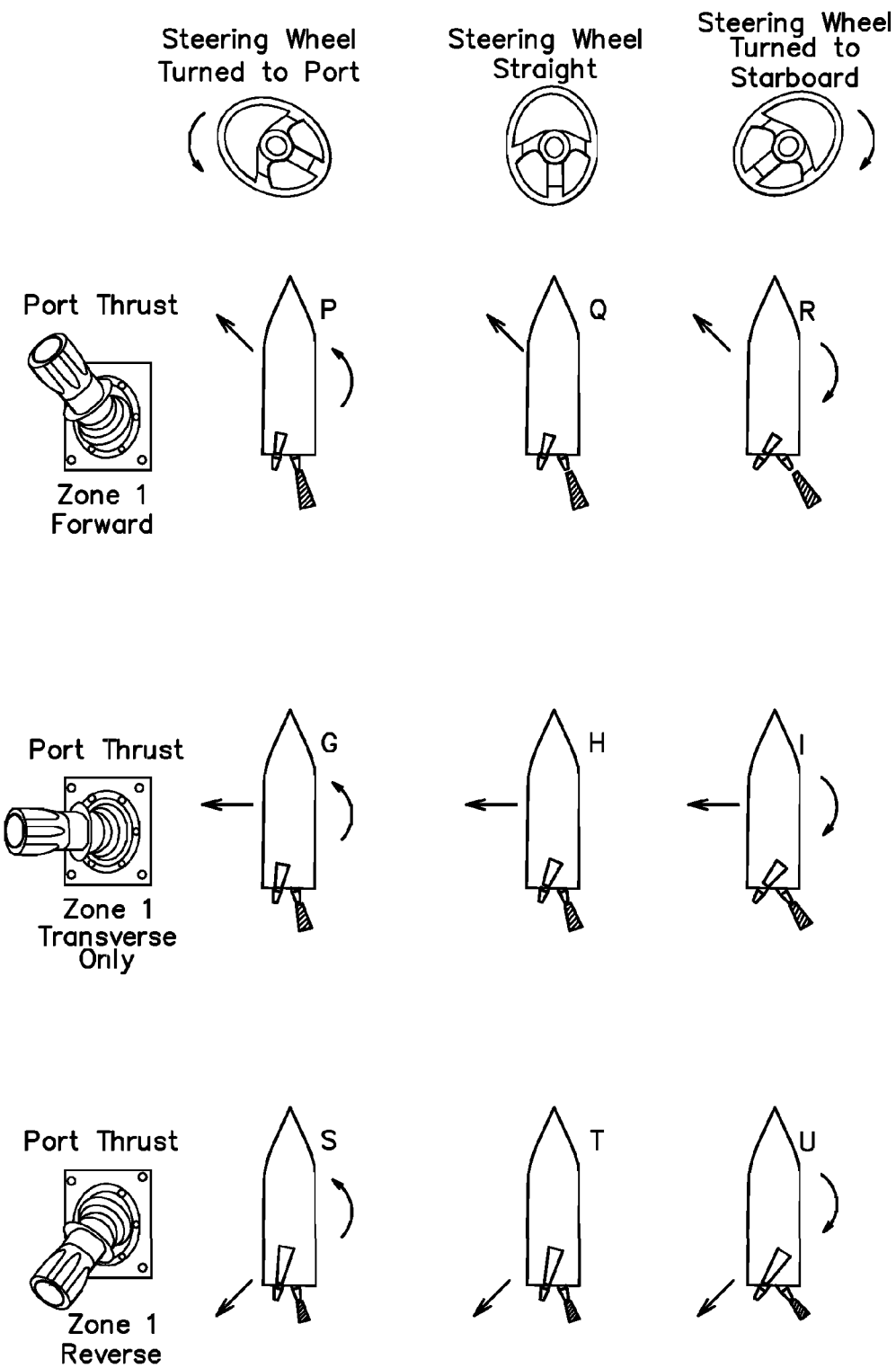
FIG. 43 illustrates additional exemplary movements of a vessel configured with the control system of the invention and equipped with dual integrated waterjet and reversing buckets, and configured with the marine vessel control system of FIGS. 35-41.
Figure 44:
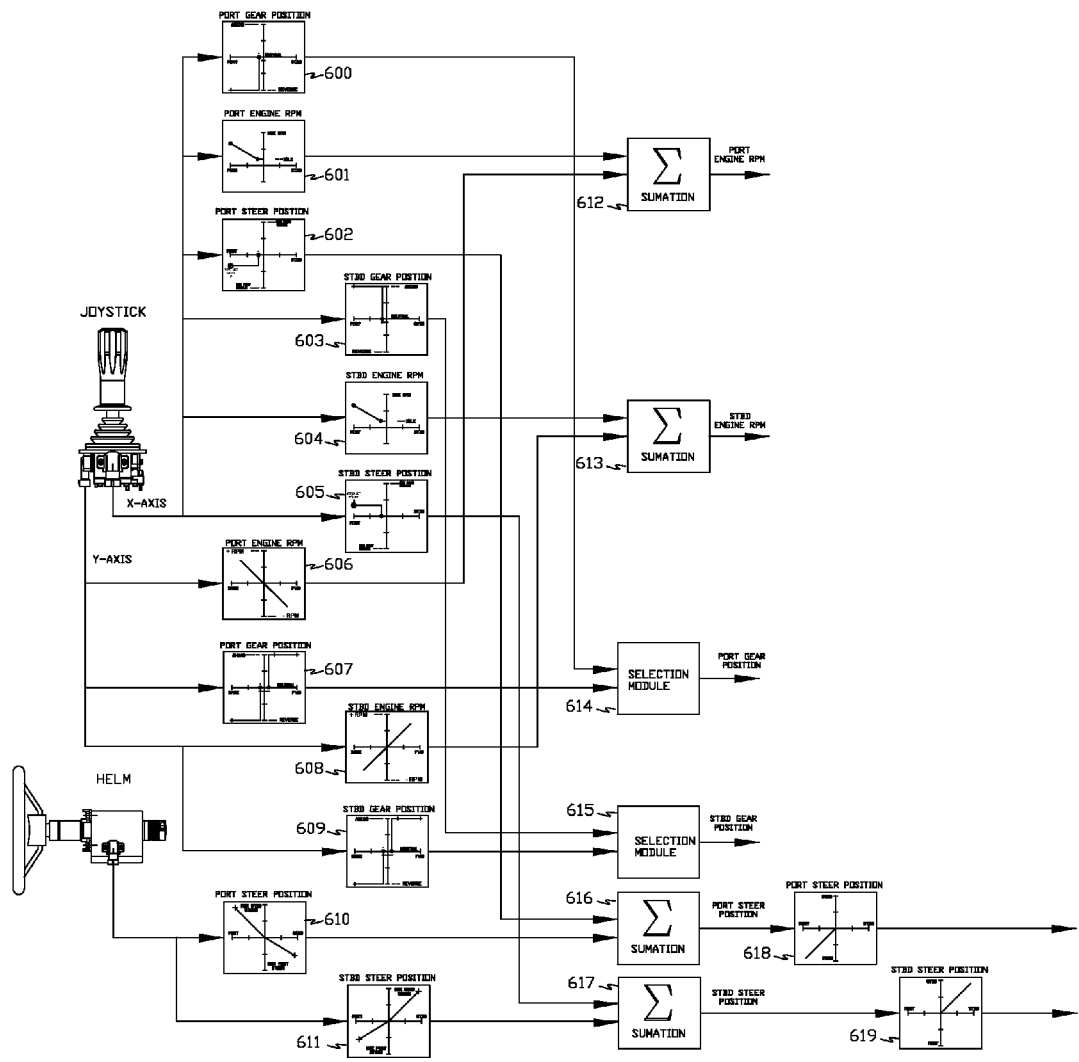
FIG. 44 illustrates a signal diagram for a first control zone of a marine vessel control system for controlling devices such as outboard engines and outdrives.
Figure 45:
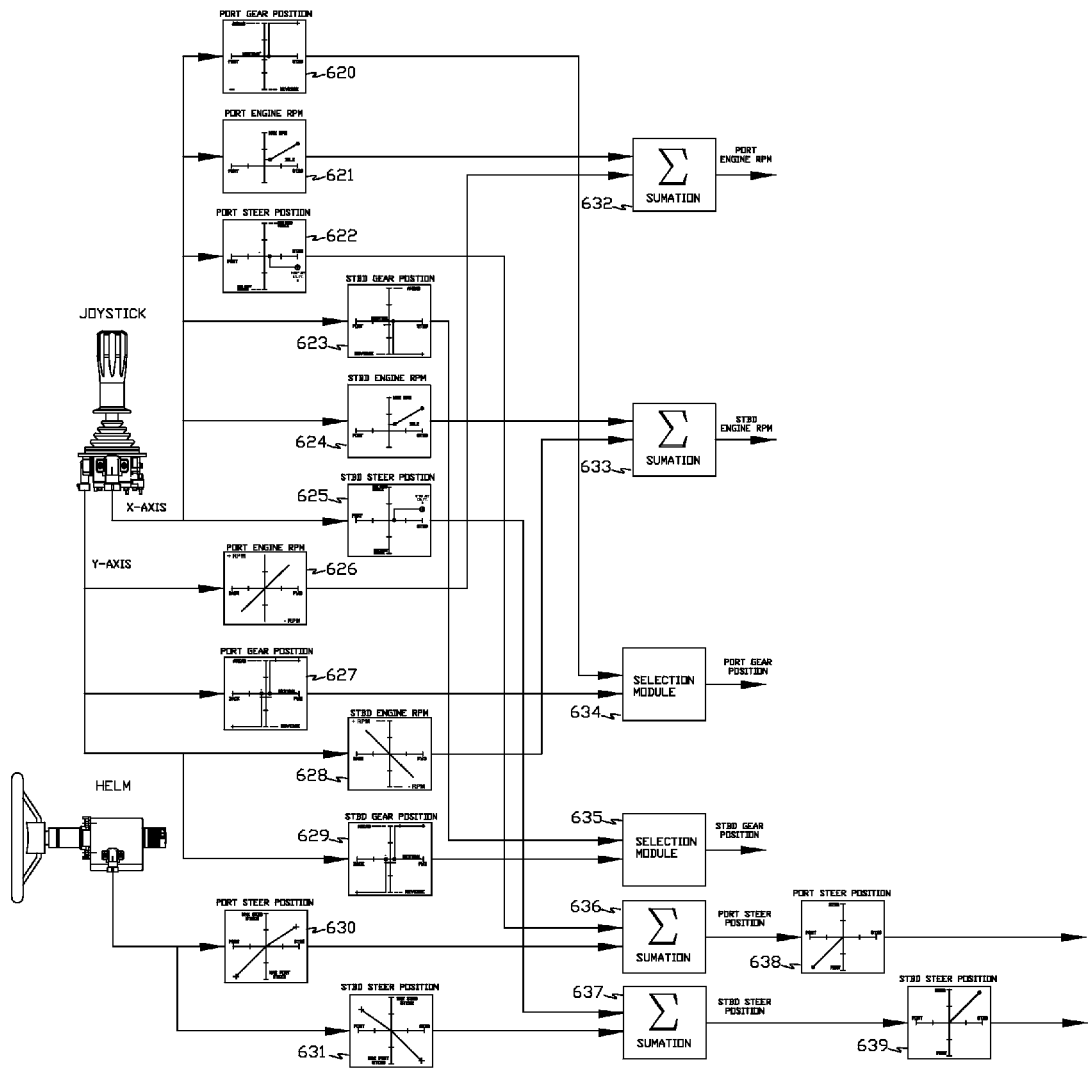
FIG. 45 illustrates a signal diagram for a second control zone of a marine vessel control system for controlling devices such as outboard engines and outdrives.
Figure 46:
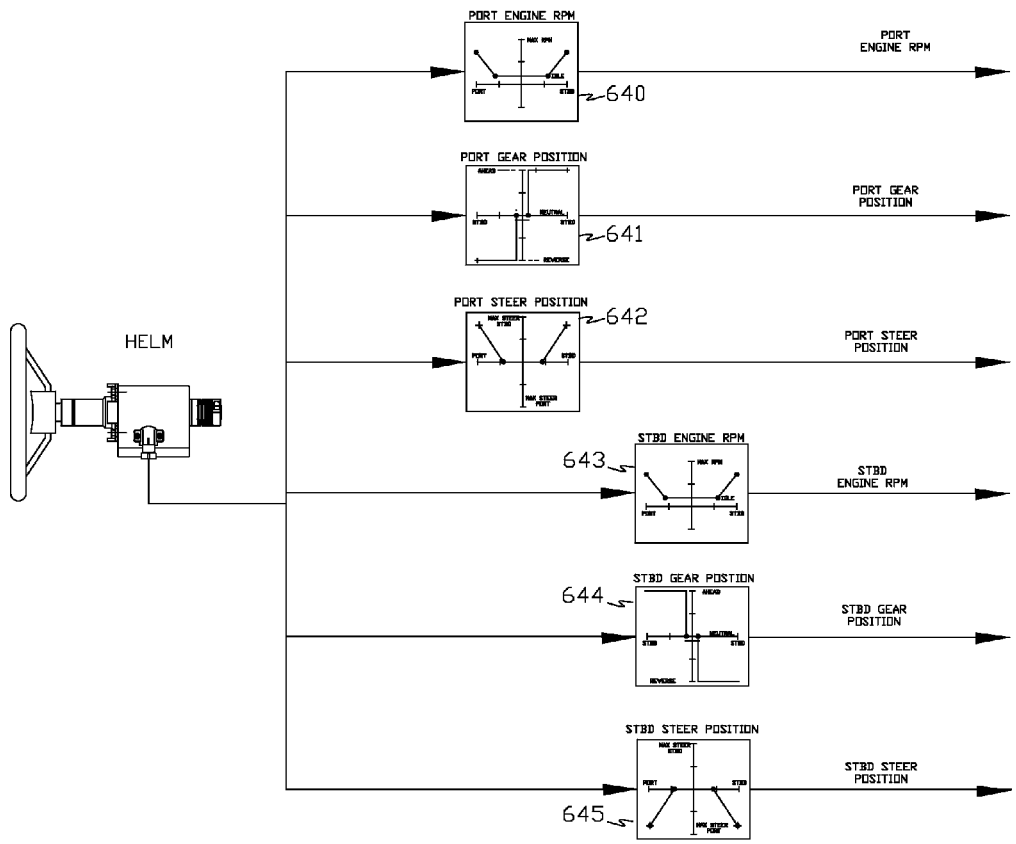
FIG. 46 illustrates one embodiment of a signal diagram for a third control zone of a marine vessel control system for controlling devices such as outboard engines and outdrives.
Figure 47:
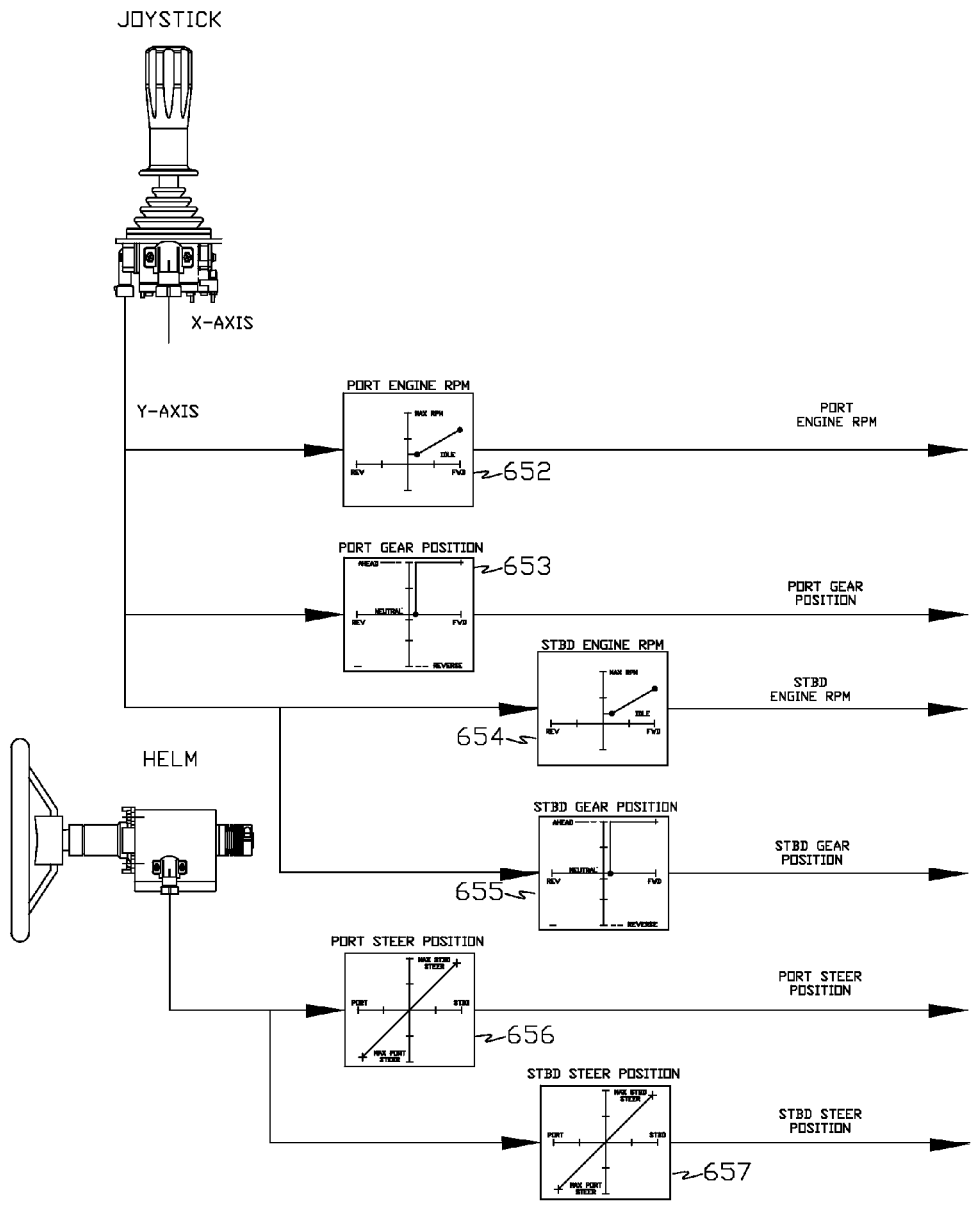
FIG. 47 illustrates a signal diagram for a fourth control zone of a marine vessel control system for controlling devices such as outboard engines and outdrives.
Figure 48:
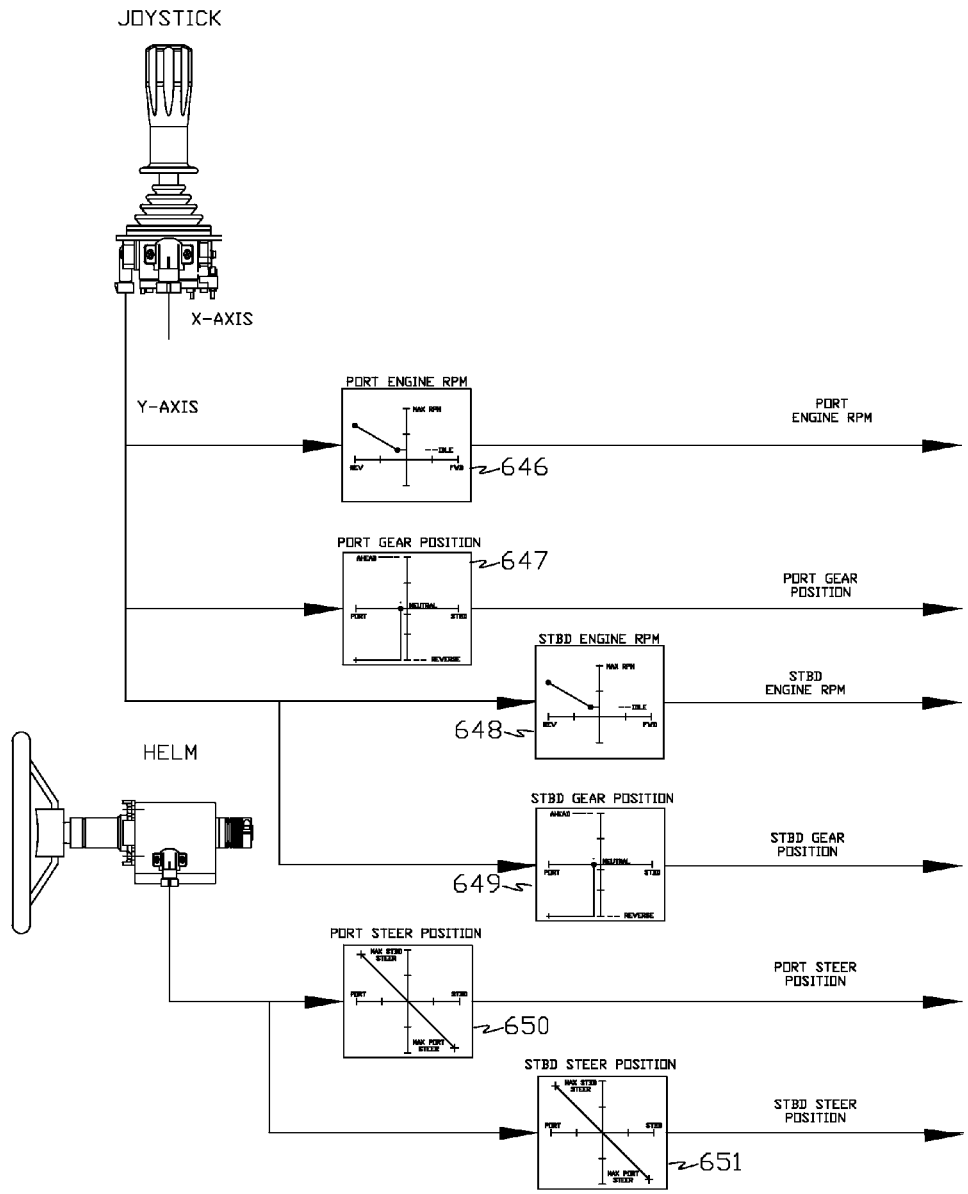
FIG. 48 illustrates one embodiment of a signal diagram for a fifth control zone of a marine vessel control system for controlling devices such as outboard engines and outdrives.

As illustrated in FIG. 36, Zones 1 and 2 cover all movements of the joystick to the respective side of neutral (with respect to transverse thrust). Accordingly, the control algorithms described in FIG. 37 for Zone-1 and FIG. 38 for Zone-2 also are configured to add varying levels of ahead and astern thrust in response to joystick movements along the Y axis in order to respond to diagonal translational thrust commands from the joystick. For example, referring now to FIG. 43, which illustrates movements of a vessel configured with the control system of the invention and equipped with dual integrated waterjet and reversing buckets, maneuver Q can be achieved by maintaining the helm at a neutral position such that modules 610 and 611 (of FIG. 37) do not contribute additional nozzle movements to the summation modules (616, 617) and by moving the joystick forward in addition to the port direction. As the joystick is moved forward along the y-axis, modules 607 and 609 progressively move the reversing buckets toward the up position, thereby increasing the ahead thrust of the starboard waterjet and decreasing the astern thrust of the port waterjet. This maneuver is illustrated in FIG. 43Q, by showing the reduction of discharge of the port waterjet and the increase in discharge of the starboard waterjet. Additionally, modules 606 and 608 will increase the RPM of the starboard waterjet and decrease the RPM of the port waterjet as the joystick is moved forward. As shown in modules 606 and 608 (of FIG. 37).

In a similar fashion as maneuvers G and I, a rotational thrust to port (CCW) can be added by turning the wheel counter clockwise, thereby moving the nozzles towards the center as shown in maneuver P. Similarly, a clockwise rotational thrust can be achieved by turning the wheel to starboard which will move the nozzles away from the center, as shown in maneuver R.

Like the forward diagonal movements of FIGS. 43P, Q and R, reverse diagonal thrust can be developed by moving the joystick backward along the Y axis. For example, by maintaining the helm and moving the joystick backwards, modules 606 and 607 (of FIG. 37) increase the astern thrust of the port waterjet and modules 608 and 609 (of FIG. 37) decrease the ahead thrust of the starboard waterjet. This diagonal backwards and to port maneuver is illustrated in FIG. 43T of FIG. 43. In a similar fashion as maneuvers G and I, a rotational thrust to port (CCW) can be added by turning the wheel counter clockwise, thereby moving the nozzles towards the center as shown in maneuver S of FIG. 43. Similarly, a clockwise rotational thrust can be achieved by turning the wheel to starboard which will move the nozzles away from the center, as shown in maneuver U of FIG. 43.

It is understood that Zone 2 of FIG. 42 is a substantially a mirror image of on Zone 1, and therefore the corresponding modules of FIG. 38 and the resulting maneuvers illustrated in FIG. 42 will not be discussed in detail here again for the sake of brevity.

According to another embodiment of the invention, it may be desirable to expand the envelope of Zone 3 described herein, such that moving the joystick a limited amount in either or both of the forward or reverse direction when the nozzles are toed-in will allow the system to maintain the toed-in configuration of the waterjets while superimposing a progressive forward bucket signal to both waterjets (with forward movements of the joystick) and a progressive reverse bucket signal to both waterjets (with reverse movements of the joystick). Such a configuration allows the operator to apply small or moderate levels of ahead and astern thrust while at the same time maintaining the large turning forces that can be achieved in Zone 3 (due to toeing in the nozzles). For such an arrangement, it is understood that in addition as an aspect of the invention, the RPM levels can also be increased, as has already been described herein.

The invention described herein is not limited to vessels with waterjets. For example by replacing the reversing bucket modules of FIGS. 37 through 41 with Forward/Reverse Gear modules and eliminating modules 607, 609, 614, 615, 627, 629, 634 & 635, the integral reversing bucket/nozzle control algorithm herein described can be converted to a steerable propeller algorithm and can be used to control such devices as outboard engines and outdrives. Motion of the propeller driven craft would be similar to the examples shown in FIGS. 42 and 43 for vessels that are driven by waterjets with integral reversing bucket/nozzles. Corresponding example control algorithms for a steerable propeller unit are illustrated in FIGS. 44 through 48.

It is to be understood that the summation modules herein described and illustrated can sum the various signals in different ways. For example different signals may have different weights in the summation or selected signals may be left out of the summation under certain conditions. It is also the function of the summation module to clamp (limit) output signals that would otherwise exceed the maximum values.

Having described various embodiments of a marine vessel control system and method herein, it is to be appreciated that the concepts presented herein may be extended to systems having any number of control surface actuators and propulsors and is not limited to the embodiments presented herein. Modifications and changes will occur to those skilled in the art and are meant to be encompassed by the scope of the present description and accompanying claims. It is, therefore, to be understood that the appended claims are intended to cover all such modifications and changes as fall within the range of equivalents and disclosure herein.

What is claimed is:

1. A method for controlling a marine vessel comprising a first steerable propulsor having a corresponding first reversing device and a first steering device, and a second steerable propulsor having a corresponding second reversing device and a second steering device, comprising:
   receiving at least a first vessel control signal corresponding to a rotational movement and no translational movement command;
   generating at least a first set of actuator control signals and a second set of actuator control signals in response to the at least a first vessel control signal;
   coupling the first set of actuator control signals to and controlling the first steering device and the second steering device;
   coupling the second set of actuator control signals to and controlling the first reversing device and the second reversing device; and
   creating rotational forces on the marine vessel with substantially no translational forces on the marine vessel by pointing inward at least one of the first and second steerable propulsors.

2. A method for controlling a marine vessel comprising a first steerable propulsor having a corresponding first reversing device and a first steering device, and a second steerable propulsor having a corresponding second reversing device and a second steering device, comprising:
   receiving at least a first vessel control signal corresponding to a rotational movement and no translational movement command;
   generating at least a first set of actuator control signals and a second set of actuator control signals in response to the at least a first vessel control signal;
   coupling the first set of actuator control signals to and controlling the first steering device and the second steering device;
   coupling the second set of actuator control signals to and controlling the first reversing device and the second reversing device; and
   creating rotational forces on the marine vessel with substantially no translational forces on the marine vessel by applying opposite forces to the first and second steerable propulsors, wherein the opposite forces are applied by applying a forward thrust with the first steerable propulsor and a reverse thrust with the second steerable propulsor.

3. The method for controlling a marine vessel as claimed in claim 2, further comprising generating a third set of actuator control signals and coupling the third set of actuator control signals to a first speed control device of the first steerable propulsor and a first speed control device of the second steerable propulsor so as to apply different RPMs to the first and second steerable propulsors.

4. The method for controlling a marine vessel as claimed in claim 2, further comprising providing the first and second steerable propulsors as first and second waterjets.

5. The method for controlling a marine vessel as claimed in claim 2, further comprising providing the first and second steerable propulsors as first and second outdrives.

6. The method for controlling a marine vessel as claimed in claim 2, further comprising providing the first and second steerable propulsors as first and second steerable propellers.

7. The method for controlling a marine vessel as claimed in claim 2, further comprising providing the first and second steerable propulsors as first and second steerable outboard engines.

8. The method for controlling a marine vessel as claimed in claim 1, further comprising creating rotational forces on the marine vessel with substantially no translational forces on the marine vessel by applying opposite forces to the first and second steerable propulsors.

9. The method for controlling a marine vessel as claimed in claim 8, wherein the opposite forces are applied by applying a forward thrust with the first steerable propulsor and a reverse thrust with the second steerable propulsor.

10. The method for controlling a marine vessel as claimed in claim 9, wherein the differential thrust forces are applied by generating a third set of actuator control signals and coupling the third set of actuator control signals to a first speed control device of the first steerable propulsor and a first speed control device of the second steerable propulsor so as to apply different RPMs to the first and second steerable propulsors.

11. The method for controlling a marine vessel as claimed in claim 1, further comprising providing the first and second steerable propulsors as first and second waterjets.

12. The method for controlling a marine vessel as claimed in claim 1, further comprising providing the first and second steerable propulsors as first and second outdrives.

13. The method for controlling a marine vessel as claimed in claim 1, further comprising providing the first and second steerable propulsors as first and second steerable propellers.

14. The method for controlling a marine vessel as claimed in claim 1, further comprising providing the first and second steerable propulsors as first and second steerable outboard engine.

15. The method for controlling a marine vessel as claimed in claim 2, wherein the differential thrust forces are applied by applying a forward thrust with the first reversing device and a reverse thrust with the second reversing device.

16. An apparatus for controlling a marine vessel comprising a first steerable propulsor having a corresponding first reversing device and a first steering device, and a second steerable propulsor having a corresponding second reversing device and a second steering device, the apparatus comprising:
   a processor configured to receive at least a first vessel control signal corresponding to a rotational movement and no translational movement command, the processor configured to generate at least a first set of actuator control signals and a second set of actuator control signals in response to the first vessel control signal;

wherein the first set of actuator control signals are to be coupled to and control the first steering device and the second steering device;

wherein the second set of actuator control signals are to be coupled to and control the first reversing device and the second reversing device; and wherein the processor is configured to provide the first set of actuator control signals so as to control the first steering device and the second steering device to point inward at least one of the first and second steerable propulsors so as to create rotational forces on the marine vessel with substantially no translational forces on the marine vessel.

17. The apparatus as claimed in claim 16, wherein the processor is further configured to create rotational forces on the marine vessel with substantially no translational forces on the marine vessel by applying opposite forces to the first and second steerable propulsors.

18. The apparatus as claimed in claim 17, wherein processor is configured to provide the differential thrust forces by providing a third set of actuator control signals to be coupled to and control a first speed control device of the first steerable propulsor and a second speed control device the second steerable propulsor so as to apply a forward thrust with the first steerable propulsor and a reverse thrust with the second steerable propulsor.

19. The apparatus as claimed in claim 18, wherein processor is further configured to provide the differential thrust forces by applying different RPMs to the first and second steerable propulsors.

20. The apparatus as claimed in claim 16, wherein the processor is configured to provide the opposite forces by applying a forward thrust with the first reversing devices and a reverse thrust with the second reversing device.

21. The apparatus as claimed in claim 16, wherein the first and second steerable propulsors are first and second waterjets.

22. The apparatus as claimed in claim 16, wherein the first and second steerable propulsors are first and second outdrives.

23. The apparatus as claimed in claim 16, wherein the first and second steerable propulsors are first and second steerable propellers.

24. The apparatus as claimed in claim 16, wherein the first and second steerable propulsors are first and second steerable outboard engines.

25. An apparatus for controlling a marine vessel comprising a first steerable propulsor having a corresponding first reversing device and a first steering device, and a second steerable propulsor having a corresponding second reversing device and a second steering device, the apparatus comprising:

a processor configured to receive at least a first vessel control signal corresponding to a rotational movement and no translational movement command, the processor configured to generate at least a first set of actuator control signals and a second set of actuator control signals in response to the first vessel control signal;

wherein the first set of actuator control signals are to be coupled to and control the first steering device and the second steering device;

wherein the second set of actuator control signals are to be coupled to and control the first reversing device and the second reversing device; and wherein the processor is configured to provide the first set of actuator control signals and the second set of actuator control signals so as to control the first steerable propulsor and the second steerable propulsor to provide opposite forces with the first and second steerable propulsors by providing a forward thrust with the first steerable propulsor and a reverse thrust with the second steerable propulsor so as to create rotational forces on the marine vessel with substantially no translational forces on the marine vessel.

26. The apparatus as claimed in claim 25, wherein the processor is configured to provide the opposite forces by providing a third set of actuator control signals to be coupled to and control a first speed control device of the first steerable propulsor and a second speed control device the second steerable propulsor so as to apply different RPMs to the first and second steerable propulsors.

27. The apparatus as claimed in claim 25, wherein the processor is configured to provide the opposite forces by applying the forward thrust with the first reversing devices and the reverse thrust with the second reversing device.

28. The apparatus as claimed in claim 25, wherein the processor is configured to provide additional rotational forces by pointing inward at least one of the first and second steerable propulsors.

29. The apparatus as claimed in claim 25, wherein the first and second steerable propulsors are first and second waterjets.

30. The apparatus as claimed in claim 25, wherein the first and second steerable propulsors are first and second outdrives.

31. The apparatus as claimed in claim 25, wherein the first and second steerable propulsors are first and second steerable propellers.

32. The apparatus as claimed in claim 25, wherein the first and second steerable propulsors as first and second steerable outboard engines.

33. The method for controlling a marine vessel as claimed in claim 1, further comprising receiving a second vessel control signal corresponding to a forward-reverse thrust command; and providing a net forward-reverse thrust in addition to the rotational force by applying differential forces to the first and second steerable propulsors.

34. The apparatus as claimed in claim 16, wherein the processor is further configured to receive a second vessel control signal corresponding to a forward-reverse thrust command;

and wherein the processor is further configured to further provide a net forward-reverse thrust in addition to the rotational force by applying differential forces to the first and second steerable propulsors.

* * * * *